(12) United States Patent
Akiyama et al.

(10) Patent No.: US 7,042,810 B2
(45) Date of Patent: May 9, 2006

(54) THERMALLY-ASSISTED MAGNETIC RECORDING HEAD, METHOD OF MANUFACTURING THE SAME, AND THERMALLY-ASSISTED MAGNETIC RECORDING APPARATUS

(75) Inventors: Junichi Akiyama, Kawasaki (JP); Katsutaro Ichihara, Yokohama (JP); Genichi Hatakoshi, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/772,894

(22) Filed: Jan. 31, 2001

(65) Prior Publication Data

US 2001/0017820 A1    Aug. 30, 2001

(30) Foreign Application Priority Data

Jan. 31, 2000   (JP) .............................. 2000-022884
Mar. 30, 2000   (JP) .............................. 2000-094097

(51) Int. Cl.
   *G11B 11/105*   (2006.01)
   *G11B 15/64*    (2006.01)
   *G11B 5/02*     (2006.01)

(52) U.S. Cl. ...................... 369/13.33; 369/300; 360/59
(58) Field of Classification Search ............. 369/13.33, 369/300, 13.17; 360/59; 359/59; G11B 11/05, G11B 5/02, 15/64

See application file for complete search history.

(56) References Cited

U.S. PATENT DOCUMENTS 4,637,953 A * 1/1987 Sawamura et al. ......... 428/333

(Continued)

FOREIGN PATENT DOCUMENTS

JP        2-037501        2/1990

(Continued)

OTHER PUBLICATIONS

"Heating Mechanisms in a near-field optical system", Applied Optics, vol. 36, No. 24, Aug. 20, 1997, pp. 5951-5958, Kann et al.*

(Continued)

*Primary Examiner*—A M Psitos
(74) *Attorney, Agent, or Firm*—Oblon, Spivak, McClelland, Maier & Neustadt, P.C.

(57) ABSTRACT

A thermally-assisted magnetic recording head and a magnetic recording apparatus having the magnetic recording head built in are disclosed. The magnetic recording head is capable of recording magnetic information by heating a recording unit of a recording medium and raising its temperature to reduce magnetic coercive force and then applying recording magnetic field to the recording unit having the reduced coercive force. The magnetic recording head has a light absorbing film having an aperture, a laser device emitting and directing light through the aperture to the recording medium to head the recording unit and raise its temperature, and a recording magnetic pole for applying the recording magnetic field to the recording unit. In the aperture, an aperture width W1 is along a polarizing direction of the light emitted from the laser device while an aperture width W2 is approximately perpendicular to the polarizing direction of the aperture width W1, and the aperture width W1 is shorter than the aperture width W2. The heating source such as a laser device recedes from the medium to provide a unique configuration where a tip of the recording magnetic pole protrudes ahead of the heating source, and hence, heating beam and the recording magnetic pole can be located close to each other without losing sufficient energy density to heat the medium.

16 Claims, 29 Drawing Sheets

U.S. PATENT DOCUMENTS

| | | | | |
|---|---|---|---|---|
| 4,840,922 | A | * | 6/1989 | Kobayashi et al. .......... 437/139 |
| 5,231,620 | A | * | 7/1993 | Ohuchida ................ 369/44.14 |
| 5,623,509 | A | * | 4/1997 | Iwano et al. .................. 372/45 |
| 5,808,973 | A | * | 9/1998 | Tanaka ........................ 369/14 |
| 5,850,411 | A | * | 12/1998 | Major, Jr. et al. ............. 372/45 |
| 5,978,139 | A | | 11/1999 | Hatakoshi et al. |
| 5,986,995 | A | * | 11/1999 | He et al. ............... 369/112.07 |
| 6,016,290 | A | * | 1/2000 | Chen et al. ................... 369/13 |
| 6,023,451 | A | * | 2/2000 | Kashiwagi et al. ...... 369/275.5 |
| 6,236,783 | B1 | * | 5/2001 | Mononobe et al. ........... 385/43 |
| 6,304,527 | B1 | * | 10/2001 | Ito et al. .................. 369/44.23 |
| 6,314,122 | B1 | * | 11/2001 | Peale ........................... 372/92 |
| 6,340,813 | B1 | * | 1/2002 | Tominaga et al. ........... 250/216 |
| 6,359,852 | B1 | * | 3/2002 | Ueyanagi .................... 369/118 |
| 6,396,776 | B1 | * | 5/2002 | Ueyanagi ................. 369/13.33 |
| 6,404,706 | B1 | * | 6/2002 | Stovall et al. ............ 369/13.17 |
| 6,464,822 | B1 | * | 10/2002 | Choi et al. ................ 156/307.1 |
| 6,479,816 | B1 | * | 11/2002 | Oumi et al. ................. 250/306 |
| 6,587,494 | B1 | * | 7/2003 | Hatakoshi et al. ............. 372/49 |
| 6,611,003 | B1 | * | 8/2003 | Hatakoshi et al. ............. 257/98 |
| 6,687,277 | B1 | * | 2/2004 | Hatakoshi et al. ............. 372/49 |

FOREIGN PATENT DOCUMENTS

| | | | |
|---|---|---|---|
| JP | | 02-189751 | 7/1990 |
| JP | | 06-203303 | 7/1994 |
| JP | | 06-243527 | 9/1994 |
| JP | | 08-222814 | 8/1996 |
| JP | PCT/JP97/03141 | * | 3/1998 |
| JP | | 11-096608 | 4/1999 |
| JP | | 11-265520 | 9/1999 |

OTHER PUBLICATIONS

H. Katayama, et al., J. Magn. Soc. Jpn., vol. 32, No. 8, pp. 1901-1906, "Laser-Assisted Magnetic Recording Technologies," 1999.

H. Katayama, et al., Proceedings of the Magneto-Optical Recording International Symposium '99, J. Magn. Soc. Jpn., vol. 23, No. S1, pp. 233-236, "New Magnetic Recording Method Using Laser Assisted Read/Write Technologies," 1999.

H. Saga, et al., Proceedings of Magneto-Optical Recording International Symposium '99, J. Magn. Soc. Jpn., vol. 23, No. S1, pp. 225-228, "A New Perpendicular Magnetic Recording Method With a Magnetic -Optical Common Preformat," 1999.

Gen-ichi Hatakoshi and Hideto Furuyama, "Polarization Dependence Analysis of Optical Loss in Small-Aperture Metal Waveguides for Near-Field Optics," Jpn. J. Appl. Phys. vol. 40 (2001), pp. 1548-1551, no compled date.

* cited by examiner

W=100nm
(W/λ =1/6.5)

W=50nm
(W/λ =1/13)

W=30nm
(W/λ =1/22)

W=10nm
(W/λ =1/65)

(OPTICAL INTENSITY)

(PROPAGATING LIGHT COMPONENTS)

THERMALLY-ASSISTED MAGNETIC RECORDING HEAD, METHOD OF MANUFACTURING THE SAME, AND THERMALLY-ASSISTED MAGNETIC RECORDING APPARATUS

BACKGROUND OF THE INVENTION

The present invention relates to a thermally-assisted magnetic recording head and a thermally-assisted magnetic recording apparatus, and more particularly, it relates to newly improved thermally-assisted magnetic recording head and thermally-assisted magnetic recording apparatus in which light irradiation is used to heat a magnetic recording medium and raise a temperature thereof to carry out magnetic recording, so that the very high density magnetic recording can be attained.

Magnetic recording apparatuses which magnetically record and reproduce information have been developed as large-capacity, high-speed, and inexpensive information storing means. Especially, recent advancement of hard disk drives (HDD) is remarkable to such an extent that recording density of finished commercial products reaches 10 Gb/in$^2$ (Giga bytes per square inches) or over while an internal data transfer speed is 100 Mbps (Mega bytes per second) or above, and a price in mega byte is dropped to several yens/MB. Such advanced high-density HDDs have resulted from total advancement of a variety of technical factors including signal processing, servomechanisms, heads, mediums, HDI, and the like. For these years, however, thermal disturbance in mediums has been regarded as a cause of impeding further enhancement of the density of the HDDs.

Enhancement of the magnetic recording density is implemented by miniaturization of recording cells (recording bits). However, since signal magnetic field derived from the medium is diminished due to the miniaturization of the recording cells, it is essentially required reducing medium noise in order to ensure a specified signal to noise ratio (S/N). The medium noise is caused by disturbance in magnetization transit section, and a degree of the disturbance is proportional to a unit magnetic reversal. Although the magnetic medium made of thin film of polycrystalline magnetized particles (hereinafter referred to as "poly-particle thin film" or "poly-particle medium") is used, the unit magnetic reversal in the poly-particle thin film consists of a numerous number of magnetized particles coupled to one another in a manner of exchange bonding when magnetic exchange interactions mutually affect those particles.

Under the conditions of the recording density ranging from several hundreds Mb/in$^2$ to several Gb/in$^2$, in the prior art, noise reduction in the medium has been implemented by diminishing the exchange interactions between magnetized particles and decreasing the unit magnetic reversal. As to recent magnetic mediums of the recording density of 10 Gb/in$^2$, the unit magnetic reversal is compressed down to two to three magnetized particles, and in the near future, it is expected that the unit magnetic reversal will be reduced to an equivalence to a single magnetized particle. Thus, in order to further reduce the unit magnetic reversal to ensure a specified S/N, a size of the magnetized particle itself must be reduced. Assuming that a volume of the magnetized particle is V, latent magnetic energy of the magnetized particle is expressed as KuV, where Ku is a magnetic anisotropic energy density of the particle. As a value V is decreased to reduce the noise, KuV is decreased, and this results in thermal disturbance in which thermal energy around the atmospheric temperature causes disturbance in recorded information.

According to the Analysis by Sharrock, a rate of the magnetic energy of the particle to its thermal energy, or KuV/kT (where Kt is a multiplication of k for a Boltzmann constant and T for an absolute temperature) should be a value of approximately 100, or otherwise, reliability in record lifetime would be deteriorated. As with Ku (2–3×10$^6$ erg/cc) of alloys containing CoCr radicals that have been used for medium magnetic film in the prior art, decrease in particle diameter for the purpose of noise reduction makes it more difficult to ensure durability to the thermal disturbance. Thus, recent approaches employ magnetic film materials such as CoPt and FePd that assume values of Ku of 10$^7$ erg/cc or over, but when Ku is simply raised to mutually establish both the reduction in the particle size and the durability to thermal disturbance, a further problem would be caused in relation with recording sensitivity. When Ku of the medium magnetic film is raised, record coercive force Hc0 of the medium is increased (where Hc0=Ku/Isb is defined, and Isb is a net magnetization of the medium magnetic film), and electric field required for saturation recording is increased in proportion to Hc0.

Recording electric field that is developed in the recording head and is applied to the medium depends upon conducting current flowing in recording coil, a material of recording magnetic pole, a shape of the magnetic pole, spacing, a type of the medium, a film thickness, and so forth, and allowing for a size reduction of a tip of the recording pole for the further density enhancement, developed electric field is finite For instance, even when a single pole head developing the largest electric field is combined with a vertical medium having soft magnetic lining, the resultant recording magnetic field will have an upper limit as high as at most 10 kOe (Oe is an abbreviated symbol of oersted). On the other hand, in order to attain sufficient durability to thermal disturbance under the condition of the particle diameter as minute as 5 nm that should be required for a future model of the medium having further enhanced density and further reduced noise, it is necessary to use the magnetic film material having a density Ku of 10$^7$ erg/cc or above, and in such a case, the magnetic field required for recording in the medium around the atmospheric temperature is considerably greater than 10 kOe, and thus, the recording becomes impossible. Thus, there arises a problem that even the recording is impossible when only Ku in the medium is simply increased.

As has been described, as to the magnetic recording in the prior art poly-particle medium, noise reduction, assured durability to thermal disturbance, and assured recording sensitivity trade off for one another, and the limit of the recording density depends upon such trade-offs.

SUMMARY OF THE INVENTION

A thermally-assisted magnetic recording system is a way exemplified to overcome the above-mentioned disadvantages. In the thermally-assisted magnetic recording system where a poly-particle medium is used, it is desirable that magnetized particles are used which are sufficiently minute to fully reduce noise while a recording layer is used which has a density Ku of a high level only around the atmospheric temperature so as to ensure durability to thermal disturbance. The recording is impossible in the medium having Ku of such a large value since around the atmospheric temperature, magnetic field required for the recording is far beyond magnetic field developed by recording head. In contrast, in the thermally-assisted magnetic recording system, a medium heating means such as optical beam is placed close to a recording magnetic pole, and in the recording operation, the medium is locally heated so that coercive force Hc0 in a heated section of the medium becomes as low as or lower than the recording magnetic field developed by the head.

Significant points in exemplifying this basic concept include (1) the recording magnetic field should have been applied, and the recording should have been completed before the medium is cooled while it undergoes a heating treatment or immediately after the treatment; (2) after the recording is completed, recording magnetization should be prevented from being reversed because of adverse effects of thermal disturbance till the medium is fully cooled; and (3) only a minute region as wide as the recording magnetic pole should be selectively heated without destruction of magnetization transition due to the thermal disturbance caused by undesirably heating adjacent tracks.

When the poly-particle medium is used, an additional modification is required so that the magnetization transition created in the track targeted for the recording should not be affected by the thermal disturbance in a trailing (downstream) region which has not been fully cooled, as well as preventing the adverse effects of the thermal disturbance upon the adjacent tracks; however, this type of medium is advantageous in that a record density depends upon a size of particles and that a speed of magnetic reversal is considerably high.

When a uniformly magnetized film or a non-crystalline magnetic film is used, this type of the medium is disadvantageous in comparison with the poly-particle medium in that the record density is determined depending upon a thickness of a magnetic domain wall (10 to 20 nm), and if the magnetic domain wall is to be displaced, a speed of data transfer is determined depending upon a speed of the displacement of the domain wall (several tens meters/s); meanwhile, a volume V of the magnetized particle is regarded as being infinite, and therefore, there is no need of allowing for the adverse effects of the thermal disturbance. In an embodiment using the uniformly magnetized film, similar to the embodiment using the poly-particle medium, magnetic coercive force around the atmospheric temperature in the medium is adjusted higher than that is in the magnetic field caused by the head, and the coercive force in the heated section of the medium is adjusted lower than that is in the magnetic field in the head.

A prior art approach similar to the thermally-assisted magnetic recording is disclosed in the Journal of Japan Applied Magnetics Vol. 23, No. 8, pp. 1901–1906 (1999), where an optical magnetic recording medium serves as the uniformly magnetized film. In this prior art embodiment, a heat source for heating the medium is light beam in far-field, and since a recording magnetic pole and the light beam source are oriented facing the medium, dual-side recording is difficult, and near-filed light cannot be used. Recording bit lengths depend upon the magnetic head while recording track widths depend upon light spot, and thence, a limit of the track widths is restricted to a size of the spot of far-field light. Even if shortwave laser is combined with a high NA lens, the limit of the track width is several hundreds nm, and this causes a difficulty in further enhancement of the record density.

Additionally, in this prior art, there is another disadvantage that since a light irradiating position is approximately identical with a recording magnetic field applying position, a speed of data transfer is determined depending upon a time required for heating the medium.

In order to implement further super high density thermally-assisted magnetic recording, a light emitting element must be replaced with development of near-field light through an aperture of a width shorter than wavelength of the light, and an efficiency of using the near-field light must be increased. However, such an attempt encounters another problem. For the aperture used to create the near-field light, an aperture is made in a material having a greater light absorption property. For that purpose, however, since the remaining portion other than the very part having the aperture must not transmit light, a material such as metal is used which has considerably large light absorption loss and also has a sufficient thickness so as not to transmit light.

However, light transmitted through the aperture cut out in a film of a finite thickness having a large light absorption property is affected by absorption of light by the aperture, and this results in insufficient light being produced when the light is emitted externally. The efficiency of using the near-field light is considerably low, and such a way cannot serve as a light source suitable for heating the medium in the thermally-assisted magnetic recording. It is necessary using a light source of high-power laser to raise light power, but when a film of a material such as metal having a large light absorption property is placed at an end facet of the high-power laser, heat generation due to the light absorption raise a temperature around the end facet to a considerably high level, which would cause thermal damage and deterioration of devices including magnetic devices that are placed close to the light emitting element.

The present invention is made allowing for the above-mentioned disadvantages and problems. Accordingly, it is an object of the present invention to overcome the above-mentioned disadvantages and problems associated with the light emitting element serving as a source of heating a recording medium and to provide a thermally-assisted magnetic recording head and a thermally-assisted magnetic recording apparatus which can implement super high density thermally-assisted magnetic recording by effectively heating a recording unit in the recording medium and raising its temperature.

According to the first aspect of the invention there is provided a thermally-assisted magnetic recording head capable of recording information magnetically on a recording medium, comprising:

a laser device configured to emit a light to heat the recording medium to reduce magnetic coercive force thereof;

a light absorbing film provided between the laser device and the recording medium, the light absorbing film having an aperture through which the light is applied to the recording medium; and a magnetic pole configured to record the information magnetically on the recording medium by applying recording magnetic field to the recording medium having the reduced coercive force, the aperture being adapted so that a polarizing direction of the light emitted from the laser device is approximately perpendicular to a direction along a longitudinal extension of recording tracks formed on the recording medium, and a width W1 of the aperture taken along the polarizing direction being smaller than a width W2 of the aperture taken approximately perpendicular to the polarizing direction.

According to the second aspect of the invention, there is provided a thermally-assisted magnetic recording apparatus capable of recording information magnetically on a recording medium, comprising:

a thermally-assisted magnetic recording head; and an actuating mechanism configured to move a recording medium and the magnetic recording head relative to each other, wherein the thermally-assisted magnetic recording head includes a laser device configured to emit a light to heat the recording medium to reduce magnetic coercive force thereof;

a light absorbing film provided between the laser device and the recording medium, the light absorbing film having an aperture through which the light is applied to the recording medium; and a magnetic pole configured to record the information magnetically on the recording medium by applying recording magnetic field to the recording medium having the reduced coercive force, the aperture being adapted so that a polarizing direction of the light emitted from the laser device is approximately perpendicular to a direction along a longitudinal extension of recording tracks formed on the recording medium, and a width of the aperture taken along the polarizing direction being smaller than a width of the aperture taken approximately perpendicular to the polarizing direction.

According to the third aspect of the invention, there is provided a thermally-assisted magnetic recording head capable of recording information magnetically on a recording medium, comprising:

a heating source configured to irradiate the recording medium with a heat beam to reduce magnetic coercive force of the recoding medium; and a magnetic pole configured to apply recording magnetic field to the recording medium having the reduced coercive force, a radiating portion emitting the heat beam of the heating source being in a receding position from a tip of the magnetic pole when seen from the recording medium, and the tip of the magnetic pole protruding between the heating source and the recording medium.

According to the forth aspect of the invention, there is provided a thermally-assisted magnetic recording apparatus capable of recording information magnetically on a recording medium, comprising:

a thermally-assisted magnetic recording head, and an actuating mechanism configured to move a recording medium and the magnetic recording head relative to each other, wherein the thermally-assisted magnetic recording head includes a heating source configured to irradiate the recording medium with a heat beam to reduce magnetic coercive force of the recoding medium, and a magnetic pole configured to apply recording magnetic field to the recording medium having the reduced coercive force, a radiating portion emitting the heat beam of the heating source being in a receding position from a tip of the magnetic pole when seen from the recording medium, and the tip of the magnetic pole protruding between the heating source and the recording medium.

According to the fifth aspect of the invention, there is provided a method of manufacturing a thermally-assisted magnetic recording head including a heating device configured to irradiate the recording medium with a heat beam to reduce magnetic coercive force of the recoding medium, and a magnetic pole configured to apply recording magnetic field to the recording medium having the reduced coercive force to record information thereon magnetically, comprising the steps of connecting a first substrate onto a second substrate, the heating device being to be formed in the first substrate while the magnetic pole is to be formed in the second substrate, fabricating the heating device on the first substrate, applying a material transparent to light in a path in the heating device, the heat beam being emitted through the path, and fabricating the magnetic pole on the second substrate above the heating device, above the material transparent to light, and around them, the material transparent to light having a distribution uneven thickness so that a tip of the magnetic pole protrudes between the heating device and the recording medium.

According to the sixth aspect of the invention, there is provided a method of manufacturing a thermally-assisted magnetic recording head including a heating device configured to irradiate the recording medium with a heat beam to reduce magnetic coercive force of the recoding medium, and a magnetic pole configured to apply recording magnetic field to the recording medium having the reduced coercive force to record information thereon magnetically, comprising the steps of fabricating the heating device on a first substrate, connecting the first substrate onto a second substrate, the heating device having been prefabricated in the first substrate while the magnetic pole is to be formed in the second substrate, applying a material transparent to light in a path in the heating device, the material transparent to light being over either the first substrate or the second substrate, and the heat beam being emitted through the path, and fabricating the magnetic pole on the second substrate above the heating device, above the material transparent to light, and around them, the material transparent to light having a distribution uneven thickness so that a tip of the magnetic pole protrudes between the heating device and the recording medium.

According to the seventh aspect of the invention, there is provided a method of manufacturing a thermally-assisted magnetic recording head including a heating device configured to irradiate the recording medium with a heat beam to reduce magnetic coercive force of the recoding medium, and a magnetic pole configured to apply recording magnetic field to the recording medium having the reduced coercive force to record information thereon magnetically, comprising the steps of fabricating the heating device on a first substrate, fabricating the magnetic pole on a second substrate, with its tip being directed upward, and connecting the heating device and the magnetic pole with the first substrate and the second substrate being opposed to each other, so that the tip of the magnetic pole protrudes between the heating device and the recording medium.

The present invention is characterized from another point of view in that light beam and recording magnetic field are applied from the same side of a medium, that a light emitting element and a magnetic recording element are integrated together, and that the light emitting element and a recording magnetic pole are deposited in this sequence one layer over another from near a (upstream) section of a medium along its moving direction. The light emitting element and the recording magnetic pole may be placed particularly close to each other.

Applying the light beam and recording magnetic field from the same side of the medium permits near-field light to be used, and this also permits a minute region of several tens nm in width to be selectively heated although such selective heating is impossible if the far-field light is used. The integrated configuration consisting of the light emitting element and the magnetic recording element permits the head to quickly move and seek except of an optical system that is complicated in configuration and massive and heavy, and this improved configuration has a significantly enhanced efficiency in use of light, compared with a light irradiation system using waveguide and fiber, and permits semiconductor laser generating power of several tens mw to be used therefor. The multi-layer configuration of the light emitting element and the recording magnetic pole deposited in series one over another from near the leading section of the medium along its moving direction and the positioning of the light emitting element and the recording magnetic pole close to each other permit an application of the recording magnetic field at a timing when coercive force Hc0 in the medium is sufficiently reduced.

The inventors of the present invention have found that the loss of laser light in the minute aperture depends upon a polarizing direction of the laser light and a shape of the aperture. Specifically, the loss is increased as an aperture width is reduced in a direction perpendicular to the polarizing direction of the laser light while the loss is not increased as the aperture width is reduced in the same direction as the polarizing direction. A review to exemplify the theory will be discussed hereinafter.

Thus, according to the present invention, an aperture in a light emitting facet of a semiconductor laser element is created facing the outside and shaped in rectangle elongated along a direction of a recording track, and light having an electric field perpendicular to a longer side of the rectangle is used, so as to obtain more minute spot light without increasing the loss of the line in the aperture. Hence, minimization of a diameter of the laser spotlight can be attained, and a light emitting element for the thermally-assisted magnetic recording can be implemented with an enhanced efficiency of the transmitted light through the aperture.

Consequently, the head and the medium can be quickly moved relative to each other, and even if the recording bit width is reduced, a sufficient amount of light can be directed to a minute recording unit of the recording medium, so that the recording unit is heated to raise its temperature to a level required for the thermally-assisted magnetic recording. In this way, according to the present invention, drastically super high density thermally-assisted magnetic recording head and recording apparatus can be provided.

With the configurations and modules of the present invention as mentioned above, a low noise poly-particle medium of which particles have a considerably minute diameter required for high density recording/reproducing can be sufficiently durable to thermal disturbance, and in a recording magnetic field applying unit, irradiation with light diminishes magnetic field required for magnetic reversal in the medium, so that a magnetic head suitable for practical use and high-speed recording can be implemented. A light emitting device and a recording/reproducing device are integrated to down-size the entire head and reduce its weight, and hence, the cost-reduced thermally-assisted magnetic recording head and apparatus perform quick seeking.

More particularly, according to the present invention, an efficiency in use of light transmitted through a minute aperture created in the light emitting device to the recording medium can be highly enhanced to such an extent that the light emitting device can heat a more minute recording unit in the medium and raise its temperature, and hence, a further enhanced density thermally-assisted magnetic recording apparatus can be implemented.

"Heating source" and "heating device" are used herein to express a concept of a usually integrated unit of a heating means, and such a unit is regarded as being materially or structurally different from the recording magnetic pole adjacent to the unit. For example, when "heating source" or "heating device" is semiconductor laser, semiconductor layers such as light guide layer, cladding layer, contact layer, and current block layer which are deposited on, above, and below active layer are part of "heating source" or "heating device". These are usually integrated to create semiconductor laser, and are apparently different and discriminated from magnetic materials used for the adjacent magnetic head.

When the "heating source" or "heating device" is an electron beam emitter, it is at an end of a unit from which electron beam is emitted. For instance, when electron beam is emitted from an emitter corn, the entire emitter corn is part of the "heating source" or "heating device". When the electron beam is emitted through an aperture in a wennelt, the wennelt is part of the "heating source" and "heating device".

"Heat beam emitting portion" is a light emitting unit from which laser light is emitted in a laser device while it is an end of the emitter corn in an electron emitter having the emitter corn.

In the present invention, a tip of the recording magnetic pole is separated from a medium surface by a spacing equivalent to medium protective film+glide height+lifted height+head protective film, and the sum is at most several tens nanometers, and in future, it will be reduced to 10 nm or below. According to the present invention, a distance between the heat beam emitting portion and the medium is settled to be longer than the spacing, and a difference obtained by subtracting the distance between the heat beam emitting portion and the medium from a distance between the tip of the recording pole and the medium is equivalent to a recess in the heat beam emitting portion. Heat beams emitted from the heating source propagate in space created by the recess and the spacing, and then irradiate the medium.

A septum having an aperture may be provided between the spaces defined the recess and the spacing, respectively, so that part of the heat beams is directed through the aperture to the medium, or otherwise, without such a septum, almost all the heat beams may irradiate the medium. An embodiment with the septum having an aperture is suitable for density enhancement, and an embodiment without the septum is advantageous in view of heating efficiency. When the septum having an aperture is provided, the aperture is formed to be approximately coplanar with an end face of the recording pole without making any recess.

The aperture or a center of the heat beams and the tip of the recording pole are positioned close to each other within several times as long as a width of the aperture or the flux of the heat beams in the same direction as an extension of the recording tracks. In this way, a temperature of the medium is sufficiently raised, and at timing when magnetic coercive force Hc0 is fully reduced, recording magnetic field can be applied.

In a most preferable and advantageous embodiment according invention, the heating source is a high-power end-facet light emitting laser device. A combination of such an end-facet light emitting laser device with the embodiments of the present invention permits a reduction in the distance between the center of laser beam and the tip of the recording pole without machining a laser device, and hence, the assured recording can be implemented without loss or reduction of sufficiently enhanced light emitting energy density.

The recess may be filled with a material transparent to heat beams. If the septum is not provided between the spaces defined by the recess and the spacing, respectively, the recording pole can be easily fabricated when the recess is filled with such light transmitting material. With the septum, after a non-transparent (preferably, reflective) material is applied to the plane of the light transmitting material where the aperture is to be formed, a minute aperture is created close to the center of heat beams. The non-transparent material may be formed by applying it from a side of medium facing surface (it may be called as air bearing surface) or a surface facing the medium after a magnetic device integrated with the optical devices is formed and chipped in a step of forming thin films, or by applying it after the heating device is fabricated in the step of forming thin films, and the non-transparent material is formed on the medium facing surface the heating device. The latter is preferable because a thickness of the non-transparent material is no longer added to the spacing, and this results in a recording resolution being enhanced.

The thermally-assisted magnetic recording head according to the present invention is manufactured in a manner as follows: After a magnetic recording device substrate and a heating device substrate are joined together, thin films are formed monolithically. Alternatively, after the heating device is fabricated, the heating device is connected to the magnetic recording device substrate, and thereafter, the magnetic recording device is fabricated in the step of forming thin films. Further alternatively, a substrate where after the magnetic recording device is fabricated, the heating device is fabricated is connected in a self-alignment fashion. In any way, the heat beam emitting portion of the heating device (i.e., light emitting surface of the laser device) is treated through thin film processing steps including RIE (reactive ion etching).

When the light emitting surface is finished through the thin film processing procedure such as RIE, a substrate such as an artic wafer substrate where the magnetic recording device is to be fabricated is superposed and connected with a substrate where the heating device is to be fabricated, or instead, it may be superposed and connected with GaAs wafer or sapphire with C-plane substrate when the heating source is a laser device. At the contact of those two substrates, there is a junction layer intervening therebetween and resisting heat higher than the temperature at which the heating device is deposited. The junction layer is fixed to the substrates by thermal diffusion bonding, metal fusing, ceramics bonding, or the like.

The heating device is deposited on the heating device substrate to isolate the heating device from other regions on the wafer so that the heating device assumes a shape of a stripe. While isolating the heating device, the light emitting surface is formed by means of RIE. After that, a material transparent to laser wavelength is applied in a recess defined between the light emitting surface and the medium facing surface, and then, the septum of reflective material is formed in the MEDIUM FACING SURFACE.

A length of the recess may be determined so as to be sufficient to embed the primary recording pole therein, and it is preferably 1 to 6 μm, and more preferably, 2 to 4 μm. A real thickness of the septum is greater than a value given for the device design, allowing for an eventual depth end process. At this point of time an optical aperture may be formed around the septum by means of FIB. The aperture may either be hollow and empty or be filled with the transparent material. Then, the recess and the septum are finished to settle the tip of the recording pole and the aperture close to each other.

Then, a recording device and a reproducing device are deposited one after another during the step of forming thin films. After the step of forming thin films is completed, the substrate undergoes chipping, sliding, and depth end processes, and eventually, the heating device integrated magnetic head device which is built in the the thermal magnetic recording apparatus of the present invention is completed.

After the heating device is fabricated in the latter (second) manner, the heating device is connected to the magnetic recording device substrate in a self-alignment fashion, and subsequently, the magnetic recording device is fabricated in the step of forming thin films; and a merit of such a procedure is that it offers a wide range of bonding materials and bonding methods for the magnetic recording device substrate and the heating device substrate.

When the heating device is a laser device, a temperature at which crystal growth is facilitated in the laser device is 100° C. or below while a temperature at which the magnetic recording device is deposited is 300° C. or below, and therefore, the junction of the substrates must be durable to the temperature of the deposition of the laser device in the first manner, but the junction may be durable to the temperature of the deposition of the magnetic recording device in the second manner. Specifically, after the heating device such as the edge-emitting laser device is deposited and it is isolated into a stripe-like shape, the laser device substrate may be connected to the magnetic recording device substrate so as to fabricate the magnetic recording device above the laser device.

In the third manner where the substrate where after the magnetic recording device is fabricated, the heating device is fabricated is connected in a self-alignment fashion, there is no need of connecting the prefabricated substrates to each other. This case is equivalent to a hybrid process in which the magnetic recording device and the heating device are fabricated by means of separate thin film formations, and the magnetic recording device is superposed with the recording pole at the uppermost surface to create a two-dimensional junction pattern such as a convex junction pattern over the primary magnetic pole.

With a mask used to form the convex junction pattern, a concave pattern is formed in the surface of the heating device, and the separate device films are connected to each other so that the convex pattern and the concave pattern are aligned with one another. Such a self-alignment junction permits the two hybrid devices to connect to each other with accuracy as high as PEP.

Another embodiment of the present invention is advantageous as explained below.

The heating source such as a laser device is recessed from the medium so that the tip of the recording magnetic pole protrude beyond it, and such a unique configuration permits the heating and magnetic recording on the medium at the optimum timing.

In the thermally-assisted magnetic recording apparatus, a heat beam irradiating position and a recording magnetic field applying position are settled close to each other without loss of energy emitted by the heating source such as a high-power edge-emitting laser device, and hence, even for the medium which shows a huge Ku around the atmospheric temperature to make the magnetic recording impossible, efficient and stable recording can be attained.

Thus, the present invention shoots any troubles caused in the prior art magnetic recording apparatuses which carry out recording in an environment of the room temperature, such as the one resulting from trade-offs of medium noise reduction (miniaturization of magnetized particles), assured durability to thermal disturbance in the medium (enhanced Ku), and assured high recording sensitivity (reduced coercive force Hc0).

Moreover, even when the medium is moved at high speed, the thermally-assisted magnetic recording is ensured, and the super enhanced density, extraordinarily high-speed thermally-assisted magnetic recording apparatus can be implemented, and this is industrially remarkably profitable.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 1A is a plan view of a recording/reproducing head seen from a side of a medium surface while FIG. 1B is a sectional view showing components including the medium taken along the line A–A' along a direction of tracks;

FIG. 2A is a schematic perspective view illustrating an arrangement of light emitting device in FIG. 1 while

FIG. 4A is a diagram showing a shape of a slit and a distribution of optical intensity in various directions while

FIG. 5A shows an exemplary recording where the medium is heated by ordinary light beam while FIG. 5B shows an exemplary thermally-assisted magnetic recording according to the present invention;

FIG. 23A is a sectional view of primary elements while FIG. 23B is a plan view thereof;

FIG. 26A is a perspective plan view showing primary elements of the means, FIG. 26B is a sectional view taken along the line A–A' thereof, and FIG. 26C is a graph showing a distribution of resistivity and refractive index at an end of wave guiding layer taken along the line A–A';

FIG. 28A is a plan view showing primary elements of the recording medium seen from a side opposed to it while FIG. 28B is a corresponding graph showing a distribution of optical intensity in a direction of a longer side of a track;

FIG. 35A is an enlarged view showing primary components surrounding a transparent material 525 of the thermally-assisted magnetic recording apparatus shown in FIG. 30 while

DETAILED DESCRIPTION OF THE PREFERRED EMBODIMENTS

Preferred embodiments of the present invention will be described in detail hereinafter while exemplary applications thereof will be taught together.

Embodiment 1

Figure 1A:
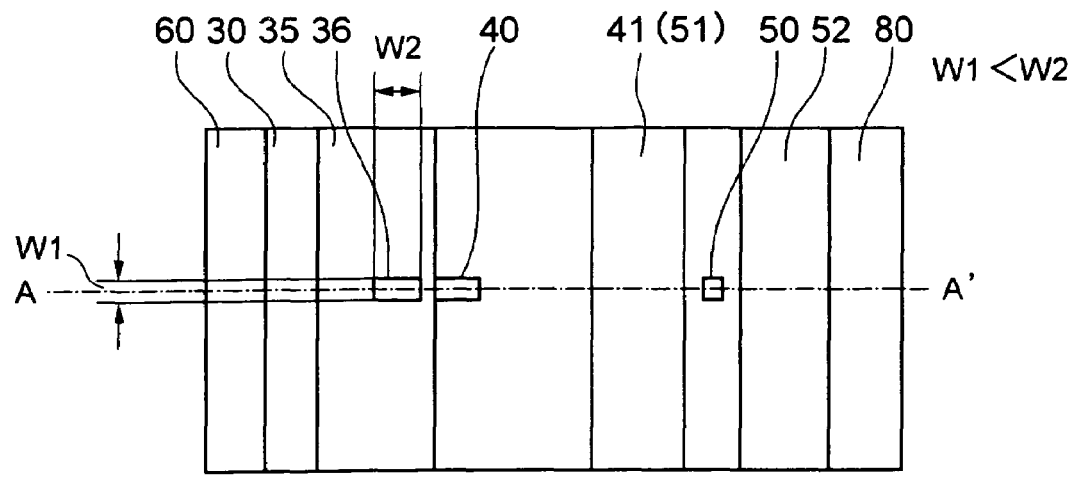
FIG. 1A and FIG. 1B are schematic diagrams showing an arrangement of a thermally-assisted magnetic recording apparatus of a first preferred embodiment according to the present invention.
Figure 1B:
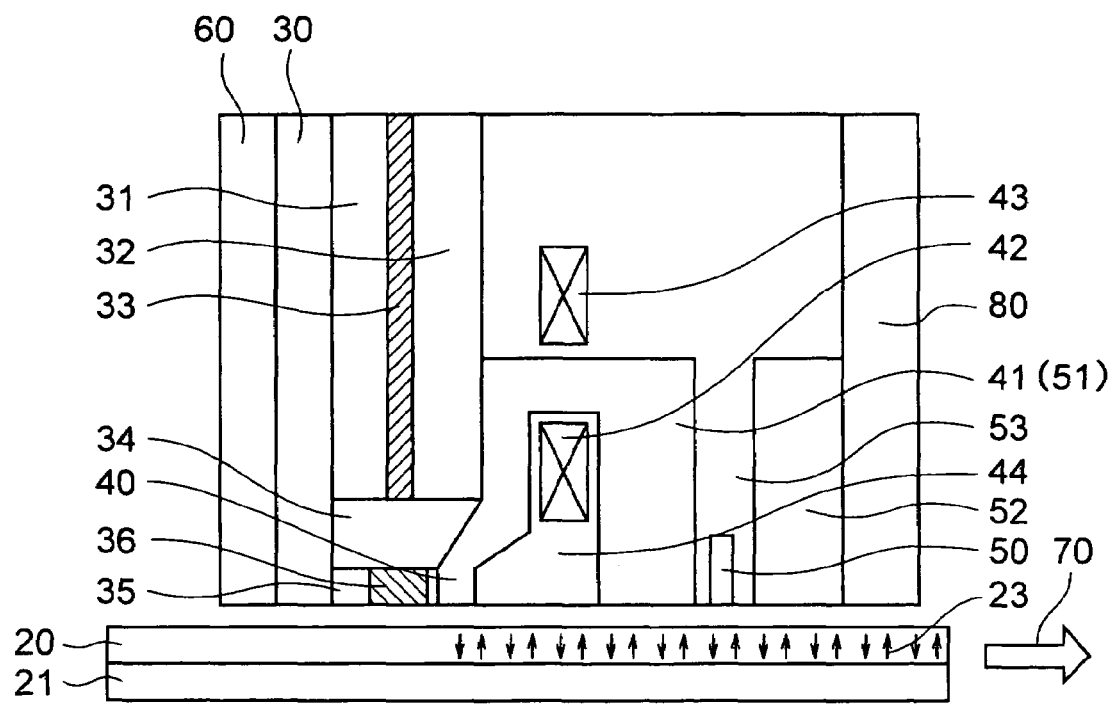

FIGS. 1A and 1B are schematic diagrams showing a thermally-assisted magnetic recording apparatus of a first preferred embodiment according to the present invention. FIG. 1A is a plan view illustrating a recording/reproducing head seen from a recording medium while FIG. 1B is a sectional view showing the recording/reproducing head including the recording medium, taken along the line A–A' corresponding to a direction of recording tracks.

In the figures, reference numerals 20 to 22 denote primary portions of the recording medium while the remaining reference numerals all denote primary components of the recording/reproducing head. The primary components of the head include a light emitting device comprised of elements designated by reference numerals 30 to 36, a magnetic recording device comprised of elements designated by reference numerals 40 to 44, a magnetic reproducing device comprised of elements designated by reference numerals 50 to 53, and a protective coating designated by a reference numeral 80. A reference numeral 70 denotes directions of movement of the recording medium relative to the head. The magnetic reproducing device may be provided in a magnetic head separated from a magnetic recording head.

The head according to the present invention has a configuration, as shown in the diagrams, where the light emitting device, the magnetic recording device, and the magnetic reproducing device are arranged in series from near the upstream (leading) section of the apparatus. Upstream (referred to as "leading" hereinafter) section and downstream (referred to as "trailing" hereinafter) section correspond respectively to relative positions of the recording/reproducing in the recording medium to the head. Terms "leading edge" and "trailing edge" apply hereinafter to express any upstream and downstream ends along tracks in conjunction with any components of the head (i.e., the light emitting device, an optical aperture, recording poles, the reproducing device, etc.). In the figures, to avoid complexity, details and particulars of the configurations of the reproducing device and an electrode trap are omitted in the drawing.

In the configuration of the magnetic recording device depicted in FIGS. 1A and 1B, the reference numerals 44, 41, and 40 respectively denote an insulating layer (e.g., $SiO_2$ film), a magnetic pole for a return path (e.g., NiFe film), and a tip of the recording pole (a primary pole of Fe alloy, for example) while the numerals 42 and 43 denote Cu coils which develop magnetic field used for recording.

In the configuration of the magnetic reproducing device depicted in FIGS. 1A and 1B, 51, 53, 50, and 52 respectively designate a shield of the leading section (e.g., of NiFe film), a reproducing gap (e.g., of $SiO_2$ film), a GMR (giant magnetoresistive effect) reproducing device (e.g., of CoFe/Cu/CoFe/FeMn deposited film), and a shield of the trailing section (e.g., of NiFe film). Opposite ends of the GMR device are coupled to hard bias film such as CoPt and to metal electrode film although these films are not shown in FIG. 1A. A head substrate 60 (ceramics substrate such as AlTiC, sapphire substrate, and the like) has the light emitting device, the magnetic recording device, and the magnetic reproducing device respectively deposited thereon one over another in this order. A protective film 80 for the entire head may be of $Al_2O_3$ film of several tens micrometers (μm) in thickness.

In the configuration of the medium in the FIG. 1B, the reference numerals 20 and 21 respectively denote a magnetic recording layer of vertically magnetized poly-particle thin film which may be of $CoPt$—$SiO_2$ of 20 nm in thickness, and a soft magnetic base layer of NiFe of 100 nm in thickness. In the drawings illustrating such a medium configuration, a substrate, a protective film, and a lubricating film are omitted.

The light emitting device will now be described in detail.

Figure 2A:
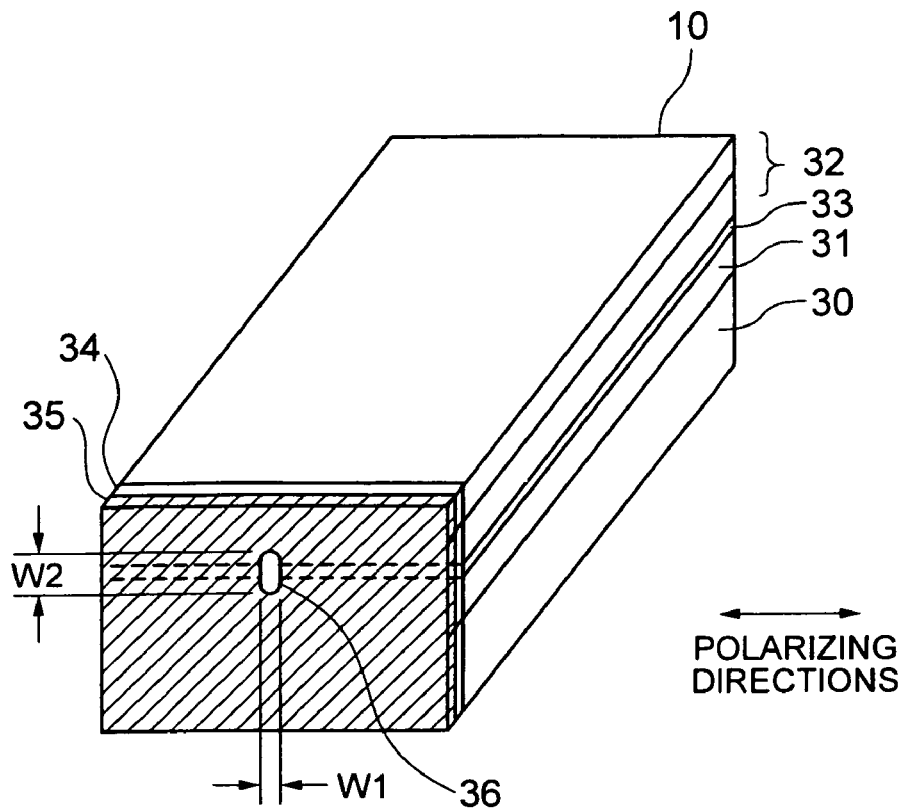
Figure 2B:
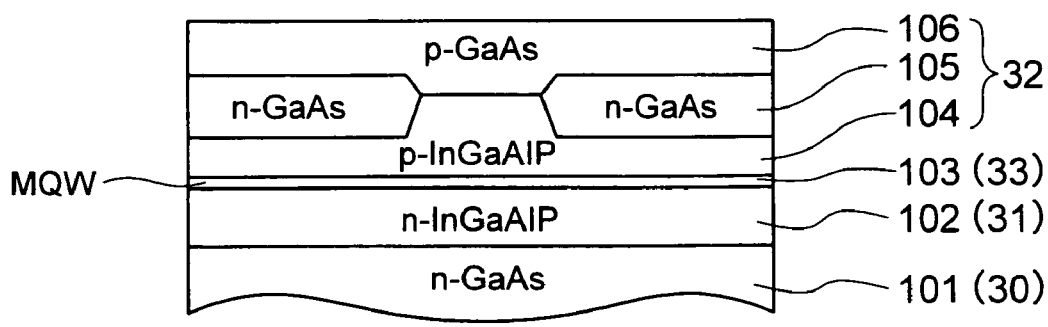
FIG. 2B is a conceptual view showing an exemplary sectional configuration of a laser.

FIG. 2A is a perspective schematic view illustrating an arrangement of the light emitting device shown in FIGS. 1A and 1B while FIG. 2B is a conceptual view illustrating an exemplary cross-sectional configuration of a laser. The light emitting device is comprised of a semiconductor laser device 10, an active layer 33, a light absorbing film 35, an insulating film 34, and an aperture 36 formed in the light absorbing film 35. In addition to that, it also includes an LD substrate material 30 consisting of n-type GaN or the like. The aperture 36 is created by means of treatment from a surface opposite to the medium of the head through FIB (Focused Ion Beam) etching, and it is hollow deep inside.

The laser is oscillated in TE (transverse-electric) mode where laser light is polarized in parallel with a junction surface, that is, an electric field vector is directed horizontally.

Referring to FIG. 2B, the laser is comprised of an n-type GaAs substrate 101 (30), an n-type InGaAlP cladding layer 102 (31), a p-type InGaAlP cladding layer 104, an active layer 103 (33) of multiple quantum well (MQW) of GaAlAs, an n-type GaAs electric current break layer 104, and a p-type GaAs contact layer 105. The cladding layer 104 in a double heterogeneous configuration is contoured into mesa, and its side faces are embedded with the current break layer 104 so that the laser functions as an embedded laser. The laser device is not limited to the exact example shown in FIG. 2B, but a variety of modifications and variations are possible.

The insulating film 34 include $SiO_2$, $TiO_2$, $Ta_2O_5$, α-Si (amorphous silicon), and the like. The insulating film also functions as a protective film for end surfaces of the semiconductor laser device. As for materials of the light emitting film 35, various metals such as Au, Ag, Cu, Al, Pt, Ti, or the like may be used.

The above-mentioned metals commonly have significantly great absorption coefficients, respectively, and therefore, when they are as thick as 100 nm, they have almost no light permeability in any region therein without an aperture. However, loss of transmitted light through such an aperture has not been fully analyzed. An ordinary minute aperture causes a great loss of light transmitted through the aperture, and this leads to a problem of extremely reduced efficiencies.

In an aspect of the present invention, an aperture width W1 along a polarizing direction of laser light is shorter than an aperture width W2 in a direction perpendicular to the polarizing direction. Specifically, it is desirable that the aperture width W1 in the same direction as the polarizing direction of the laser light is smaller than ½ of oscillation wavelength of the semiconductor laser and that the aperture width W2 perpendicular to the polarizing direction is larger than the aperture width W1. In this way, the loss of the transmitted light through the aperture can be significantly reduced. A theory of this aspect of the invention will be explained below.

Figure 3A:
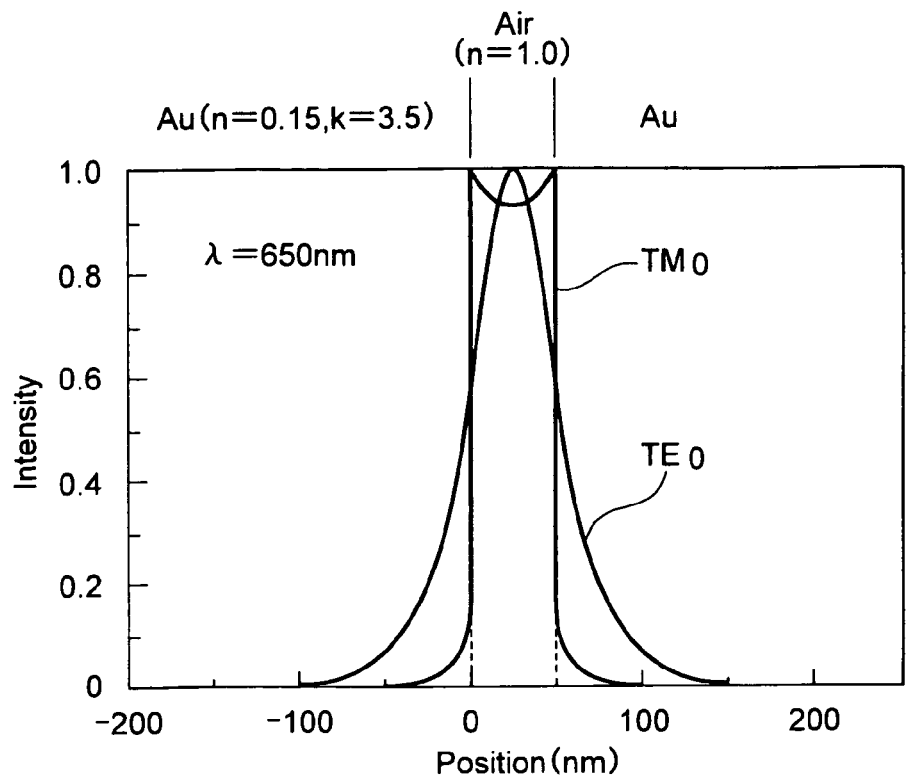
FIG. 3A and FIG. 3B are graphs showing computation results on wave guiding mode in a metal waveguide.
Figure 3B:
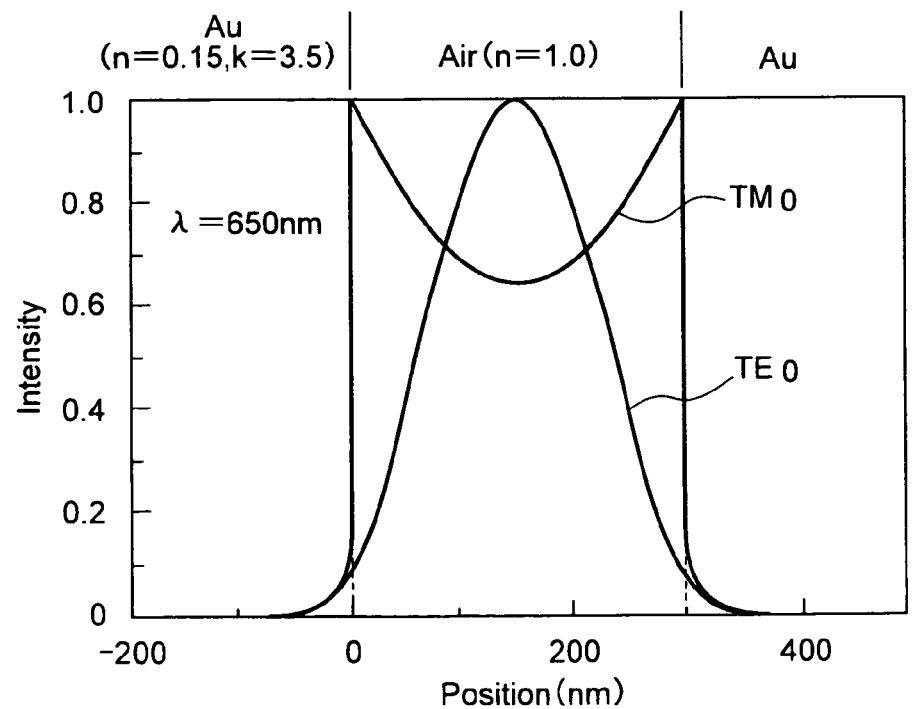

FIGS. 3A and 3B are graphs showing computation results of wave guiding mode in a metal waveguide. For the purpose of simplification, the wave propagation mode was computed under a condition where a slit of 50 nm in width was formed as the minute aperture in gold (Au). FIG. 3A shows a case in which the aperture width is as relatively small as 50 nm while FIG. 3B shows another case in which the aperture width is as relatively large as 300 nm.

As can be seen in FIGS. 3A and 3B, a distribution pattern of the mode considerably varies from TE mode (in which a direction of the electric field vector is in parallel with boundary lines at opposite ends of the slit) from TM (transverse magnetic) mode (in which a direction of a magnetic field vector is in parallel with the boundary lines at the opposite ends of the slit). Terms "TE mode" and "TM mode" used herein are definitions about the slit but not about the oscillation mode of the laser device.

Optical intensity allocated in a vertical axis in the figures expresses a component of propagation directions of a pointing vector, and a discrete property of a component perpendicular to the boundary plane of the electric field vector results in discreteness of the optical intensity in the TE mode at the interface between the air and the metal. Specifically, since a quantity that brings about continuity is the component perpendicular to the boundary plane of the electric field vector that is divided by $n^2$ (n is a refractive index), the optical intensity is remarkably reduced in the metal which has a large absolute value of a real part of $n^2$.

On the other hand, since the component of the electric vector perpendicular to the boundary plane is zero in the TE mode, a coefficient of $1/n^2$ is not applied, and this brings about a mode in which waves penetrate greatly into the metal.

As shown in FIG. 3B, under the relatively large slit (aperture) width, such wave penetration into the metal is not considerable. In contrast, with such a small slid width as illustrated in FIG. 3A, the wave penetration into the metal becomes greater in the TE mode. Compared with the TE mode, the "penetration" ratio is greater. A zone of the penetration into the metal is suffered from a greater absorption loss, and this brings about a wave propagating mode having a large loss. However, even with a small slit width in the TM mode, a degree of the penetration into the metal is minute, and hence, the resulting loss of the wave propagation mode is considerably small.

The embodiments shown in FIGS. 1 and 2 advantageously employ the above-mentioned property. Specifically, such a property that even with a reduced slit width in the same direction as the polarizing direction of the laser light, the resulting loss would not rise is utilized, and hence, the aperture width in the same direction can be reduced to obtain minute spot light of an enhanced efficiency.

Figure 4A:
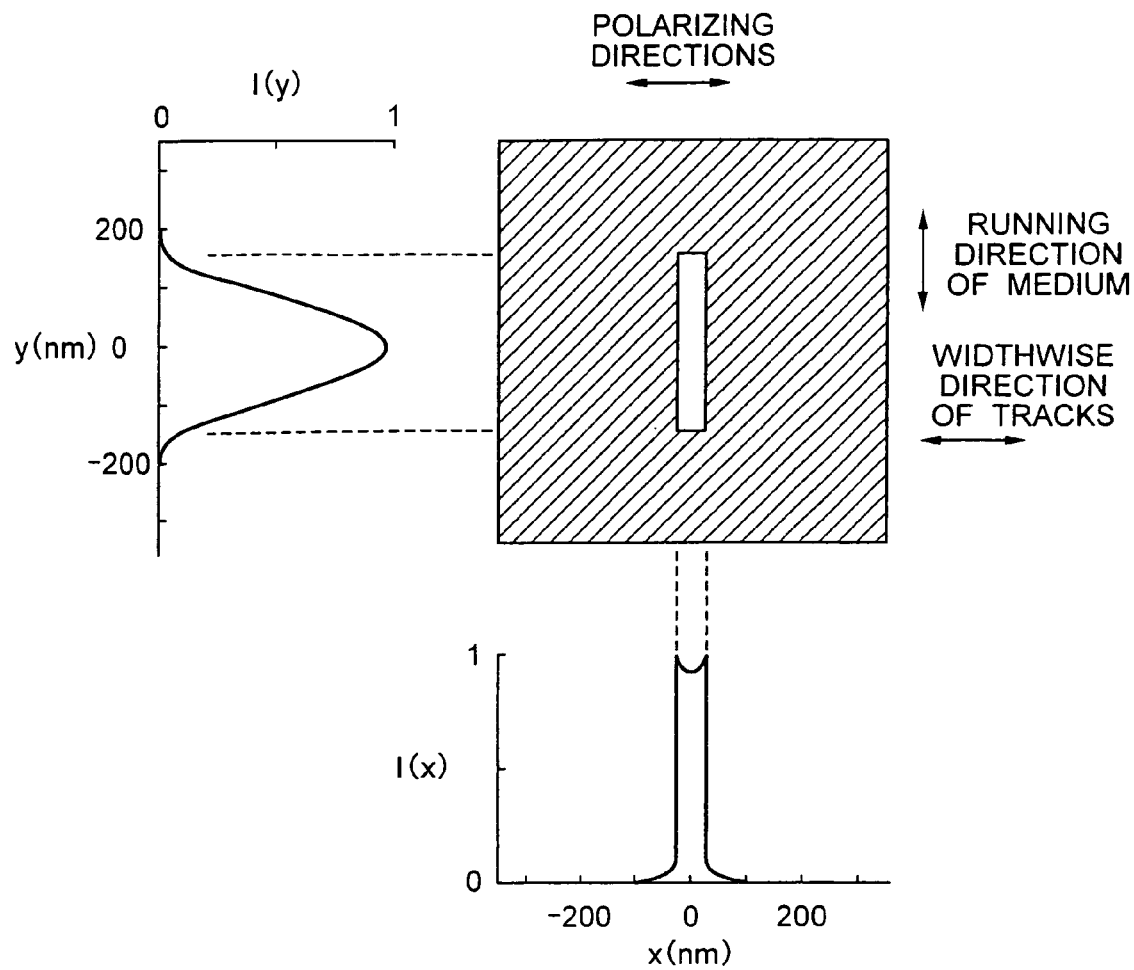
Figure 4B:
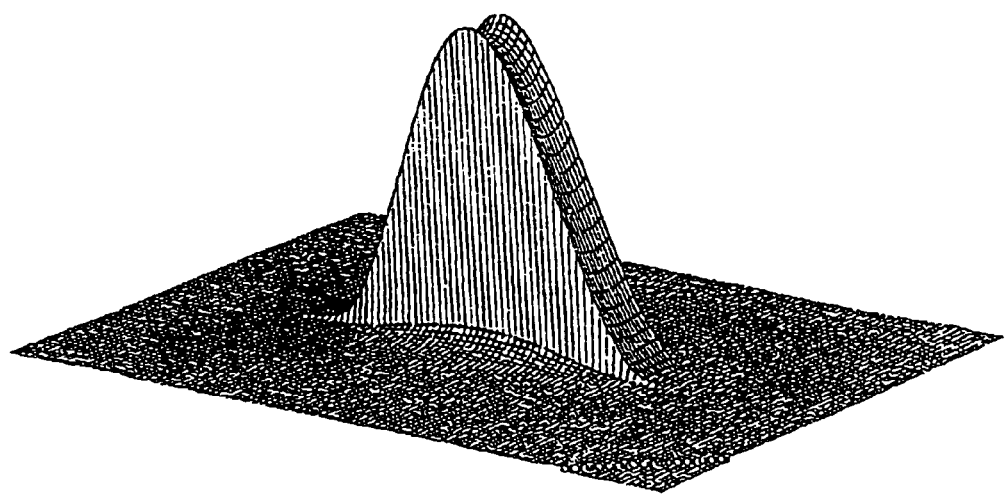
FIG. 4B is a graph three-dimensionally showing the distribution of the optical intensity.

FIG. 4A is a diagram showing a shape of the slit and a distribution of the optical intensity in various directions. FIG. 4B is a diagram showing three-dimensional distribution of the optical intensity.

Relative to the polarizing direction of the laser light, the slit is shaped and arranged as shown in FIG. 4A, and thus, the wave propagation mode can be implemented which is considerably decreased in the loss even with a minute aperture equal to or under the wavelength. This means that the loss of the light due to the penetration into the metal surrounding the aperture can be highly reduced to collect the light with drastically enhanced efficiency and direct the light to the medium.

Moreover, according to the present invention, magnetization transition of the medium is linearly formed to improve a reproduction resolution.

Figures 5A, 5B:
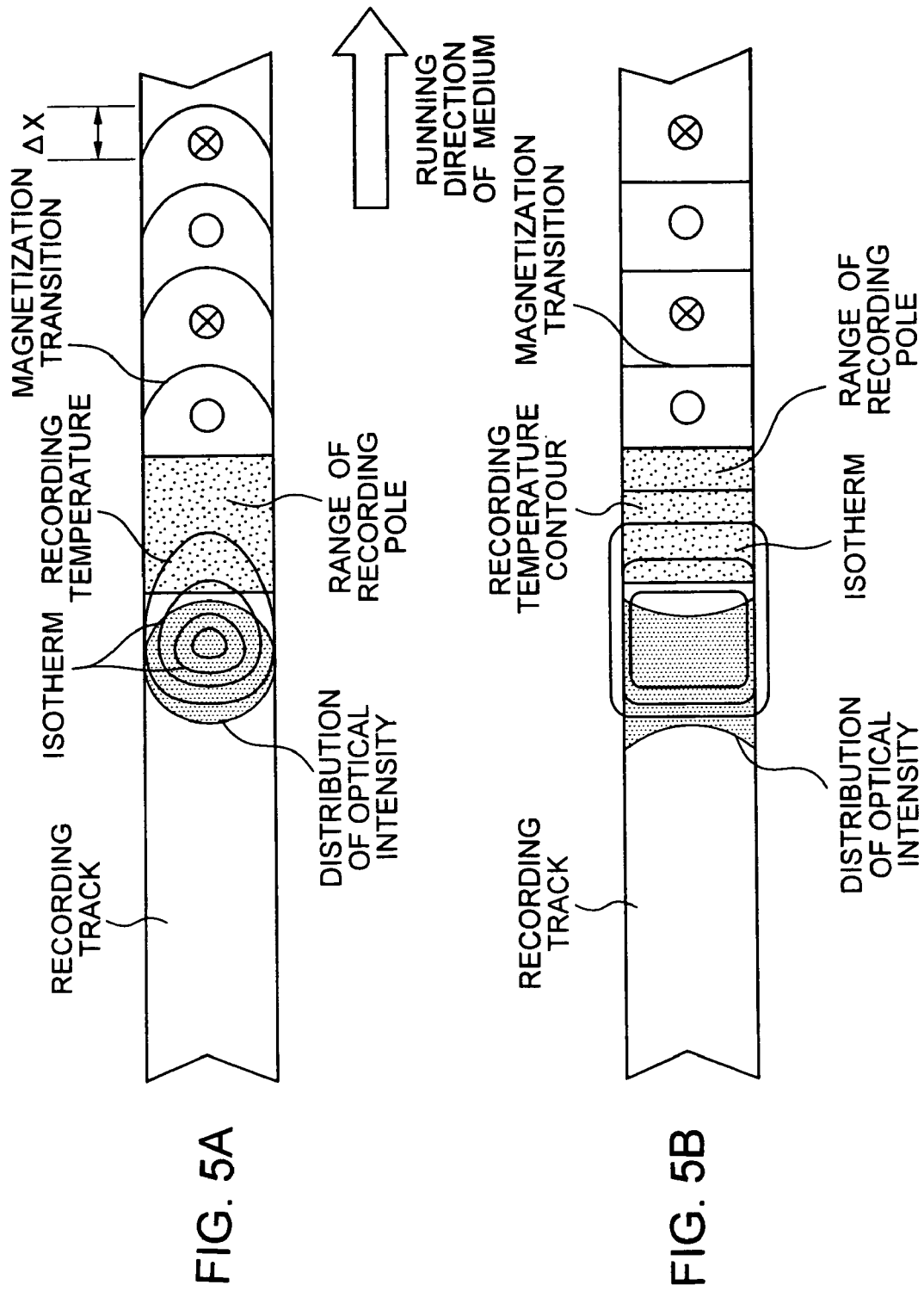
FIGS. 5A and 5B are conceptual views showing magnetization transition developed in the recording medium.

FIGS. 5A and 5B are conceptual views showing the magnetization transition formed in the recording medium, and FIG. 5A depicts a case in which the recording is performed by heating with ordinary light beam while FIG. 5B depicts a case of thermally-assisted magnetic recording.

As shown in FIG. 5A, the medium is heated by the ordinary light beam to effect magnetic recording, and the magnetization transition is curved into a teardrop-shape. This is because the ordinary light beam assumes a Gaussian intensity distribution, and when such light beam heats the medium, a temperature distribution which is curved corresponding to the Gaussian intensity distribution is developed in the medium.

Thus, when a recording magnetic field is applied from a recording magnetic pole to the medium to create the magnetization transition, the magnetization transition results in being curved. Since the magnetic gap is normally created linearly in a reproducing unit of the magnetic head, a greater curvature ΔX of the magnetization transition of the medium results in a reduced production resolution.

On the contrary, according to the present invention, the magnetization transition can be created linearly as in FIG. 5B. This is because, as shown in FIG. 5B, the optical intensity in a surface of the medium is distributed in an inwardly curved pattern, and thermal emission over the medium from a heating unit to its periphery results in a uniform temperature distribution assuming a pattern which is almost linear. Such an effect will be recognizable from a unique light intensity distribution as illustrated in FIGS. 4A and 4B.

In this way, as a result of creating a linear isotherm, the magnetization transition resulting from the magnetic recording can be shaped linearly to produce an enhanced recording resolution.

Furthermore, according to the present invention, as illustrated in FIGS. 4A and 4B, the light intensity distribution along a widthwise direction of the recording tracks (a direction perpendicular to the running direction of the medium) can be considerably sharp and steep. Thus, the aperture facing the tracks is dimensioned to be approximately equivalent to the track in width, so that "cross erase"

developed by undesirable irradiation of an adjacent track with light can be assuredly and easily diminished.

FIGS. 3 and 4 shows the embodiments of using the Au light absorbing thin film where the minute aperture is formed, and such Au film can be replaced with other metal films such as silver (Ag) film.

Figure 6:
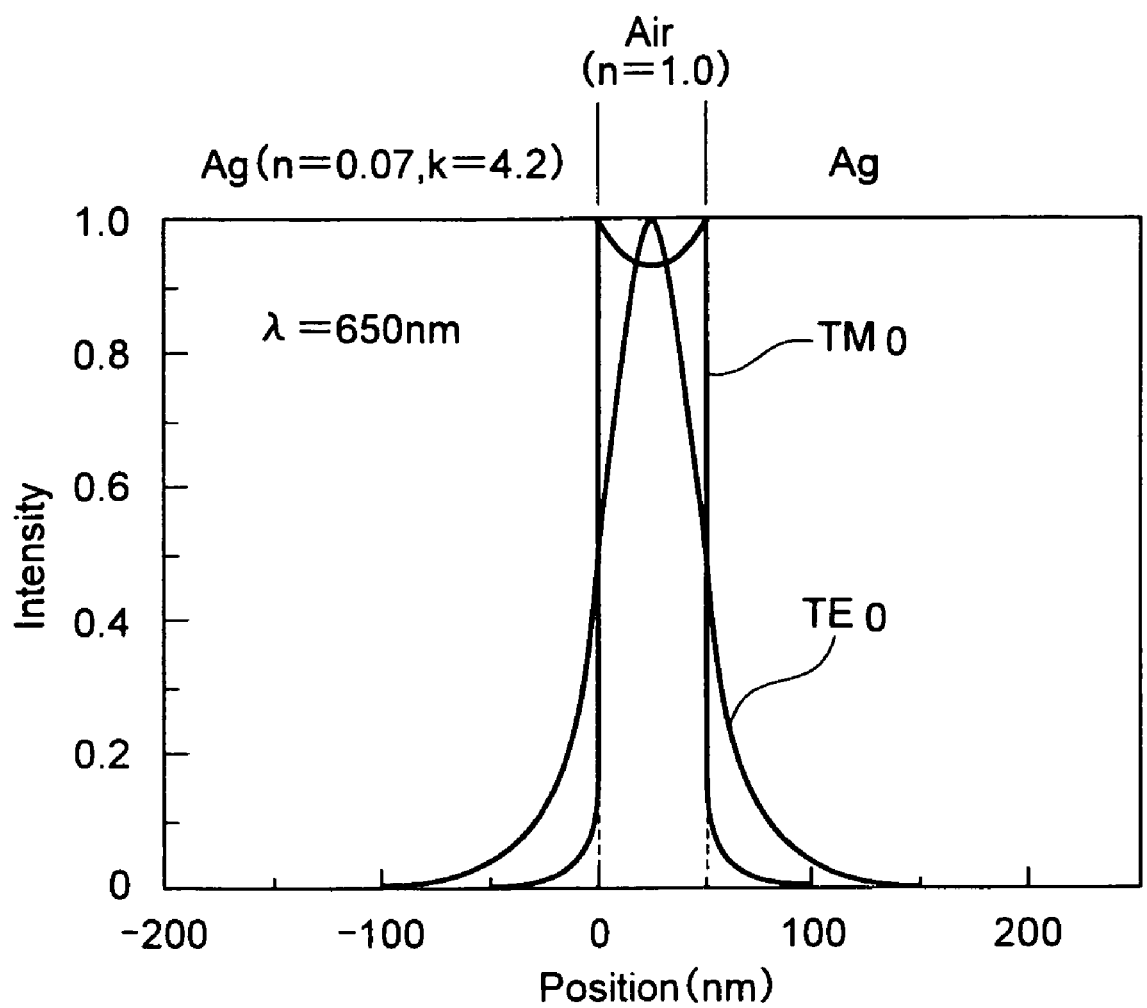
FIG. 6 is a graph showing an exemplary analysis of the wave guiding mode using Ag.

FIG. 6 is a graph showing an exemplary analysis of the light propagation mode, using Ag. As can be seen, wave penetration into the Ag film is also minute in the TM mode, and this leads to a minute optical loss.

Figure 7:
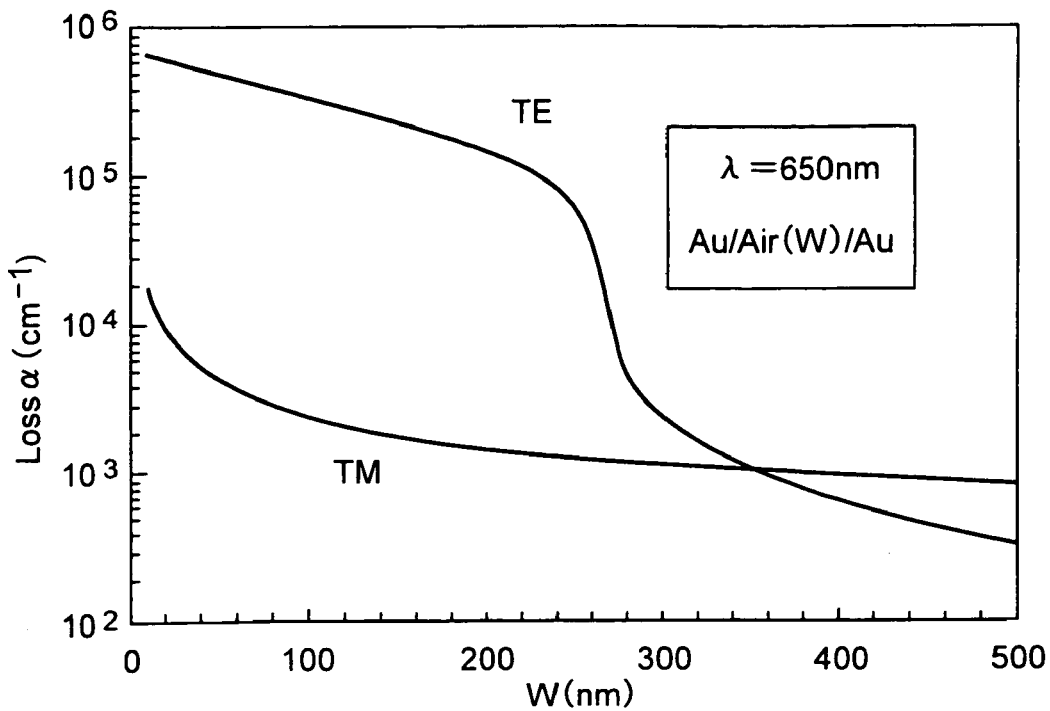
FIG. 7 is a graph showing exemplary results of computing dependency of a light loss in the wave guiding mode within an Au waveguide upon a slit width W.
Figure 8:
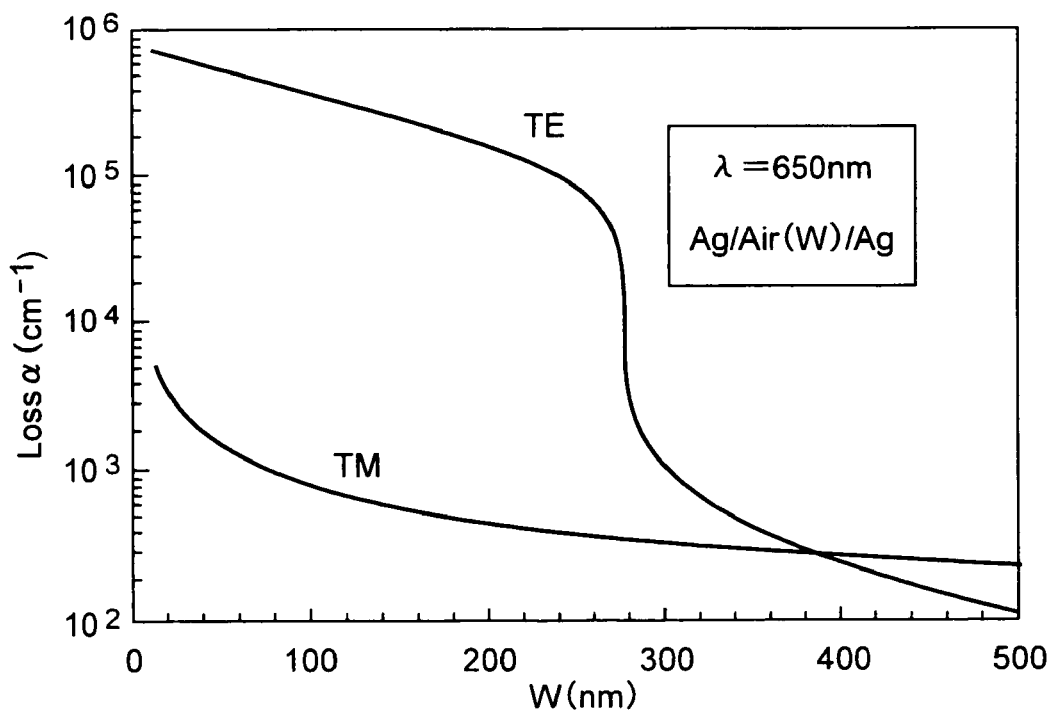
FIG. 8 is a graph showing results of computing the light losses in both TE mode and TM mode, respectively, using a light absorbing film of Ag.
Figure 9:
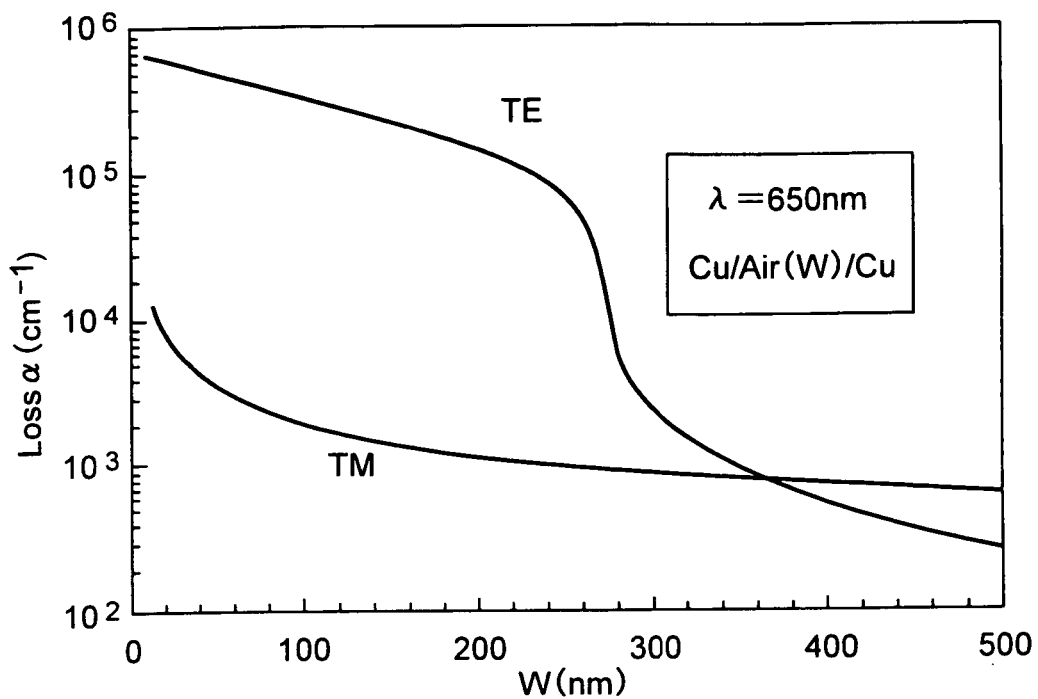
FIG. 9 is a graph showing results of computing the light losses in both the TE mode and the TM mode, respectively, using the light absorbing film of Cu.
Figure 10:
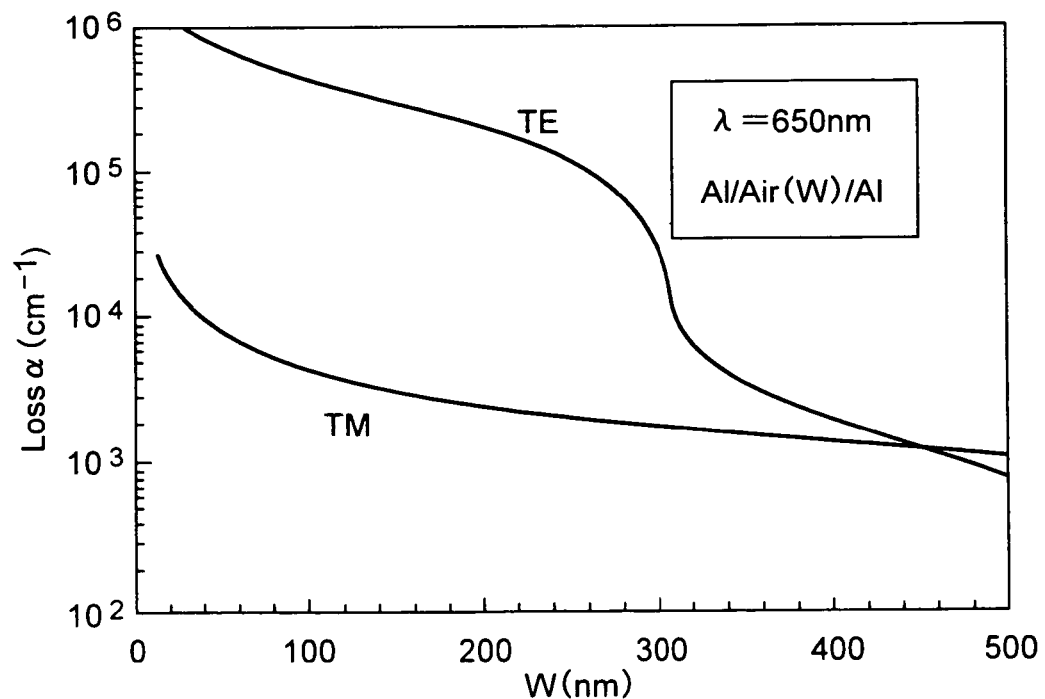
FIG. 10 is a graph showing results of computing the light losses in both the TE mode and the TM mode, using the light absorbing film of Al.
Figure 11:
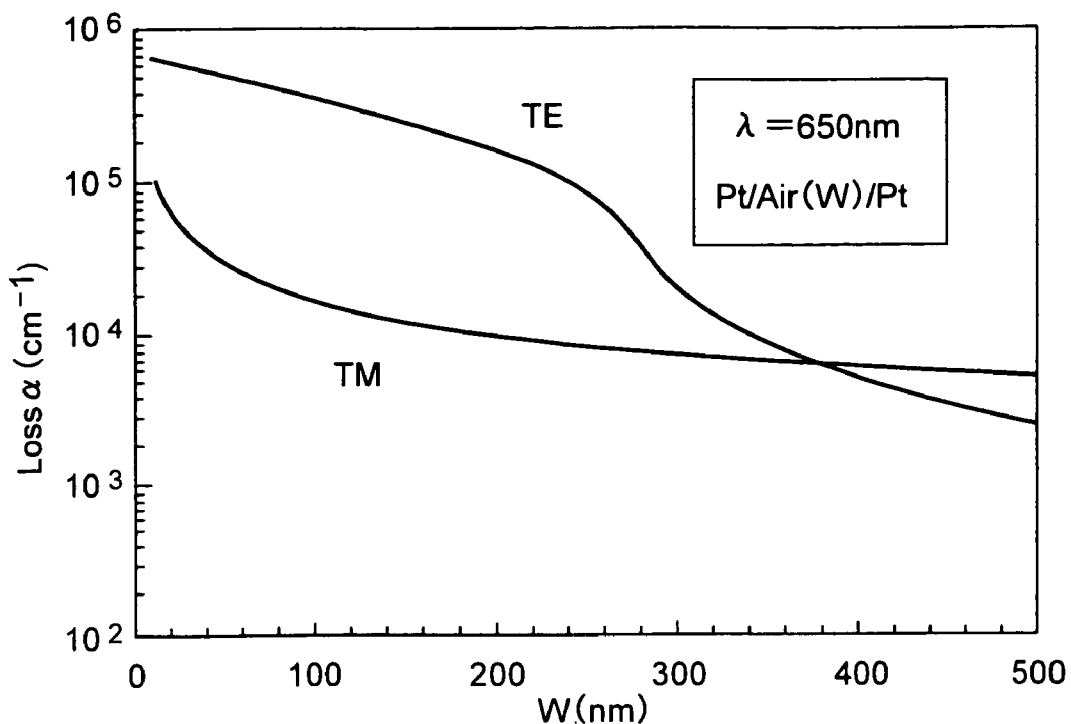
FIG. 11 is a graph showing results of computing the light losses in both the TE mode and the TM mode, using the light absorbing film of Pt.
Figure 12:
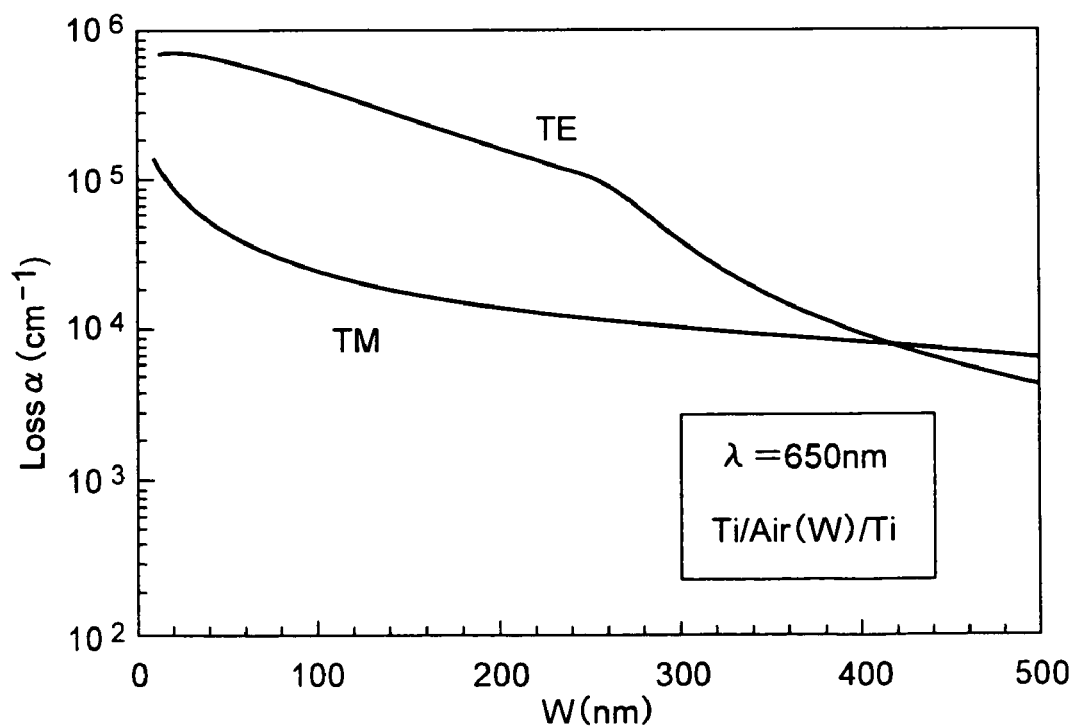
FIG. 12 is a graph showing results of computing the light losses in both the TE mode and the TM mode, using the light absorbing film of Ti.
Figure 13A:
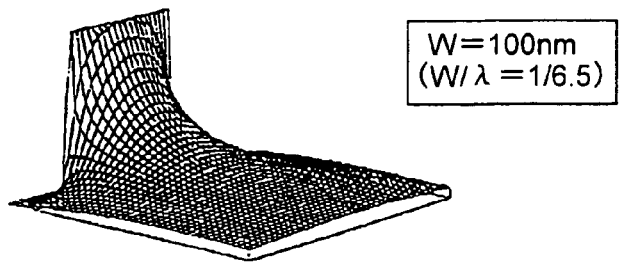
FIGS. 13A through 13H are graphs showing a distribution of optical intensity after the light gets out of a slit into the air.
Figure 13E:
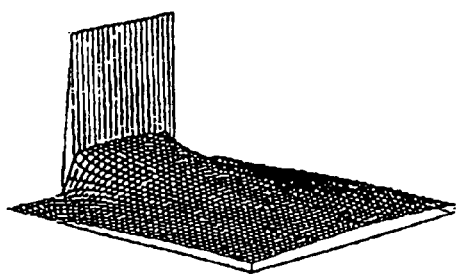
Figure 13B:
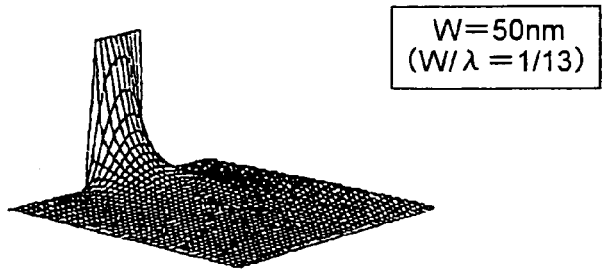
Figure 13F:
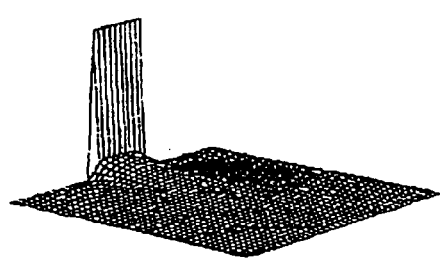
Figure 13C:
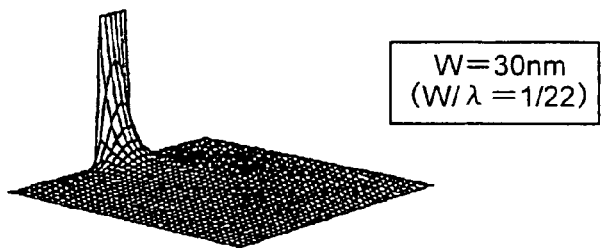
Figure 13G:
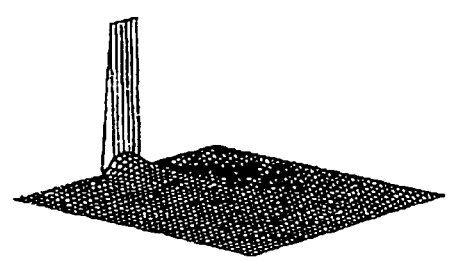
Figure 13D:
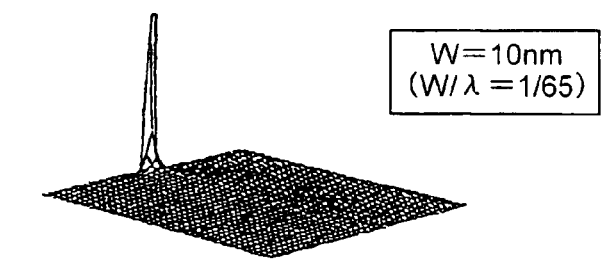
Figure 13H:
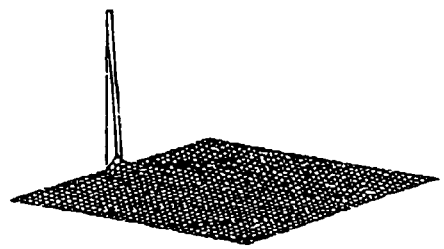

FIG. 7 is a graph showing an exemplary calculation of dependency of the loss by the wave propagation mode in the Au waveguide upon a slit width W. As will be recognized in FIG. 7, in the TM mode, a region of a smaller slit width produces an amount of the loss two figures taken down from that observed in the TE mode. Specifically, it is quantitatively appreciated that, as for a direction along a narrower aperture width, using the TE mode in which polarized wave is directed in perpendicular to sides of the aperture causes the loss to be considerably small.

For instance, when the aperture (slit) of 50 nm in width is cut out in the Au of 100 nm, the resultant transmittance is observed in FIG. 7 as follows:

Regions without the aperture 0.001
Transmittance in TE mode 0.006
Transmittance in TM mode 0.956

Thus, the light absorbing film of such a thickness sufficiently damps light while the TE mode allows light to be transmitted through the aperture almost without loss. On the other hand, the TE mode permits almost no light to be transmitted through the slit of such a width. As can be recognized in FIG. 7, the slit width of 260 nm or above enables the TE mode to be effective in reducing the loss.

As has been detailed above, the aperture is shaped, having a smaller width in the direction the same as the polarizing direction of the laser light and a greater width in the direction perpendicular to the polarizing direction; that is, the aperture is configured as in FIGS. 2 and 4A so as to obtain the light spot of a minute size with a considerably reduced loss.

In such a preferred embodiment, since the laser light is polarized horizontally, the aperture is shaped so as to be longitudinally longer. More specifically, a horizontal aperture width W1 is smaller than ½ of the oscillation wavelength while a vertical aperture width W2 is greater than that. From the above-mentioned calculation results, it is apparent that the loss of the transmitted light through the aperture is considerably small even with the reduced width W1 of 50 nm. Thus, the light spot of a beam size as small as that one figure taken down from the wavelength can effectively heat the recording unit of the recording medium and raise its temperature.

A light absorbing film 12 is made not only of Au as mentioned above, but also other metals. FIGS. 8 to 12 are graphs showing computation results of losses in both the TE mode and the TM mode where Ag, Cu, Al, Pt, and Ti are used for the light absorbing film. The loss in the TM mode is smaller than that is in the TE mode, and a difference between such losses in both the modes is as much as or more than two figures taken up or down from one another as to films of Ag, Cu, Al and Au as in the Au film, and it will be appreciated that they all function highly effectively as the light absorbing film according to the present invention.

The distribution of the optical intensity after the light has passed through the aperture will be further detailed.

FIGS. 13A through 13H are graphs showing the optical intensity distribution after the light has passed through the slit into the air. Specifically, FIGS. 13A to 13D illustrate the total intensity distribution of the light including evanescent light with varied slit width W of 100 nm, 50 nm, 30 nm, and 10 nm, respectively, while FIGS. 13E to 13H are graphs showing components of the propagating light or components of the pointing vector as with such varied light.

As will be recognized in those graphs, the components of the propagating light become larger as a rate W/λ of the slit width W to the laser wavelength λ is increased. Practically available portion of the light primarily include the components of the propagating light, and therefore, a greater W/λ is preferable. On the other hand, in order to obtain the minute spot, W must be decreased. Thus, a smaller value of the wavelength λ of the laser light, namely, a shorter wavelength is more advantageous in obtaining the minute spot as in a conventional optical system.

However, when the light from the light source is of shortwave, the optical system must be provided with an appropriate absorbing film.

Figure 14:
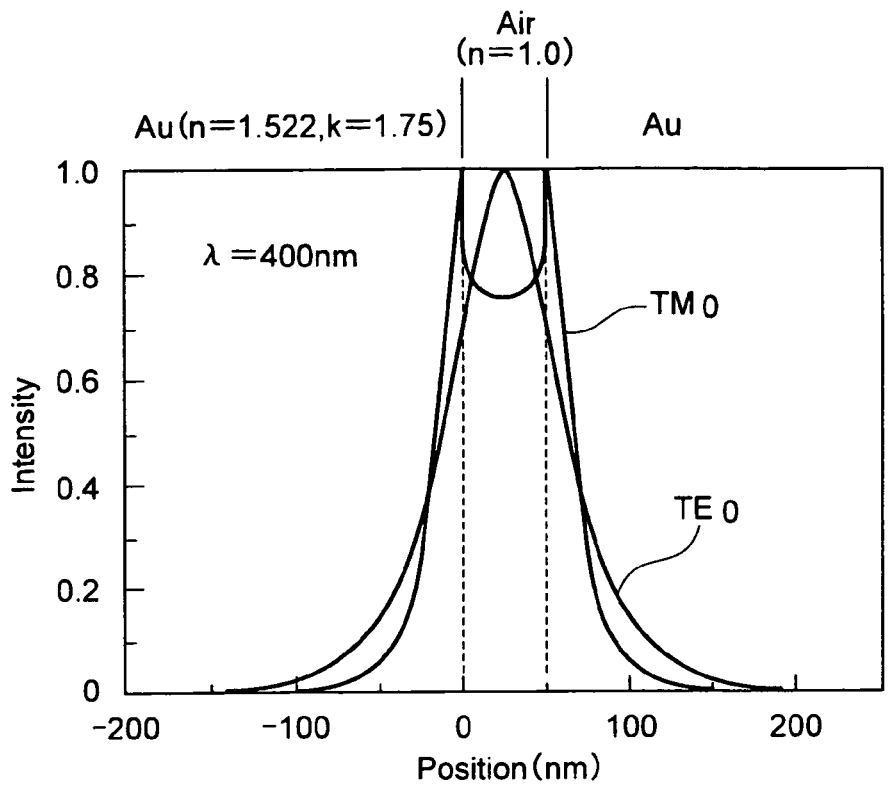
FIG. 14 is a graph showing conditions in the wave guiding mode with a light source wavelength of 400 nm, using the Au light absorbing film having a slit illustrated in FIG. 3.

FIG. 14 is a graph showing conditions of the wave guiding mode with the light from the light source of 400 nm in wavelength being passed through the slit in the Au film as illustrated in FIGS. 3A and 3B. It should be noted that even with the same Au film, unlike the case in FIGS. 3A and 3B, the penetration therein is greater in the TE mode. This is because a real portion of $n^2$ of gold is smaller than 1 with the light having the wavelength of 400 nm, and rather, an intensity of electric field in metals is raised.

Figure 15:
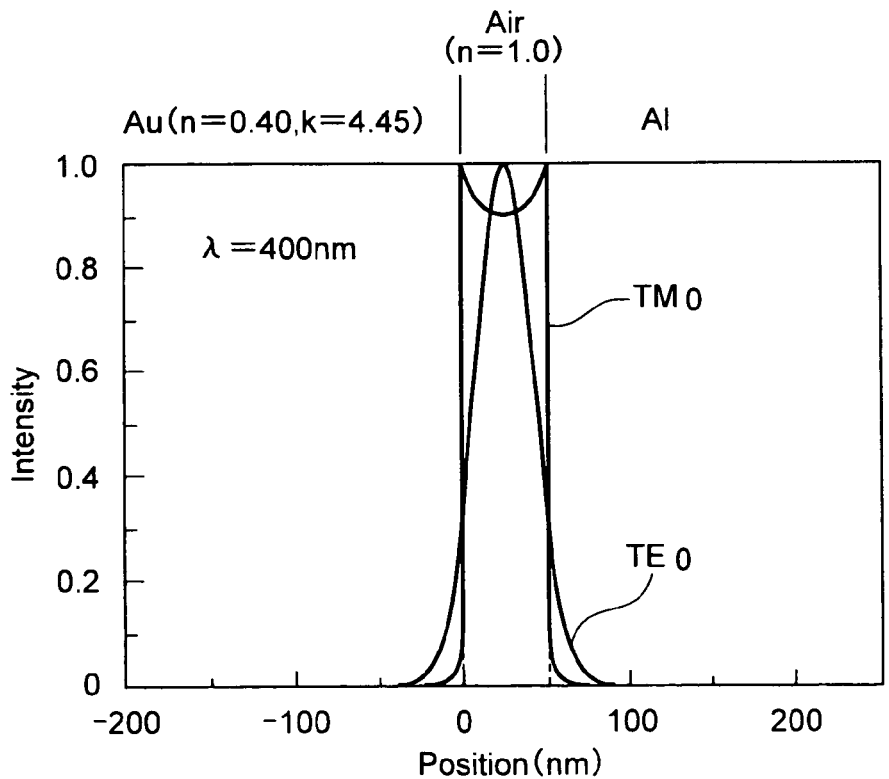
FIG. 15 is a graph showing conditions in the wave guiding mode in which light drastically damps in the metal in the TM mode while reducing the light loss.

When aluminum (Al) is used, a real portion of $n^2$ of the light having the same wavelength, 400 nm, is greater than 1. Hence, as illustrated in FIG. 15, the light in the TM mode considerably damps in such metal, and consequently, this leads to a reduced loss.

Figure 16:
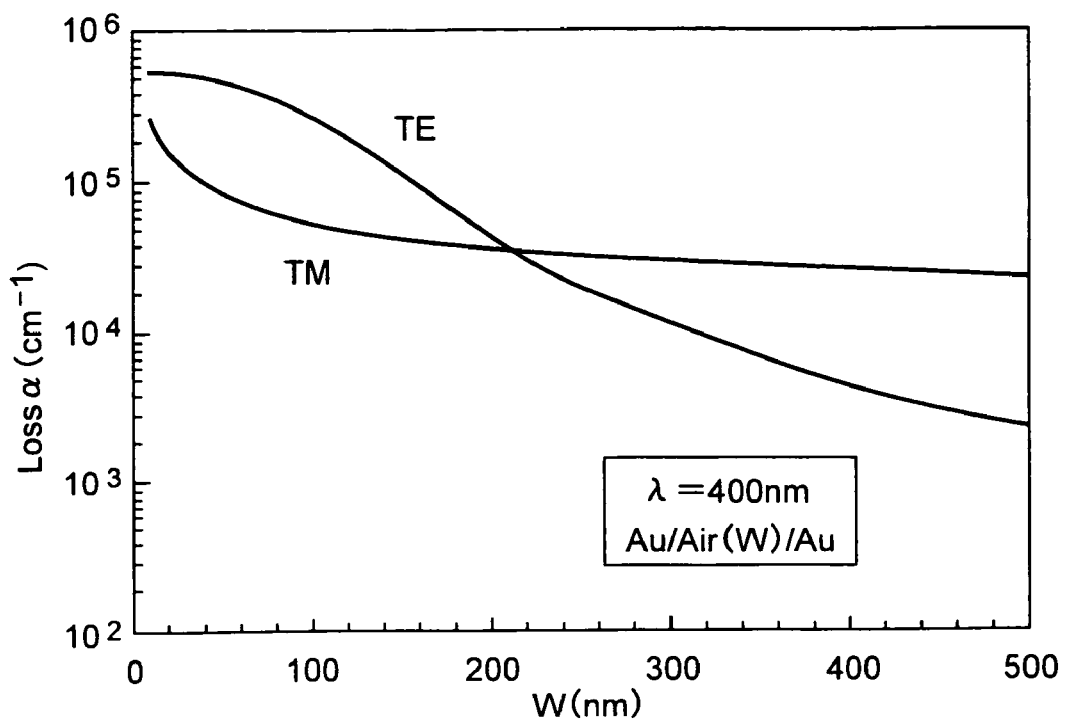
FIG. 16 is a graph showing the light losses in both the modes in a quantitative manner, using the light absorbing film of gold.
Figure 17:
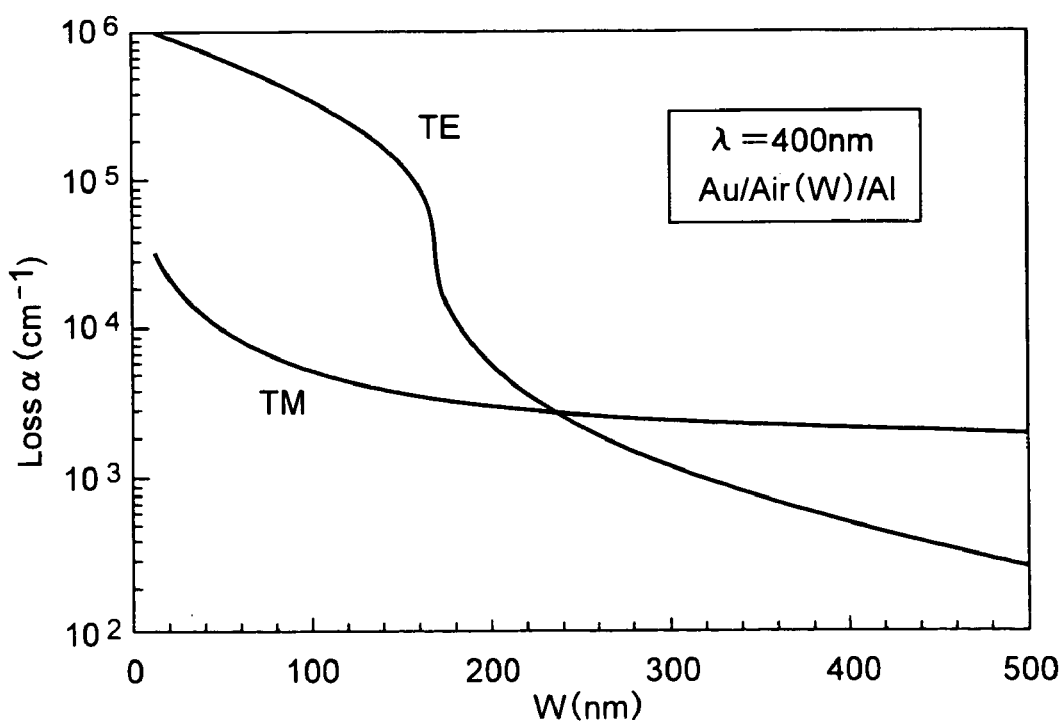
FIG. 17 is a graph showing the light losses in both the modes in a quantitative manner, using the light absorbing film of aluminum.

FIGS. 16 and 17 are graphs showing the loss in each of the modes in a quantitative manner when gold and aluminum are respectively used. As can be seen in the graphs, it is apparent that for the shortwave of 400 nm, the light absorbing film of a metal such as aluminum is preferably used.

As has been described, after the material of the light absorbing film is appropriately selected depending upon the wavelength of the light from the light source, and the aperture is formed therein, recording magnetic pole is positioned adjacent to the aperture at its trailing end, so that the recording unit of the recording medium is irradiated with the light of a certain power transmitted through the aperture with a great efficiency, which permits heating the recording unit and raising its temperature efficiently. Recording magnetic field is applied from the recording pole to the heated and temperature raised recording medium, and thereafter, the recording medium is quickly cooled to stable recording magnetization, so as to implement thermally-assisted magnetic recording at high speed and with super high density.

Although, in the above-mentioned embodiment, the aperture which is empty and hollow is formed by means of FIB etching, a thin film forming technique and a photolithography technique may be used to fill the aperture with dielectric or semiconductor material of high refractive index, so that an efficiency in use of the penetrating light from the aperture to the recording medium is more enhanced. As a result, the thermally-assisted magnetic recording is carried out more efficiently.

Although the poly-particle medium is used in this embodiment, a multi-layer structure having uniformly magnetized film and poly-particle magnetic film deposited over the substrate one after another, or a multi-layer structure having uniformly magnetized film, very thin non-magnetic film of several nanometers in thickness (or soft magnetic amorphous film of a substance such as CoZrNb), and poly-particle magnetic film deposited over the substrate one after another may alternatively be used.

With the medium structured as mentioned above, a temperature property of exchange bonding force acting between the poly-particle layer and the uniformly magnetized layer are utilized to make the temperature property of coercive force Hc0 sharp and steep around a temperature suitable for the recording (recording temperature) which is hard to attain in a single poly-particle recording layer or to allow a recording layer of the medium to increase in its activated volume V around the recording temperature or even above. Consequently, even if a linear recording resolution in directions along the tracks is raised (if recording signal frequency is raised), a stable recording magnetization can be attained, and additionally, even if light beam having a diameter larger than a width of the recording track is employed to result in an adjacent recording track being exposed to relatively high temperature beam, the increase in the activated volume V causes an increase in durability to thermal disturbance, which effectively eliminates likeliness to cross-erase.

Moreover, the present invention is also effective when the medium of the uniformly magnetized film is used. Such a uniformly magnetized medium may be of a multi-layer structure which has been developed as a optical magnetic recording medium, including amorphous rare earth-transition element metal ferrimagnetic alloy film (R-T film), and more particularly, including Al alloy heat sink layer, TbFeCo recording layer, C protective layer, and, lubricating layer deposited one after another over glass substrate.

Embodiment 2

A second preferred embodiment according to the present invention will now be described.

Figure 18:
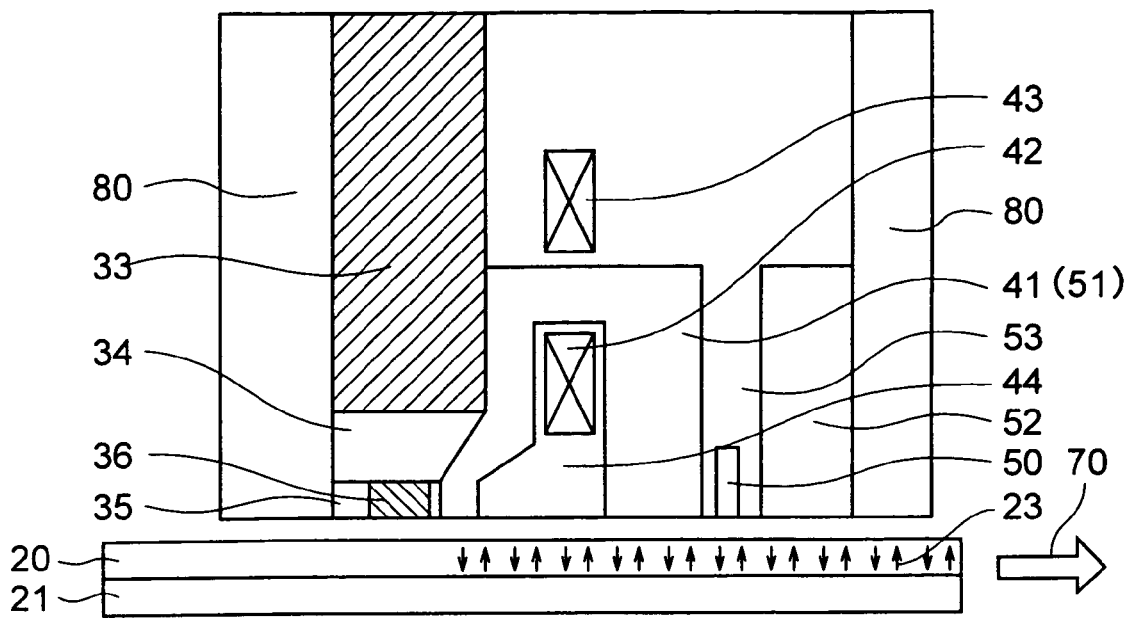
FIG. 18 is a schematic sectional view showing the thermally-assisted magnetic recording apparatus of a second preferred embodiment according to the present invention.
Figure 19:
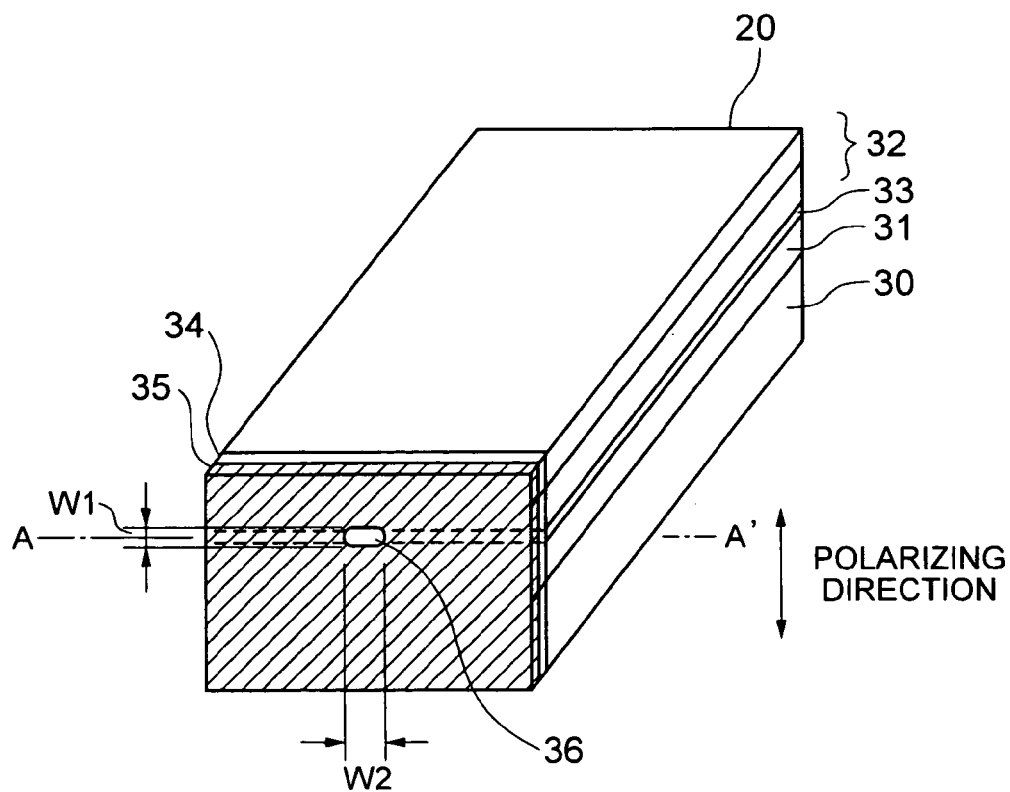
FIG. 19 is a perspective conceptual view showing an arrangement of the light emitting device used in the second preferred embodiment.

FIG. 18 is a sectional schematic view showing a configuration of a thermally-assisted magnetic recording apparatus of this preferred embodiment. FIG. 19 is a perspective conceptual view showing a configuration of a light emitting device used in this embodiment. FIG. 18 is a side sectional view of the apparatus including a medium, extending in a direction of tracks and taken along the line A–A' in FIG. 19 (a direction of the line corresponds to a direction of the recording tracks). In these figures, like reference numerals denote parts similar to those in FIGS. 1 and 2, and details of them are omitted.

Reference numerals 20, 33, 34, 35, and 36 designate a semiconductor laser device, an active layer, an insulating film, a light absorbing film, and an aperture created in the light absorbing film 35, respectively. A direction of polarization of the laser is perpendicular to a junction plane; a direction of an electric field vector is vertical while a direction of the junction plane corresponds to a direction of the recording track.

This embodiment is different from the aforementioned first embodiment in directions of laser polarization. As to use of the laser of which polarizing direction is perpendicular to the junction plate, an optical lossy layer is provided in a cladding so that the loss in the TE mode is higher than that in the TM mode (i.e., the light absorbing layer is provided in position). This is also implemented by introducing tensile strain in the active layer to cause oscillation in the TM mode.

Since the polarizing direction corresponds to a vertical direction in this embodiment, the aperture 36 in the light absorbing film 35 assumes laterally elongated shape in FIG. 19. More specifically, an aperture width W1 in parallel with the polarizing direction is shorter than ½ of a wavelength λ of oscillation of the semiconductor laser while an aperture width W2 perpendicular to the polarizing direction is greater than W1. Such a configuration is advantageous in that a two-dimensional profile in the oscillation mode of the semiconductor laser device can be analogous with a shape of the aperture. This enables the semiconductor laser device to direct its emitted light considerably effectively into the aperture.

In accordance with this embodiment, basically similar features and effects to those in the first embodiment in FIGS. 1A and 1B can be obtained.

Embodiment 3

A third preferred embodiment of the present invention will be described.

Figure 20:
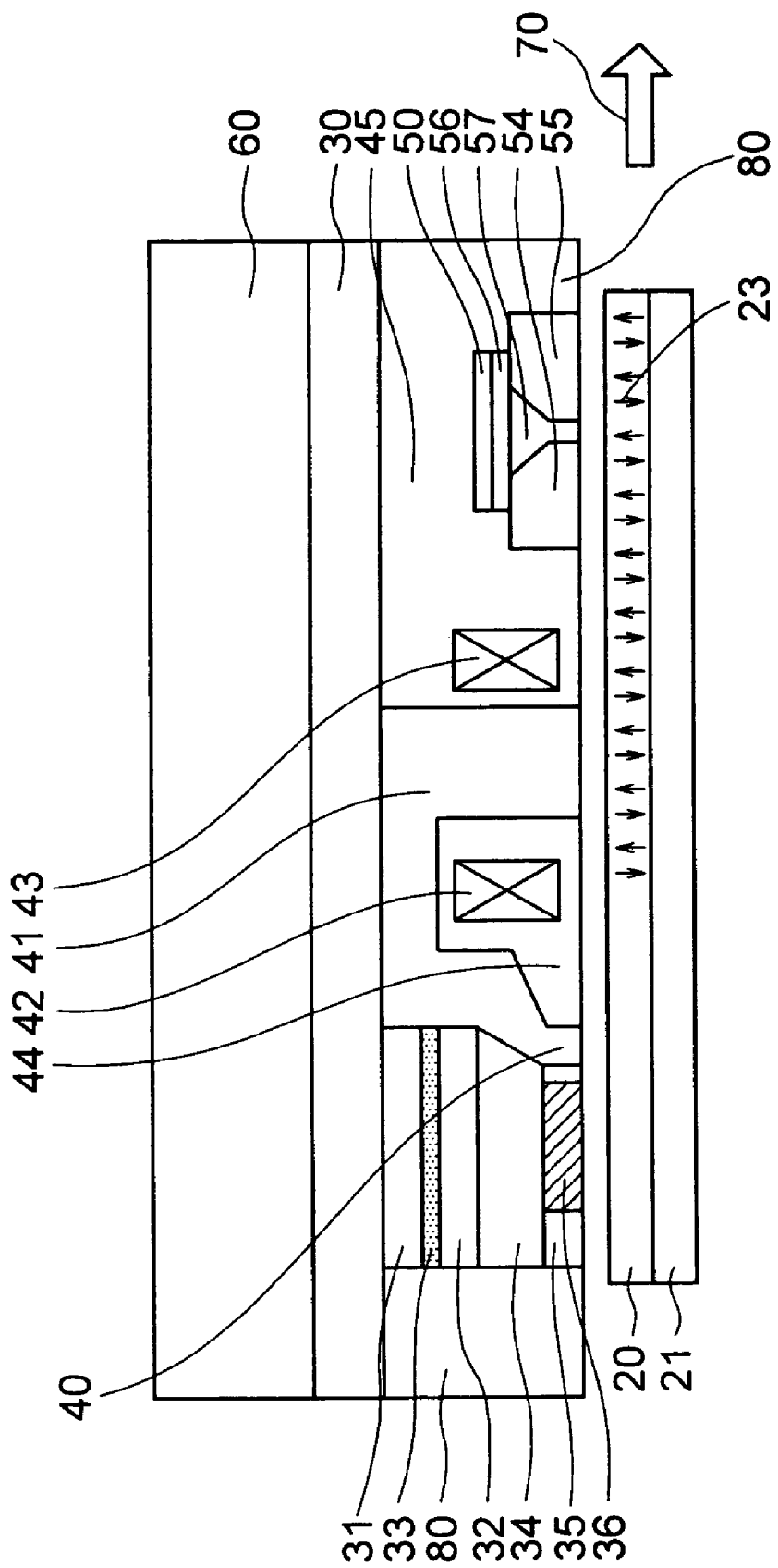
FIG. 20 is a schematic conceptual diagram showing the thermally-assisted magnetic recording apparatus of a third preferred embodiment according to the present invention.
Figure 21:
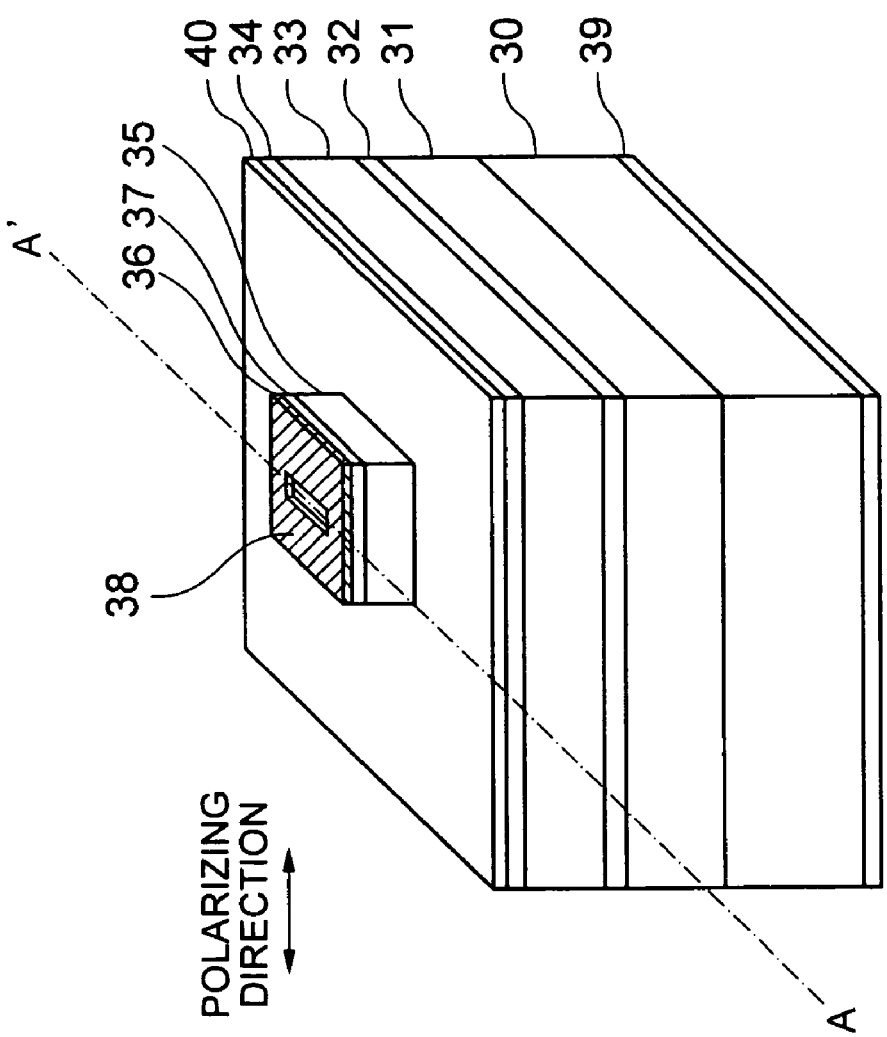
FIG. 21 is a schematic conceptual diagram showing an arrangement of the light emitting device used in the third preferred embodiment.

FIG. 20 is a schematic conceptual diagram showing the thermally-assisted magnetic recording apparatus of this embodiment. FIG. 21 is a perspective conceptual diagram showing an arrangement of a light emitting device used in this embodiment. FIG. 20 is a side sectional view of the apparatus including the medium in a direction of the tracks, taken along the line A–A' in FIG. 21 (a direction of the line corresponds to a direction of the tracks). Like reference numerals denote similar parts to those in FIGS. 1 to 19, and details thereof are omitted.

Although the aforementioned first and second preferred embodiments include an edge-emitting laser devices which are located close to a leading section of an ordinary multi-layered thin film magnetic head, the present invention is suitable for an application in which a vertical cavity surface emitting laser device which is mounted on a planar thin film magnetic head.

FIG. 20 shows the recording device, the edge-emitting laser device, and a yoke GMR reproducing device. The yoke GMR (giant magnetoresistive) reproducing device has a GMR device 56, and nonmagnetic insulating layer 57 of metal such as Al 203 which electrically insulates magnetic yokes 54, 55 from the GMR device 56, and the magnetic yokes 54 and 55 together define magnetic gap. An electrode film which is used to conduct sensing current to the GMR device is omitted in the drawing. The magnetic recording device is basically configured the same as in any of the aforementioned embodiments. The reproducing device may be placed in a head separate from the recording head.

FIGS. 20 and 21 depict an n-type semiconductor substrate 30, an n-type DBR reflective layer, an active layer region 33 (optical thickness=oscillation wavelength), a p-type DBR reflective layer 133, p-type contact layers 134 and 135, a light absorbing film 35, an aperture 36 cut out in the light absorbing film 35, an n-electrode 139, and a p-electrode 140. The laser device is a vertical cavity surface emitting laser device or a surface light emitting laser device.

In this embodiment, an aperture width is smaller in parallel with a polarizing direction of laser light (λ/2 or less) and is wider vertically. This permits a loss of light transmitted through the aperture 36 to be greatly reduced, as mentioned before in conjunction with FIGS. 1 and 2. An A–A' direction perpendicular to the polarizing direction corresponds to the direction of the recording track, and an aperture 36 is shaped into a rectangle having longer sides along the direction of the tracks. The recording pole 40 is located close to the aperture 36 at a trailing section. With such a configuration, similar features and effects to those in the aforementioned embodiments can be obtained.

Embodiment 4

A fourth preferred embodiment according to the present invention will be described.

Figure 22:
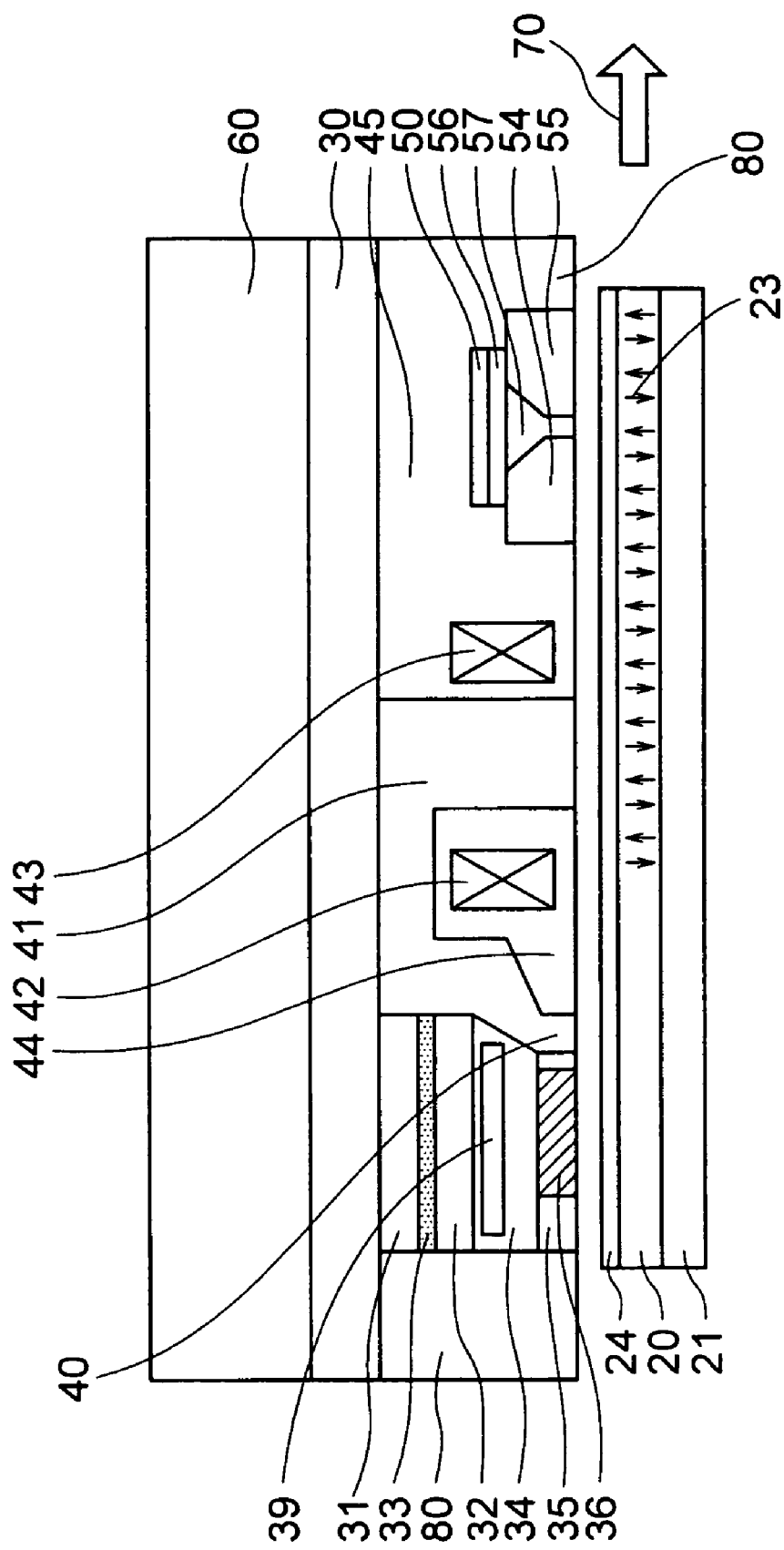
FIG. 22 is a schematic sectional view showing the thermally-assisted magnetic recording apparatus of a fourth preferred embodiment according to the present invention.

FIG. 22 is a schematic sectional view showing the thermally-assisted magnetic recording apparatus of this embodiment. In this drawing, like reference numerals denote similar components to those in FIGS. 1 to 21, and details thereof are omitted.

This embodiment is a variation of the third preferred embodiment as mentioned above. In this embodiment, the recording layer 20 of the recording medium is superposed with an antireflection layer 24 having a high light refracting index, so that efficiency in use of light transmitted through the aperture 36 to irradiate the recording medium can be further enhanced. The antireflection layer 24 may be made of a material such as a semiconductor material or a dielectric material including GaP, GaAs, ZnSe, ZnS, which show refractive indices of 3 or above in a visible light range, respectively.

In this embodiment, the optical light collecting means 39 functioning as a wavefront converter is used to converge the light emitted from a light emitting facet in the end surface light emitting laser device and direct converged light into the aperture 36. The light collecting means 39 may be a diffraction grating lens.

Figure 23A:
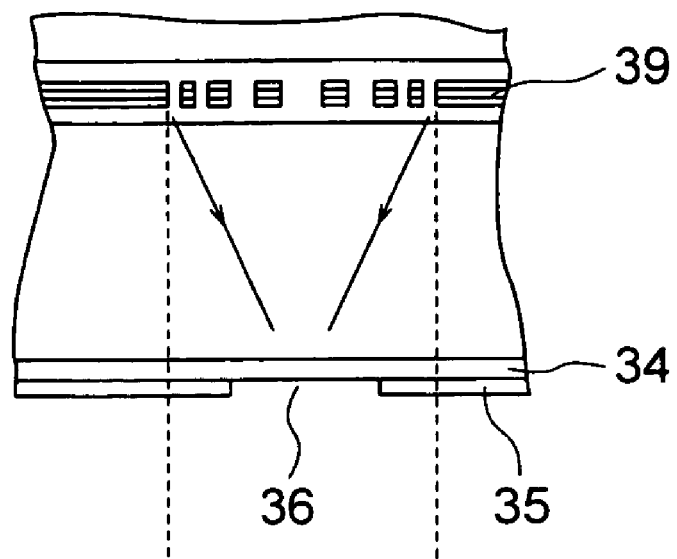
FIGS. 23A and 23B are conceptual views showing primary elements of a diffraction grating lens.
Figure 23B:
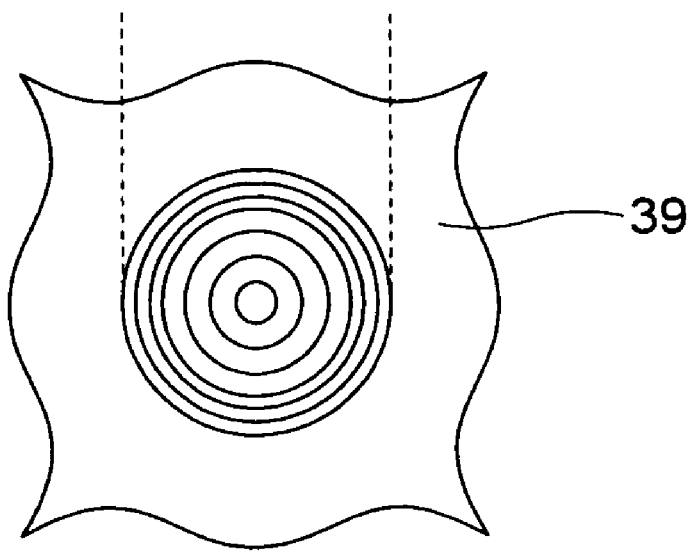

FIGS. 23A and 23B show a concept of a primary portion of the diffraction grating lens; FIG. 23A is a sectional view of the primary portion while FIG. 23B is a plan view thereof.

Such a lens can be fabricated through a step of forming thin films and by means of photolithography technique, and its feature of converging light allows the light from the laser device to be directed into the aperture 36 efficiently. With such a configuration, a surface-emitting laser device which produces relatively small power in comparison with the edge-emitting laser device can emit light through the aperture 36 and irradiate the recording medium with the light of enhanced power to the equivalent level to heat the recording unit of the medium and raise its temperature, thereby attaining the thermally-assisted magnetic recording.

Embodiment 5

Another exemplary thermally-assisted magnetic recording apparatus of a fifth preferred embodiment according to the present invention will be described below.

Figure 24:
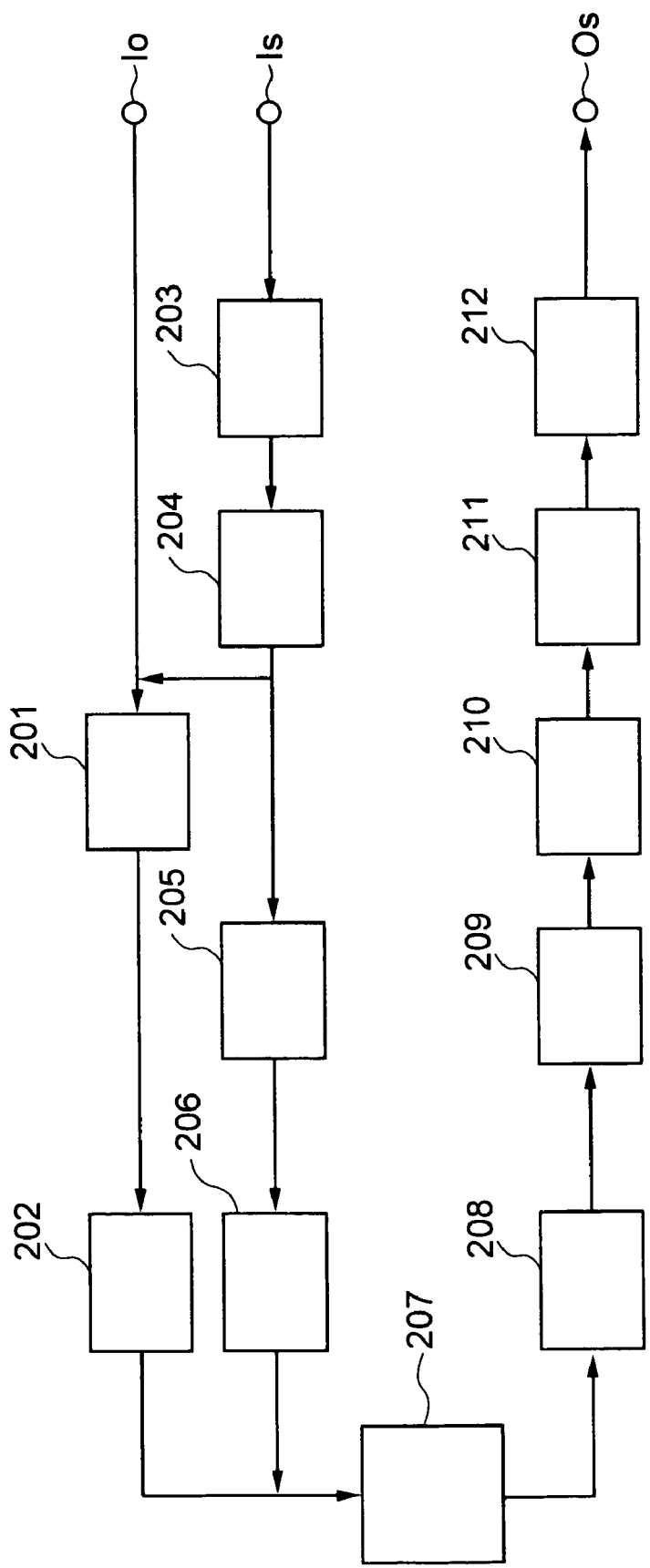
FIG. 24 is a block diagram showing the thermally-assisted magnetic recording apparatus according to the present invention.

FIG. 24 is a block diagram showing the thermally-assisted magnetic recording apparatus of this embodiment. FIG. 24 depict a light emitting device actuating input Io, a signal input Is, a signal output Os, a light emitting device actuating circuitry 201, a light emitting device 202 built in the head, an ECC (error correction code) application circuitry 203, a modulation circuitry 204, a record correction circuitry 205, a recording device 206 built in the head, a medium 207, a reproducing device 208 built in the head, an equivalent circuitry 209, a decoding circuitry 210, a demodulation circuitry 211, and an ECC circuitry 212.

The thermally-assisted magnetic recording apparatus of the present invention is characterized in that the apparatus is configured into a block which is comprised of the prior art magnetic disk device accompanied with additional components such as the light emitting device actuating input Io, the light emitting device actuating circuitry 201, and the light emitting device 202, that a configuration of the head is improved so as to provide the light emitting device having a unique aperture as described in the context of the aforementioned embodiments, and that optical properties of the recording medium are particularly regulated as mentioned in conjunction with the fourth preferred embodiment.

The light emitting device actuating input may be supplied DC voltage to the laser device, and the light emitting device may be actuated by DC without adding and using the light emitting device actuating circuitry. The light emitting device may be actuated synchronous with output from the modulation circuit in such a manner as pulse control, and the light emitting device actuated depending upon pulse generation must have a more complicated circuit structure although it is preferable because of the resulting longer lifetime of the laser. The ECC application circuitry 203 and the ECC circuitry 212 may be omitted. Ways and manners of the modulation/demodulation and the record correction can be optionally selected.

Information entry to the medium is carried out by irradiating the medium with light emitted from the light emitting device 202, and applying a record signal modulated recording magnetic filed from the recording deice 26 to a position of the medium where the magnetic coercive force Hc0 is reduced because of the irradiation. A manner of converting the information into a sequence of magnetization transitions in the surface of the medium is identical with the manner as in the prior art magnetic recording apparatus. At this stage of the recording procedure according to the present invention, as mentioned in conjunction with FIGS. 5A and 5B, heating isotherm in the medium surface derived from the light beam assumes to be linear in a direction of the track width, and it is also a noteworthy characteristic that the magnetization transition also assumes to be linear in the direction of the track width. Such linear magnetization transition is very convenient in that a reproduction resolution can be greatly improved to enhance a record density.

The reproducing device 208 detects a signal magnetic field which is a leakage magnetic field from the medium developed from the sequence of the magnetization transitions. The reproducing device is typically a GMR reproducing device, and alternatively it may be an ordinary AMR (anisotropic magnetoresistance) reproducing device, and it may be replaced with a TMR (tunneling magnetoresistance) reproducing device for a future-oriented use.

The preferred embodiments according to the present invention have been described as Embodiments 1 to 5.

A thickness of the insulating film 34 used in the first to fifth embodiments will now be described. As has been described, the light absorbing film as thick as 100 nm may be sufficient to fully damp the light in any region other than the aperture. The thickness is converted into an optical thickness $\lambda$ (a single wavelength). Usually, a metal film which is as thick as the above shows a reflectance of 90% or over, and such a film is sufficiently effective when used as a reflection mirror for a resonator.

However, when the metal film is applied to the end facet of the edge-emitting laser as in the first and second preferred embodiments, the insulating film 34 is provided between the end facet and the metal film so as not to cause short-circuit between the p-type semiconductor layer and the n-type semiconductor layer. Depending upon the thickness of the insulating film 34, the reflectance may sometimes be reduced, and the insulating film 34 must be sufficiently thick to ensure a high reflectance.

Figure 25:
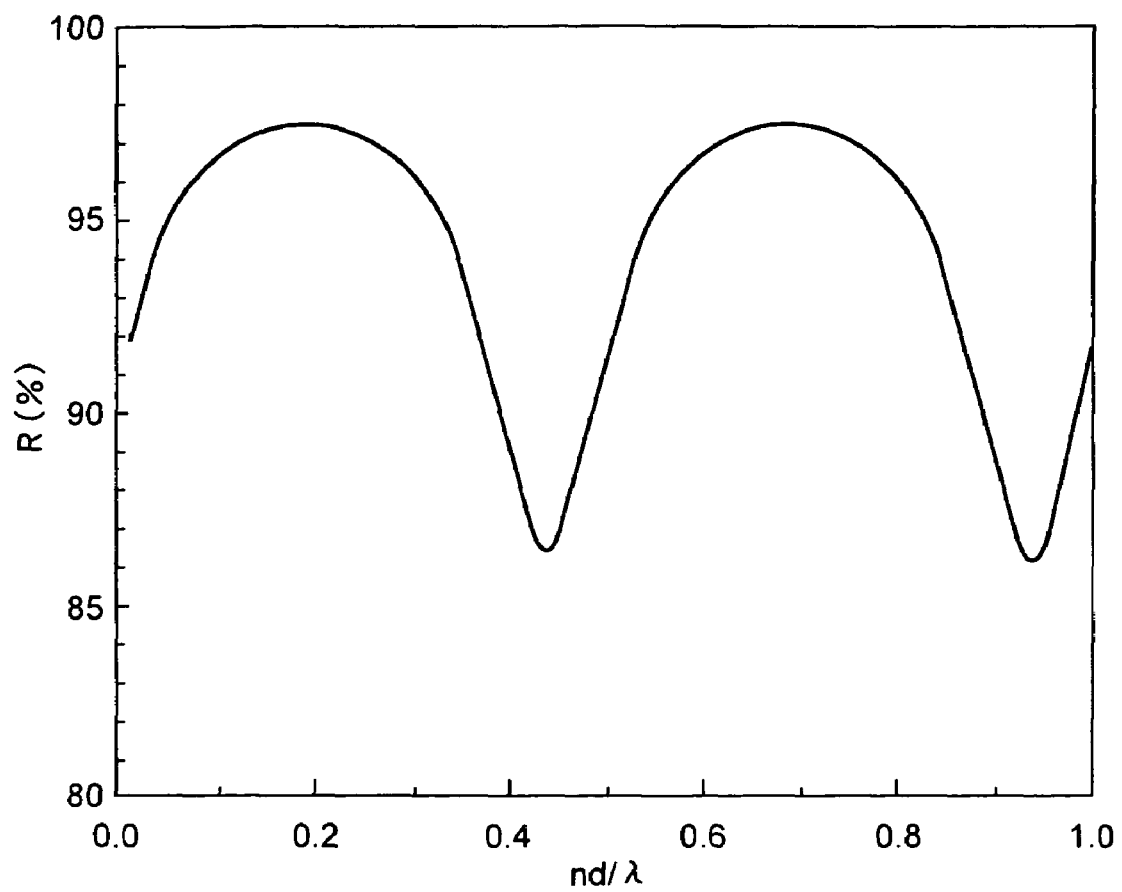
FIG. 25 is a graph illustrating variations in a reflectivity R related to a thickness d of an insulating film 34.

FIG. 25 illustrates calculated alterations in reflectance R of the insulating film 34 relative to its thickness d. In such calculations, an optical thickness of a metal film of Au is expressed as $(nd/\lambda)$. As can be seen in the drawing, the reflectance periodically rises and falls. It is apparent in the drawing that the metal film shows an increase in the reflectance most under conditions approximating the one expressed below:

$$nd/\lambda = 0.2 + 0.5\, m \text{ (m is an integer)}$$

For example, in order to obtain a reflectance of 95% or above, the film thickness may be determined in a range expressed as follows:

$$0.05 + 0.5\, m \leq md/\lambda \leq 0.35 + 0.5\, m$$

For use as a protective film, it may be a thin film of a thickness in a range as defined below:

$$0.05 \leq nd/\lambda \leq 0.35$$

A supplementary explanation will be given regarding the light collecting means 30 used in the fourth preferred embodiment.

The optical light collecting means 39 in the fourth preferred embodiment may be utilized for the edge-emitting device used in the first and second embodiments.

Figure 26A:
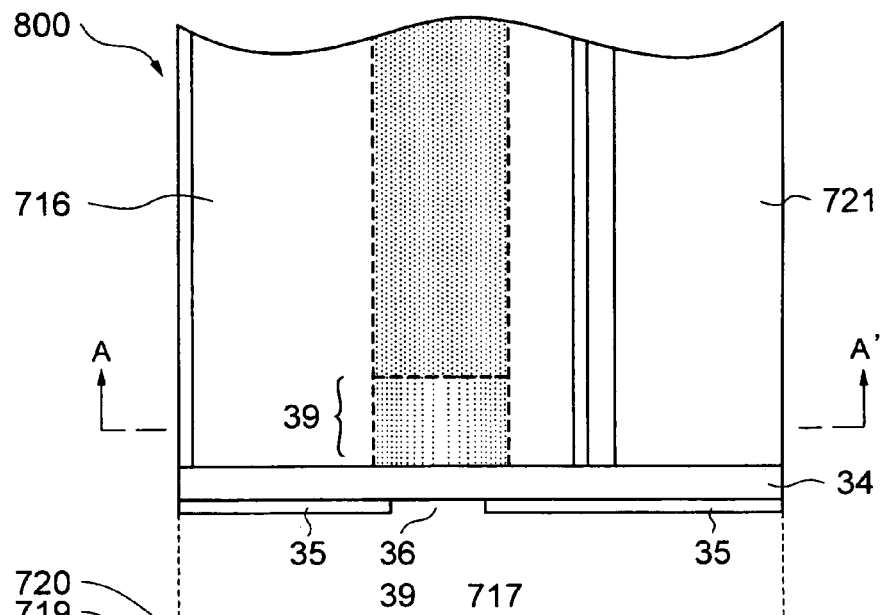
FIGS. 26A through 26C are conceptual diagrams showing an example of an optical light collecting means that can be provided in an edge-emitting light emitting device.
Figure 26B:
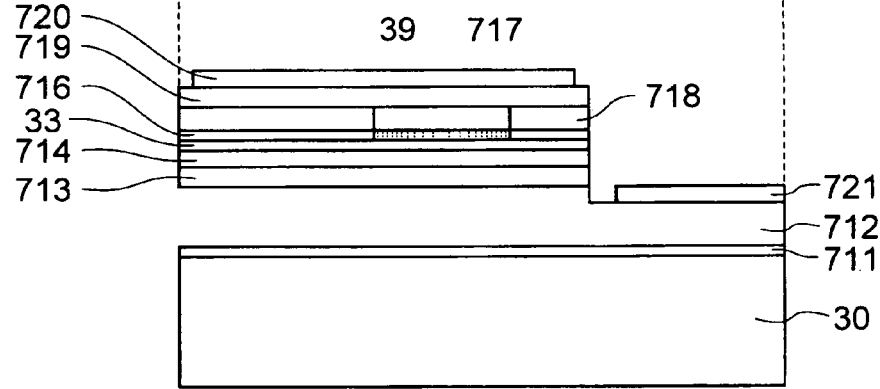
Figure 26C:
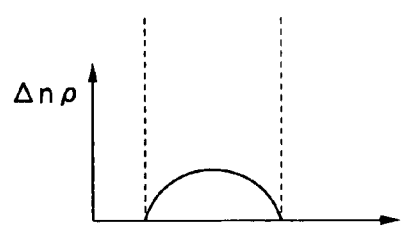

FIGS. 26A through 26C are conceptual views showing an exemplary optical light collecting means provided in the edge-emitting device. FIG. 26A is a perspective plan view showing a primary portion of the means, FIG. 26B is a sectional view taken along the line A–A' thereof, and FIG. 26C is a graph showing a distribution of the reflectance and refractive index of an end of a wave guiding layer taken along the line A–A'.

A light emitting device 700 in the drawings is based upon an edge-emitting laser. Referring to FIG. 26B, a sectional configuration of the device will be outlined: The light emitting device has a sapphire substrate 30 which is superposed with GaN buffer layer 711, an n-type GaN contact layer 712, an n-type GaAl cladding layer 713, an n-type GaN wave guiding layer 714, an InGaN multiple quantum well (MQW) active layer 33, a p-type GaN wave guiding layer 716, a p-type GaAlN cladding layer 717, an n-type GaAlN current constrictive layer 718, and a p-type GaN contact layer 719, one over another. Reference numerals 720 and 721 denote a positive electrode and a negative electrode, respectively.

In this embodiment, the optical light collecting means 39 is provided close to one of light emitting facets of the laser device. The light collecting means 39 is configured so that a resistivity of the p-type GaN wave guiding layer 716 close to the end facet is locally altered. Specifically, as shown in FIG. 26C, the resistivity is higher in the center of the stripe and lower close to the opposite sides. Thus, since a larger amount of carrier is injected in the sides of the stripe than in the center of the stripe, a plasma effect causes an effectual refractive index to decrease in the opposite sides of the stripe, as shown in FIG. 26C. Hence, the wavefront converter portion works as a lens to the wave guiding light.

Figure 27A:
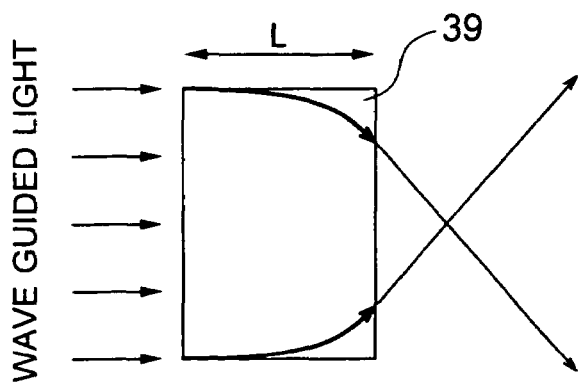
FIGS. 27A through 27C are plan views showing conditions of wave guided light refracted by a light collecting means 39.
Figure 27B:
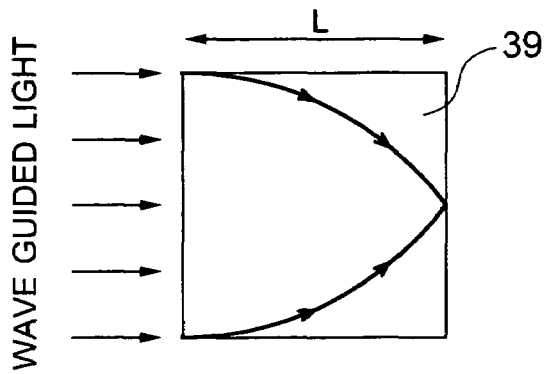
Figure 27C:
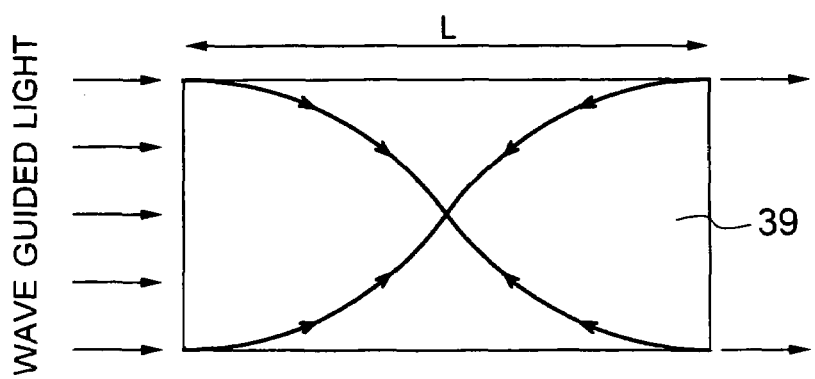

FIGS. 27A and 27C are plan views illustrating conditions of the wave guiding light which is being refracted by the light collecting means 39. A distribution of the light within the light collecting means 39 is classified into several groups depending upon its refractive index and a length L of the light collecting means 39.

In an example illustrated in FIG. 27A, the length L of the light collecting means 39 is greater than a focal length of the wave guiding light. As a result, as shown in the drawing, the wave guiding light is converged outside the end facet. In another example illustrated in FIG. 27B, the focal length of the wave guiding light and the length L are identical. Consequently, the wave guiding light is converged on the end facet of the laser. In still another example illustrated in FIG. 27C, the length L of the light collecting means is twice as long as the focal length of the wave guiding light. As a result, as shown in the drawing, collimated beams are emitted from the end facet of the laser.

As has been recognized, in this embodiment, the distribution of the refractive index and length L of the light collecting means 39 can be appropriately regulated to control a distribution of intensity of the outgoing beams, and even if the stripe is relatively broad in width, suitable outgoing wavefront can be obtained.

Such a light collecting means 39 can be fabricated by electron beam irradiation. Specifically, after the p-type GaN wave guiding layer 716 is deposited to its full growth, the electron beam is directed to the stripe to activate an acceptor. During the irradiation, an exposure dose of the electron beam is distributed, and the exposure dose of the electron beam is increased in the opposite sides of the stripe while it is reduced at its center. This brings about a configuration where the opposite sides of the stripe show a low resistance while its center is of a high resistance.

In such a fabrication method, the stripe is created by electron beam irradiation, and hence, the n-type GaAlN current constrictive layer 718 is not necessarily required. In other words, if the electron rays are not applied to the opposite sides of the stripe, that part of the stripe has no current flow since it is of high resistance, and in such a way, current constriction can be attained.

Alternatively, the light collecting means 39 can be fabricated by ion injection. Specifically, p-type impurity such as magnesium (Mg) is injected into the p-type GaN wave guiding layer 716, with a dose of the impurity being distributed, and the contaminated layer is annealed to finish the p-type GaN wave guiding layer 716 having the same distribution of the resistivity as in FIG. 26C.

The p-type GaN wave guiding layer 716 is, alternatively, uniformly doped with the p-type impurity for crystalline growth, and after the growth of the crystal, hydrogen (H) ions are injected, with a dose of the ions being distributed, so as to yield the p-type GaN wave guiding layer 716 having the same distribution of the resistivity as in FIG. 26C. This method utilizes a phenomenon that the p-type impurity dopant such as magnesium during the crystalline growth is activated by the injected hydrogen ions.

Further alternatively, the p-type GaN wave guiding layer 716 may be doped with both a p-type impurity such as magnesium and an n-type impurity such as silicon to control a distribution of concentrations of both the impurities. In this way, an amount of the n-type impurity dopant is altered relative to that of the p-type impurity dopant, so that a compensation amount of the acceptor can be controlled to fabricate the p-type GaN wave guiding layer 716 having the same distribution of the resistivity as in FIG. 26C.

Although, in this embodiment, a resistivity of the p-type GaN wave guiding layer 716 is altered, a resistivity of the active layer 30 may be altered. Alternatively, a resistivity of the p-type GaAlN cladding layer 717 may be similarly altered, and instead, resistivities in both the wave guiding layer 716 and the cladding layer 717 may be altered.

A supplementary explanation will now be given regarding the distribution of the light in the TE mode according to the present invention.

As has been mentioned above, the optical light collecting means 39 is used to efficiently collect light from the laser device light emitting surface into an optical aperture, and an efficiency of using the light can be enhanced. In such a situation, a distribution of the intensity of the light along a longitudinal extension of the tracks corresponds to the distribution of the light in the TE mode as illustrated in FIGS. 4A and 4B. In relation with a direction of the aperture along a longer stretch of the tracks, the intensity is the highest at the center of the aperture while reaching almost zero at the opposite ends of the aperture, with a distribution curve being symmetrical. However, in such a symmetrical intensity distribution, even if the recording pole 30 is located closest to the optical aperture 36, the position of the maximum light intensity cannot be in any position less than ½ of the length of the aperture apart from the recording pole 40.

In contrast, if such a symmetrical light collecting property of the optical light collecting means 39 is regulated so as to turn it to be asymmetrical, the position of the maximum light intensity and the recording magnetic pole 40 can be located closer to each other.

Figures 28A, 28B:
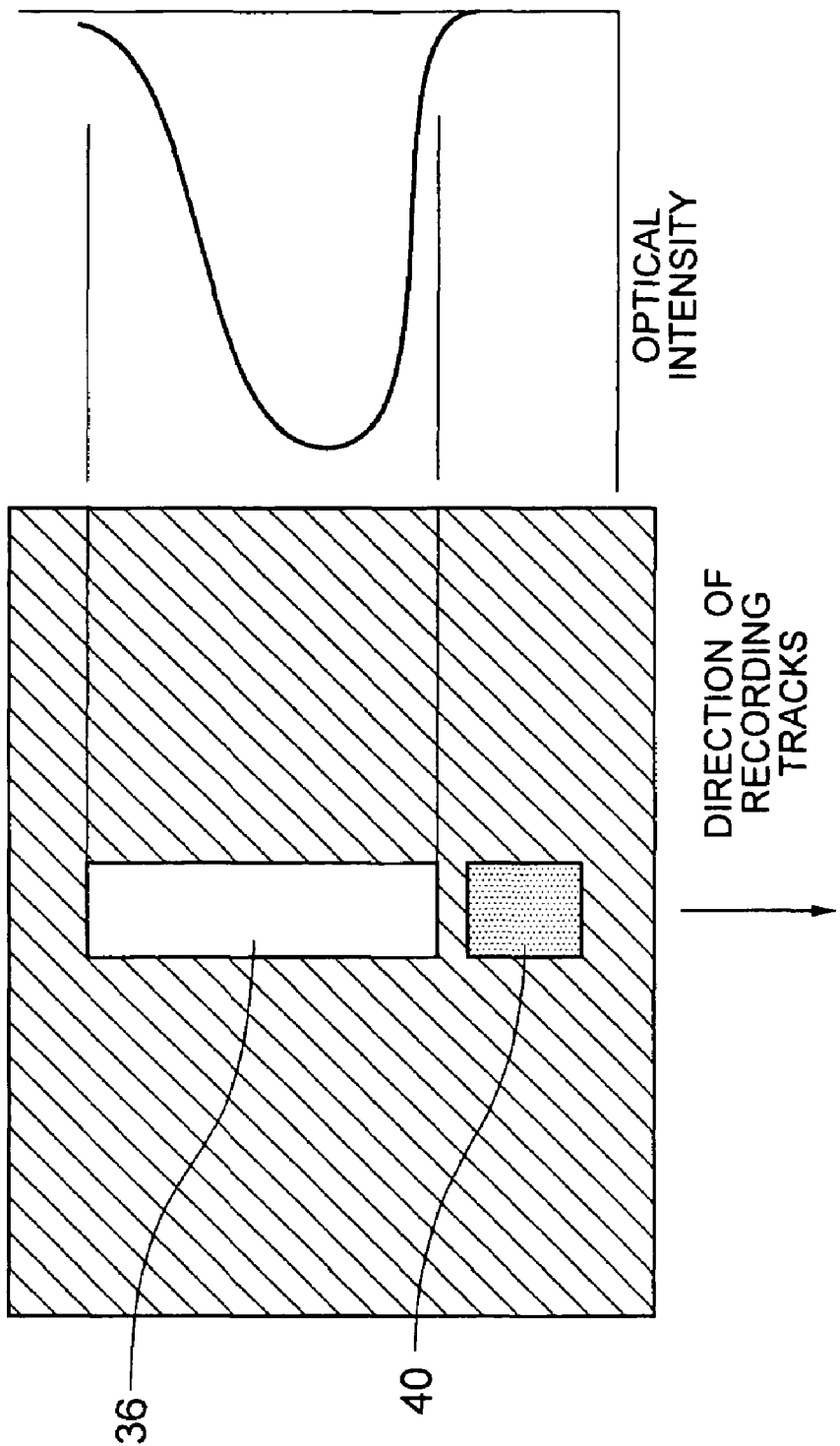
FIGS. 28A and 28B are conceptual diagrams of emitted light showing asymmetrical intensity distribution.

FIGS. 28A and 28B are conceptual diagrams illustrating a condition of radiation of the light having an asymmetrical intensity distribution. FIG. 28A is a plan view showing primary components which are seen from the recording medium facing these components while FIG. 28B is a graph showing a corresponding distribution of the light intensity in relation with a direction of the longer stretch of the tracks.

As shown in FIG. 28B, if a peak of the distribution of the light intensity is shifted to the recording pole 40 so that the peak is located closer to the recording pole, the efficiency of using the light can be further enhanced. In this way, with the same oscillation power, the recording unit of the medium right below the recording pole 40 is heated to be at higher temperature level in comparison with the condition of the symmetrical intensity distribution, and this results in a distribution of the temperature being sharper and steeper. Consequently, the thermally-assisted magnetic recording can be implemented more assuredly and more easily.

The asymmetrical light intensity distribution as shown in FIG. 28B can be produced by using a diffraction grating lens as illustrated in FIGS. 23A and 23B and displacing it to an eccentric deployment. If a means such as the light collecting means 39 in FIGS. 26A through 26C is used, such an asymmetrical distribution can be attained by creating an asymmetrical distribution of a specific resistance ρ.

A supplementary explanation will be given regarding the light emitting device that can be applied in the present invention.

The semiconductor laser device applicable in this invention is not limited to devices of some specific materials but may be made of a variety of families which in part contain components such as InGaAsP, GaAlAs, InGaAlP, InGaAlN, InGaAlBN, InGaAsSb, CdZnMgSSe, and the like.

Figure 29:
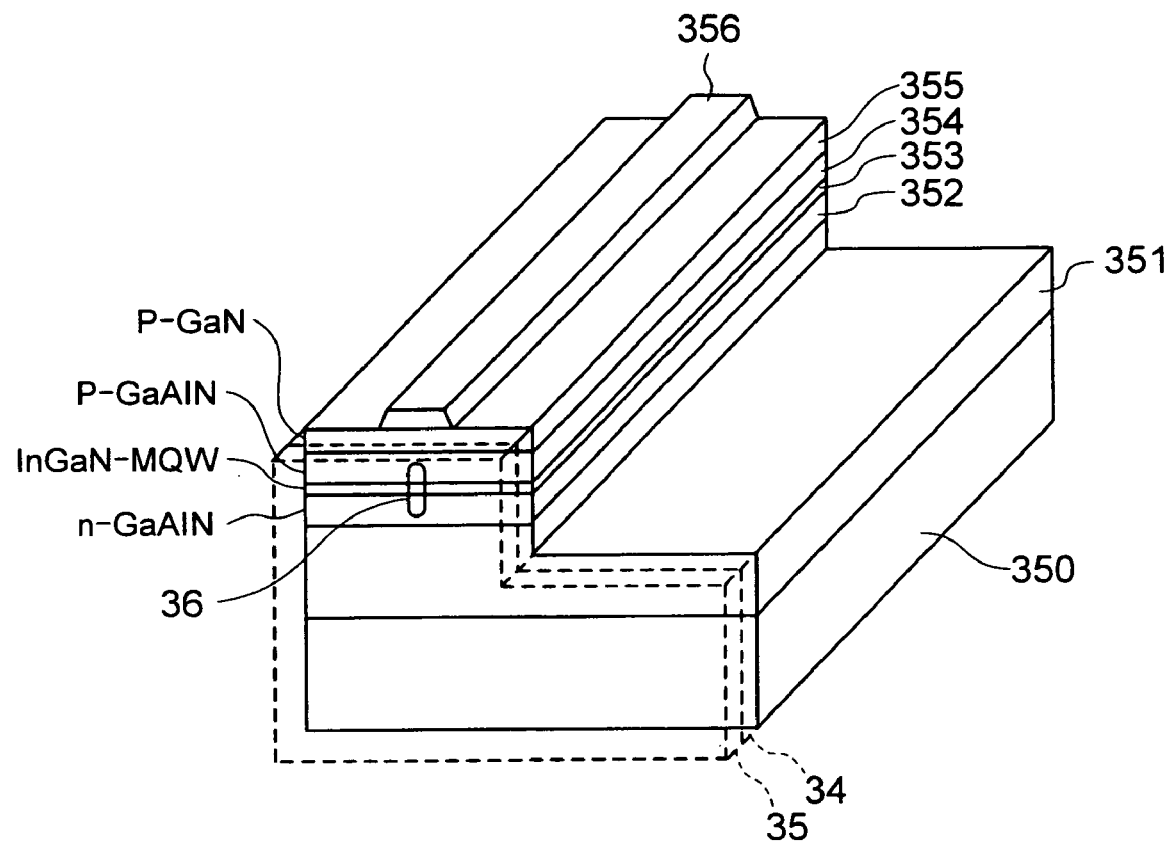
FIG. 29 is a conceptual view showing a light emitting device in which a substrate of semiconductor is replaced with an insulating sapphire substrate 350.

An arrangement of the laser is also not limited to those shown in FIGS. 2, 19, and 21, but can be varied as desired. For instance, as shown in FIG. 29, the semiconductor substrate may be replaced with an insulating sapphire substrate 350. An arrangement in the drawing is comprised of an n-type GaN layer 351, an n-type GaAlN cladding layer 352, an MQW active layer 353 of InGaN, a p-type GaAlN cladding layer 354, a p-type GaN contact layer 355, a ridge layer 356, an insulating film 357, a light absorbing film 358, and an aperture 359. In this case, since the substrate 350 is an insulator, an n-type electrode is fabricated on the cladding layer 351.

The aforementioned supplementary explanations are all related to Embodiment 1 through Embodiment 5.

Additional preferred embodiments, Embodiments 6 to 9, according to the present invention will now be described; namely, an arrangement of a thermally-assisted magnetic recording head of enhanced performance to facilitate the writing and a method of manufacturing the same will be discussed.

As has been described, several significant points about an implementation of the thermally-assisted magnetic recording include (1) the recording magnetic field should have been applied, and the recording should have been completed at an optimum timing before the medium is cooled while it undergoes a heating treatment or immediately after the treatment; (2) after the recording is completed, recording magnetization should be prevented from being reversed again because of adverse effects of thermal disturbance till the medium is fully cooled; and (3) only a minute region as wide as the recording magnetic pole should be selectively heated without destruction of magnetization transition due to the thermal disturbance caused by heating adjacent tracks.

In order to meet the above-mentioned requirements, the following procedure is essential: First, an energy density of heat beams radiated from the heating source should be sufficiently high to raise a temperature of the medium to a specific level (a temperature level at which the magnetic coercive force Hc0 is smaller than that in the recording magnetic field). Second, a part (aperture) used to direct heat beams radiated from the heating source to the medium should be located in a position within several times as long as a length of the aperture along a longer stretch of the recording tracks or even shorter apart from the tip of the recording magnetic pole.

In order to satisfy the former requirement, a high-power edge-emitting laser device or an electron beam emitter may be used as the heating source, and especially when the edge-emitting laser device is used, it is hard to meet the latter requirement. This is because basically the edge-emitting laser device is formed of a substrate superposed with a first electrode, a first cladding layer as thick as 1 μm, an active layer having a thickness of several tens nanometers to several hundreds nanometers, and a second cladding layer as thick as 1 μm, respectively, one over another into multi-layer structure, and the recording magnetic pole must be embedded in the second cladding layer to locate the light radiating portion and the tip of the recording magnetic pole close to each other so as to radiate and direct light mostly to the active layer. However, such a structure where metal is buried in the cladding layer, a light emitting performance of the laser device is prone to deteriorate.

Also, in order to implement the desired enhanced density recording, it is preferable to create a minute optical aperture in a light emitting surface of the laser device. However, in a manner where after the laser device and the recording magnetic pole are fabricated in the step of forming thin films, the mechanical cutting-out and polishing should be carried out for depth end control, a metal film must be formed to create the optical aperture therein after the step of mechanical cutting-out or polishing, the magnetic spacing between the recording pole and the medium is increased by a thickness of the metal film, possibly resulting in a reduction of the recording resolution.

The six to ninth preferred embodiments of the present invention described hereinafter have been made allowing for the above-mentioned disadvantages. Accordingly, it is an object of the present invention to provide a thermally-assisted recording head which is used in a thermally-assisted magnetic recording apparatus such as the one having a heating source of an edge-emitting laser device and which is configured so that heating beam and a recording magnetic pole can be located close to each other without losing sufficient energy density to heat a medium, to provide a method of manufacturing such a magnetic recording head, and to provide a thermally-assisted magnetic recording apparatus using such a magnetic head.

Embodiment 6

Figure 30:
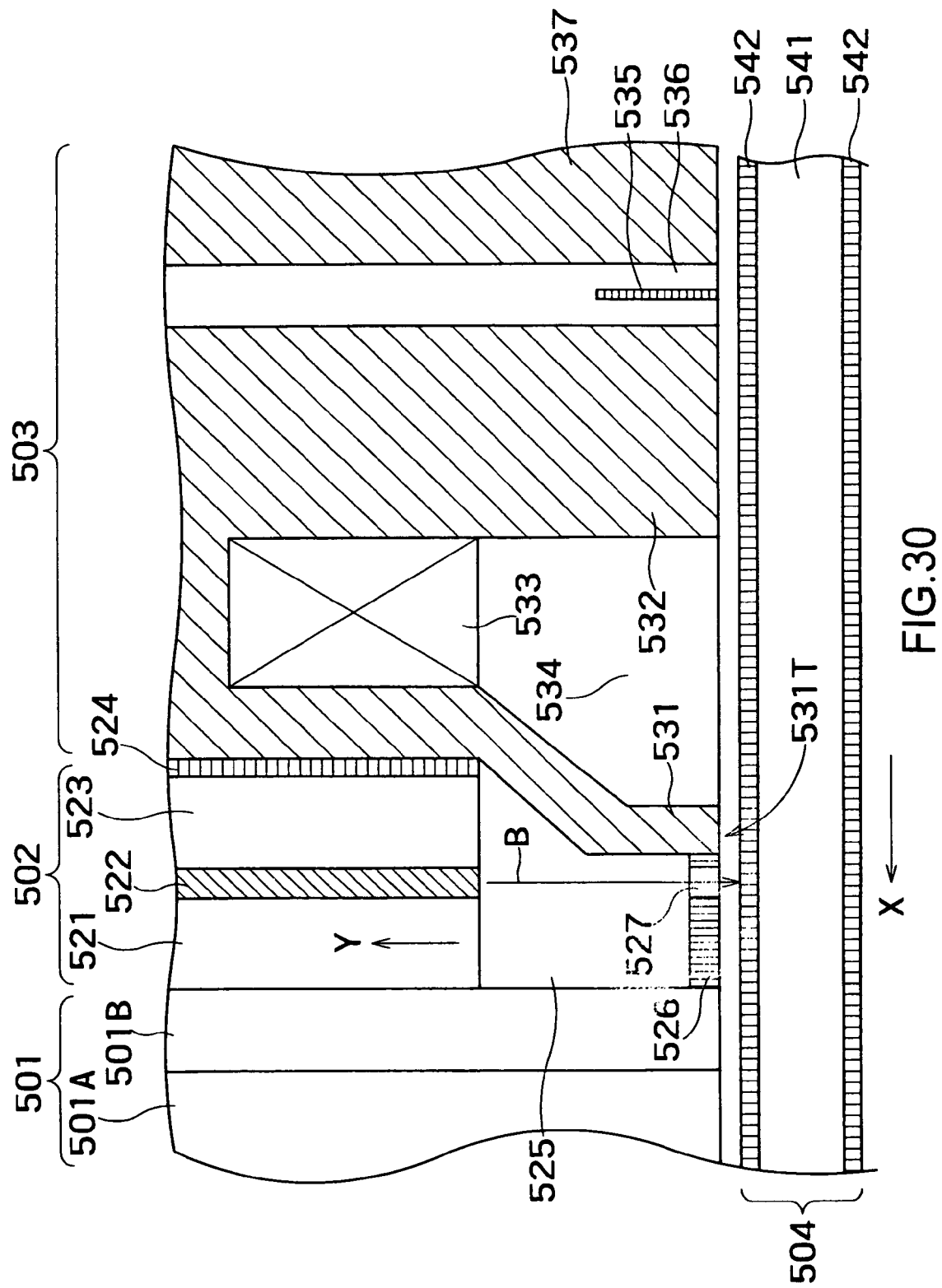
FIG. 30 is a sectional view conceptually showing primary elements of the thermally-assisted magnetic recording apparatus of a sixth preferred embodiment according to the present invention.

FIG. 30 is a sectional view conceptually showing primary components of the thermally-assisted magnetic recording head of the sixth preferred embodiment according to the present invention. Reference numerals in the drawing 501, 502, 503, and 504 respectively denote a substrate 501 for an optical magnetic integrated head device, an edge-emitting laser device, a magnetic recording/reproducing device, and a magnetic medium.

The thermally-assisted magnetic recording apparatus according to the present invention is first characterized in that the laser device 502 functioning as the heating source is fabricated, receding from the medium 504, by providing a recess, and a tip 531T of a primary magnetic pole 531 of the recording head protrudes from the magnetic recording/ reproducing device 3 into a space resulting from the recess. The laser device 502 is in a receding position from the medium 504 in a direction shown by an arrow Y in the drawing. The tip 531T of the primary magnetic pole protrudes ahead of the laser device 502 in a direction marked with a numeral X.

With such a unique configuration, laser light B radiated from the laser device 503 and the tip 531T of the recording head primary pole 531T can be located considerably close to each other. As a result, magnetic information can be assuredly written by the primary magnetic pole 531 at an optimum timing before the medium is cooled while it undergoes a heating treatment with the laser light B.

As a result of observation and review by the inventors of the invention, it has been found that, assuming that a linear velocity of the medium 504 is 10 m/sec while a cooling speed of the medium is $2 \sim 3 \times 10^{10}$ K/sec (20 to 30 K/nsec), the laser light B and the tip 531T of the primary magnetic pole must be located close to each other at an interval of 0.05 μm or shorter.

Applying the recording magnetic field around a heater is critical with the thermally-assisted magnetic recording. A speed of thermal response of a phase change medium in an optical recording system and an optical magnetic recording medium is several tens K/nsec. Although the optical recording medium and the magnetic recording medium show slightly different thermal response speeds, the thermal response speed of the optical recording system is used as a general reference speed for convenience of the following description.

Assuming that a temperature suitable for the thermally-assisted magnetic recording is determined around 250° C. almost the same as in the optical magnetic medium, in approximately 10 nsec after the heating treatment, the medium can be cooled approximately down to the atmospheric temperature. Under the condition where a linear velocity is 10 m/sec, the thermally-assisted magnetic recording can no longer continue when a position of the heating is as far as 100 nanometers from a position where the recording magnetic field is applied As the interval between them becomes larger than the above, the medium heated by the laser light B is sometimes cooled before reaching the tip 531T of the primary magnetic pole, resulting in incomplete recording. It is desirable to increase the linear velocity to improve the performance of the recording/reproducing system, and for that purpose, the laser light B and the primary pole tip 531T must be placed closer to each other.

When an edge-emitting semiconductor laser is used as the laser device 502, as aforementioned in relation with the prior art, a semiconductor layer, such as a cladding layer 523, having a thickness of several micrometers must be placed on or below the active layer 522 from which the laser light B is emitted. Thus, it is hard to locate the laser light B and the primary pole tip sufficiently close to each other, as mentioned before, simply by juxtaposing the laser device 502 and the primary magnetic pole 531.

According to the present invention, the laser device 502 recedes from the medium 504 to provide a configuration in which the tip 531T of the primary magnetic pole protrudes ahead of the laser device, and thus, the laser light B and the primary pole tip 531T can be located sufficiently close to each other.

Although FIG. 30 illustrate an example of the edge-emitting laser device 502, the present invention is not limited to this precise example, and the device may be replaced with a surface-emitting laser device or any other light emitting devices, or rather it may be an electron beam emitter. In either case, the light emitting device or the electron beam emitter may recede from the medium to provide a configuration where the tip 531T of the primary magnetic pole protrudes ahead of the light emitting device or the beam emitter, and thus, the heating beam and the primary pole tip 531T can be located sufficiently close to each other, resulting in the heating of the medium and the magnetic writing therein being carried out at optimum timing.

The arrangement shown in FIG. 30 will be detailed below.

If it is desirable to fabricate devices through monolithic processes, the head device substrate 501 can be prepared by connecting a substrate 501B or a material such as sapphire with C-plane and GaAs suitable for laser devices to an artic substrate 501A suitable for magnetic heads. Although FIG. 30 illustrates only part of the arrangement, the substrate 1 in the remaining part not shown in the drawing is not superposed with the substrate 501B suitable for the laser device but sometimes has only the artic substrate 501A deposited over almost all the remaining part. In other words, the substrate 501B suitable for the laser devices is deposited only in a restricted area over the artic substrate 501A suitable for the magnetic recording device.

Although only primary components of the edge-emitting laser device 502 related to the present invention are shown, the laser device 502 includes a first cladding layer 521, an active layer 522, a second cladding layer 523, a second electrode 524, a transparent material 525, a septum 526, and an aperture 527.

The laser device 502 may be formed of various families containing materials such as InGaN, InAlGaAs or the like, and InGaN is selected for the laser device, the sapphire having a C-plane can be suitable for the substrate 1. The InGaN laser device has a multi-layered configuration where the substrate is superposed with a GaN buffer layer, an n-type GaN lower electrode junction layer, an n-type first electrode connected and adjacent thereto, an n-type InGaN layer, an n-type AlGaN diffraction grating registration layer, an n-type GaN first cladding layer 521, an InGaN multiple quantum well active layer 522, a p-type AlGaN grating registration layer, a p-type GaN second cladding layer 523, a p-type AlGaN intermediate layer, a p-type GaN upper electrode junction layer, and a p-type second electrode 524, one layer over another.

Laser beam is emitted downward from lower end surfaces of the layers 521, 522, 523 and then transmitted through the transparent material 525 so as to propagate through an aperture 527 cut out in the septum 526 toward the medium 504.

The magnetic recording/reproducing device 503 is comprised of a recording primary magnetic pole 531, a pole 532 serving as both a recording return path and a first shield for the reproducing device, a recording coil 533, an embedded material 534 of resist, a GMR reproducing device 535, a reproducing gap 536, and a second shield 537. The recording coil 533 is shaped to wind around a connection of the primary magnetic pole 531 with the return path 532, and although not shown in FIG. 30, the coil is wound around the part now shown in upper margin of the drawing.

Although the details of the GMR reproducing device are not shown in the drawings, it may be formed of a series of components positioned side by side from the right of the first shield 532, such as a lower reproducing gap 536 of dielectric, a hard biasing layer, a GMR device 535 of NiFe/CoFe/Cu/CoFe/FeMn, a Cu electrode, an upper reproducing gap 536, and a second shield 537.

When signal modulated high frequency current flows in the recording coil 533, the recording magnetic field is applied from the primary magnetic pole 531 to the medium 504, and it leaves magnetization transition in the medium 504. A signal magnetic field developed from the magnetization transition which is recorded and stored in the medium 504 can be reproduced by the GMR device 535.

The medium 504 is made of a medium substrate 541 and magnetic medium film 542 on one side or on opposite sides thereof. The medium substrate 541 is made of glass, Si, AlP coated Al alloy, or the like. Referring to FIG. 30, the medium moves from the left to the right. Thus, the left of the drawing is defined as "leading section" while the right of the drawing is defined as "trailing section". The magnetic medium film 542 can be comprised of a series of components juxtaposed from a surface of the medium substrate 541, such as an NiFe soft magnetic lining layer, a CoPt vertical magnetization record layer, a C protective layer, a lubricant layer.

Light beam emitted through the aperture 527 is directed to the medium film 542 to raise its temperature and reduce magnetic coercive force therein. A zone where the coercive force is decreased moves to under the primary magnetic pole 531, and a magnetization direction is determined depending upon the recording magnetic filed developed by the primary magnetic pole. When the vertical magnetization film is used, the magnetization direction in the medium is either upward or downward, and this corresponds to a signal "1" or "0" to perform the recording.

After the recording is completed, the medium is cooled while moving toward the trailing section, and it shows a sufficiently high value of KuV/kT at the room temperature, ensuring the recording stability. The signal magnetic field is developed from the boundary (magnetization transition) between upward magnetization and downward magnetization. Depending upon such a direction of the signal magnetic field, a magnetization rotation film of the GMR reproducing device 535 alters a direction of magnetization to vary electric resistance, and eventually, a signal is reproduced in a form of variations in voltage.

The exemplary arrangement of the invention as illustrated in FIG. 30 is advantageous in that such an arrangement itself facilitates manufacturing of the same.

The thermally-assisted magnetic recording apparatus as illustrated in FIG. 30 can be fabricated through the procedure as described below. First, an ceramic substrate ($Al_2O_3$·TiC) and a sapphire substrate are connected to each other. Specifically, junction planes of both the substrates are coated with metal, such as Au, Ag, Cu, Sr, or PbO, which is higher in fusing point than a temperature at which crystalline growth of the laser device is facilitated, and the substrates have their respective junction planes pressed in contact with each other as required. Then the substrates are heated around a fusing point of the metal used for the connection of the substrates, and the metal is fused to bond the substrates. Depending upon the temperature for the metal fusing and substrate bonding and the pressure applied to keep contact between the substrates, solid phase diffusion interactively bond the substrates without using the metal.

Then, the laser device 502 is deposited on the sapphire substrate by means of MOCVD (metal-organic chemical vapor deposition). Source gases for organic metal compounds include trimethylgallium, nitrogen, ammonium, laughter gas, trimethylindium, trimethylaluminum, and the like, and the components and ratios of the introduced gases are regulated in accord with principle elements and composition rate for each layer.

A wide range of electrode layers may be used containing Al, Cu, Au, and alloys of them as required, and film formation is carried out by CVD or sputtering.

After the crystalline growth of each layer for the laser device, the laser device is isolated from the remaining part and patterned into a stripe-like shape, and there is further provided a pad to which wire is to be attached in a succeeding stage of packaging process. Isolation of the laser device into the strip pattern can be carried out by RIE using various chloric gasses ($Cl_2$, $BCl_3$, and the like) or various methane gasses.

Then, a light emitting face and a reverse side of the laser device is coated with a reflective film to form an oscillator. The reflective film coating may be applied by oblique sputtering or flame plating. Over the reflective film, a transparent material such as $SiO_2$, $Si_3N_4$, $Al_2O_3$, AlN, ZnS, $TiO_2$, or BN, or an organic film is deposited by means of CVD or sputtering, and the resulting multi-layered structure is patterned into a specified shape by RIE. "Specified shape" is a geographical pattern where the tip of the recording primary magnetic pole is located close to the aperture, for example.

The septum 526 is deposited over the transparent material 525 by means of oblique sputtering or flame plating. The septum 526 may be made of high reflectivity material such as Au, Ag, Cu, Al, or TiN which can be selected in accord with a desired wavelength of the laser, and for blue laser, Ag, Al, or alloy of a combination thereof may be selectively used. As with AlInGaAs red laser, Au, Cu, and TiN may be used as well as the materials used for blue laser.

Next, after selecting a position of the septum where the intensity of the laser beam is greater than the remaining portion, the optical aperture 527 is created therein by means of oblique FIB. Dimensions of the aperture is varied depending upon the record density specification of each recording apparatus; for example, a system featured with plane density of 100 Gb/in$^2$, the dimensions may be specified as 300–500 nm along the extension of tracks and as 50–200 nm in the widthwise direction of the tracks. A length of the aperture along the extension of the tracks has no relation with a line density, and rather the greater length is preferable for fully preheating the medium. It is preferable to adjust a mode of the laser light so that optical electric field is oriented in the widthwise direction of the tracks to reduce a propagation loss.

After forming the aperture, a material such as $SiO_2$, $Si_3N_4$, $Al_2O_3$, AlN, ZnS, $TiO_2$, or BN, or an organic film is deposited in the aperture by means of CVD or collimation sputtering. While the material is being deposited, the remaining portion other than an area where the device is to be fabricated may be covered with resist, and the resist film is peeled off after the fabrication of the device to proceed with the film formation procedure.

A region surrounding the laser device is coated with protective film of $SiO_2$ to create metal shield layer against plating, and after a resist flame is formed in accord with the pattern of the recording primary magnetic pole, a material such as NiFe and CoFeNi suitable for the recording magnetic pole is deposited to plate the inside of the flame. After the plating material is deposited down to the connection of the primary magnetic pole 531 with the return path 532, the resist flame is formed in accordance with a pattern of the recording coil, and the coil is completed by means of Cu plating.

Then, the connection between the primary magnetic pole and the return path, and the return path are formed by means of resist flame plating, and the return path has its face polished in the trailing edge section by means of CMP (chemical mechanical polishing) as required. Such polishing is performed to improve GMR property in fabricating the GMR device on the surface of the return path, and if the face of the return path close to the trailing edge is sufficiently smooth, there is no need of forcing the structure to undergo the polishing. The return path and the first shield for the GMR reproducing device may not be shared but may be provided separately.

On the planar face of he return path close to the trailing edge, the GMR reproducing device is deposited by means of thin film process. In this case, first a lower reproducing gap 536 of nonmagnetic and non-conductive dielectric, such as $SiO_2$, $Si_3N_4$, BN, $Al_2O_3$, AlN, or $TiO_2$, is deposited and to form a hard biasing layer pattern, and the structure is patterned into a strip-like shape of the GMR device 535 of NiFe/CoFe/Cu/CoFe/FeMn, and then patterned into a Cu electrode for connection to the pad. After that, the structure is superposed with an upper reproducing gap 536 and the second shield 537, one over another, and eventually, a protective film of a material such as $Al_2O_3$ is deposited to coat the uppermost surface of the multi-layered structure. Subsequently, a region corresponding to a wire bonding pad section is exposed, and thus, the thin film formation process is completed.

After the completion of the thin film formation, the device is cut into chips, the artic substrate undergoes the slider process and further undergoes the depth end polishing to dimension the primary magnetic pole and create its end in some receding position. Lead wires are connected to the pad, and thus, the slider process is completed. There are six of the lead wires; two for the laser device, two for power line to the recording coil, and two for the GMR electrodes. The finished slider is connected to a gimbal of a magnetic head suspension, and the lead wires are held down by a projection. Thus, a head gimbal assembly is finished.

An exemplary method of fabricating the medium 504 will now be described. Glass, Si, NiP applied Al alloy are prepared for the medium substrate 541, and the substrate is rested in a substrate holder within a multi-chamber magnetron sputtering apparatus. After pumping air out of the apparatus into vacuum, each layer is deposited separately in the sputtering chamber. When the vertical recording medium is fabricated, a soft magnetic lining layer is deposited below the record layer. Materials such as NiFe, CoZrNb, CoFeNi, and the like are available for the soft magnetic lining layer.

Materials such as CoPt, FePt, and FeAu showing a high level of Ku are suitable for the record layer of the present invention, and magnetized particles are miniaturized to a size as minute as 3 nm to reduce noise. In order to miniaturize particles, there are a variety of processes and steps including conditioning a deposition of the record layer (substrate temperature, gas pressure, etc.), adding trace elements (Cr, Ta, Nb, etc.) to the record layer, depositing thin crystal prohibiting shield layer (of Cr, V, and alloy of them) intervening between the soft magnetic layer and the record layer, simultaneously sputtering the magnetized material and dielectric material (such as $SiO_2$, $Si_3N_4$, AlN, $Al_2O_3$, BN, C, and the like) during the formation of the record layer to create a granular structure where minute magnetized particles scatters in dielectric matrix, and so forth.

In this embodiment, the granular structure is employed to fabricate the record layer in which average particle diameter is 3 nm. After the formation of the record layer, the C protective layer is deposited by sputtering and taken out of the sputtering chamber. Then the structure is coated with the lubrication layer and further undergoes the varnishing process as required, and thus, the magnetic recording medium is completed which is loadable in the thermally-assisted magnetic recording apparatus of the present invention.

As a result of analyzing the medium properties, the medium shows a sufficient level of Ku as high as $5 \times 10E7$ (erg/cc) at the room temperature, and such a medium assumes to be sufficiently durable to thermal turbulence around the room temperature even if the particle diameter of the medium is as minute as 3 nm. Additionally, the magnetic coercive force Hc0 is as high as 40 kOe at the room temperature, and hence, it is impossible to record magnetic information at the room temperature. The coercive force Hc0 is reduced as a temperature of the record layer rises, and it drops to a level as much as intensity of the recording magnetic field (10 kOe) at 250° C. to 300° C.

Installing a spin-stand magnetic recording/reproducing analyzer with the laser device integrated magnetic head which is configured as mentioned above and loading the analyzer with the magnetic medium to examine the recording conditions, a saturation recording property could be obtained with power of the laser light of approximately 10 mW, and excellent stability and reproducibility of the recording properties could be observed.

A general arrangement of the thermally-assisted magnetic recording apparatus according to the present invention will be described.

The recording/reproducing head as illustrated in FIG. 30 is incorporated in the recording/reproducing dual purpose integrated magnetic head assembly and implements its features as a thermally-assisted magnetic recording apparatus.

Figure 31:
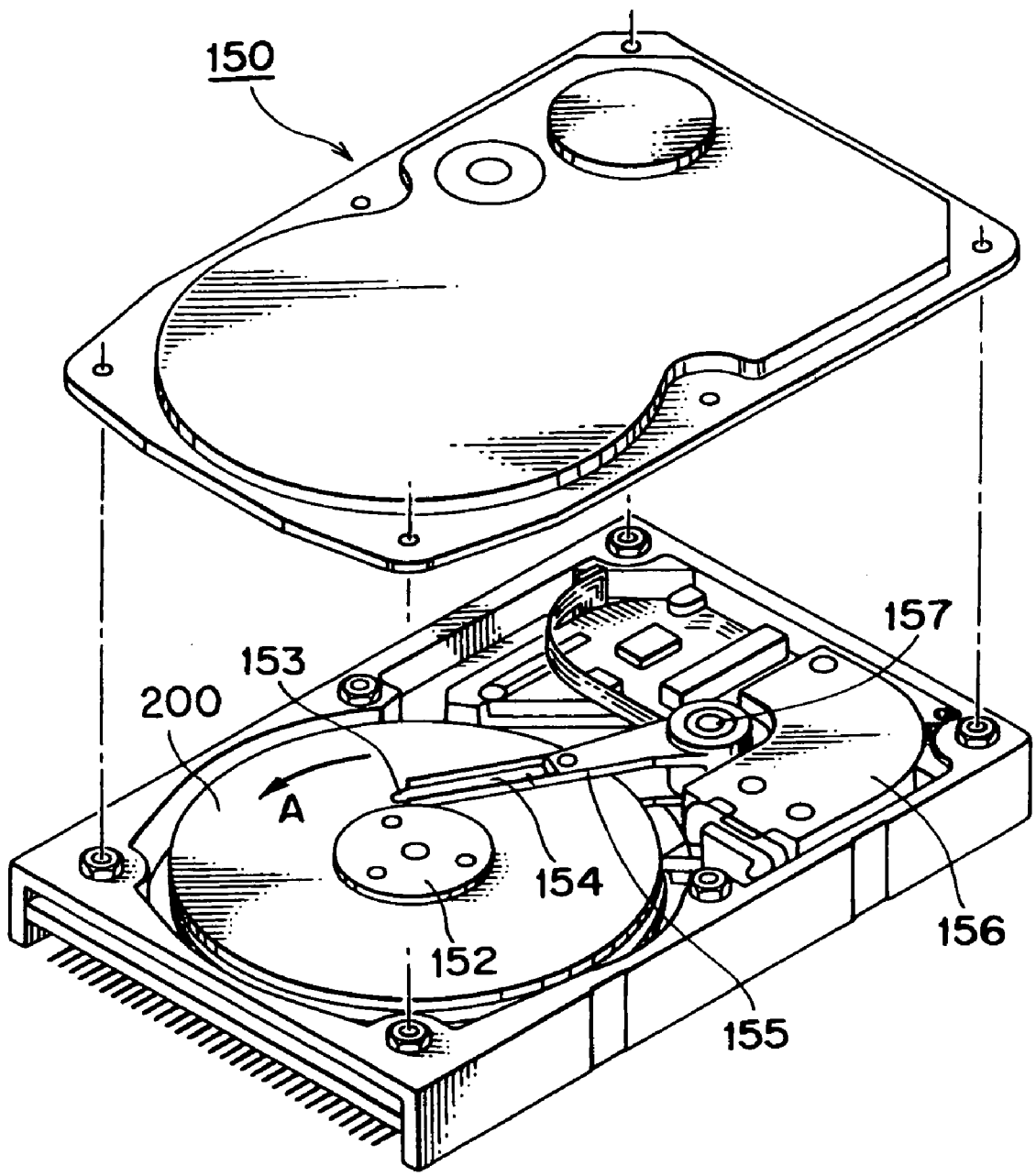
FIG. 31 is schematic perspective view showing primary elements of the thermally-assisted magnetic recording apparatus according to the present invention.

FIG. 31 is a schematic perspective view showing the arrangement of such a magnetic recording apparatus. A thermally-assisted magnetic recording apparatus 150 of the present invention is an apparatus in which a rotary actuator is used. In the drawing, a magnetic disk 200 for lateral or vertical recording is attached to a spindle 152 and is rotated in a direction shown by an arrow A by a motor (not shown) which responds to control signals from an actuator control unit (not shown). The magnetic disk 200 may be configured as "keypad media" which includes a record layer for lateral or vertical recording and further includes a soft magnetic layer deposited thereon. A head slider 153, which is used to record and reproduce information to be stored in the magnetic disk 200, is attached to a tip of a thin film shaped suspension 154. The head slider 153 has the recording/reproducing head in FIG. 30 built in around its tip.

When the magnetic disk 200 is rotated, a surface of the head slider 153 opposed to the medium (ABS) is held apart from the surface of the magnetic disk 200 by a specific lifting distance.

The suspension 154 is connected to one end of an actuator arm 155 which has a bobbin holding actuating coil (not shown). The actuator arm 155 has the other end coupled to a voice coil motor 156 serving as a linear motor. The voice coil motor 156 is comprised of actuating coil (not shown) wound on the bobbin of the actuator arm 155 and a magnetic circuit which has a pair of permanent magnets opposed to each other with the coil being nipped between them, and opposing yokes.

The actuator arm 15 is held by ball bearings (not shown) in upper and lower positions of a fixture shaft 157, and is slidably rotated by the voice coil motor 156.

Figure 32:
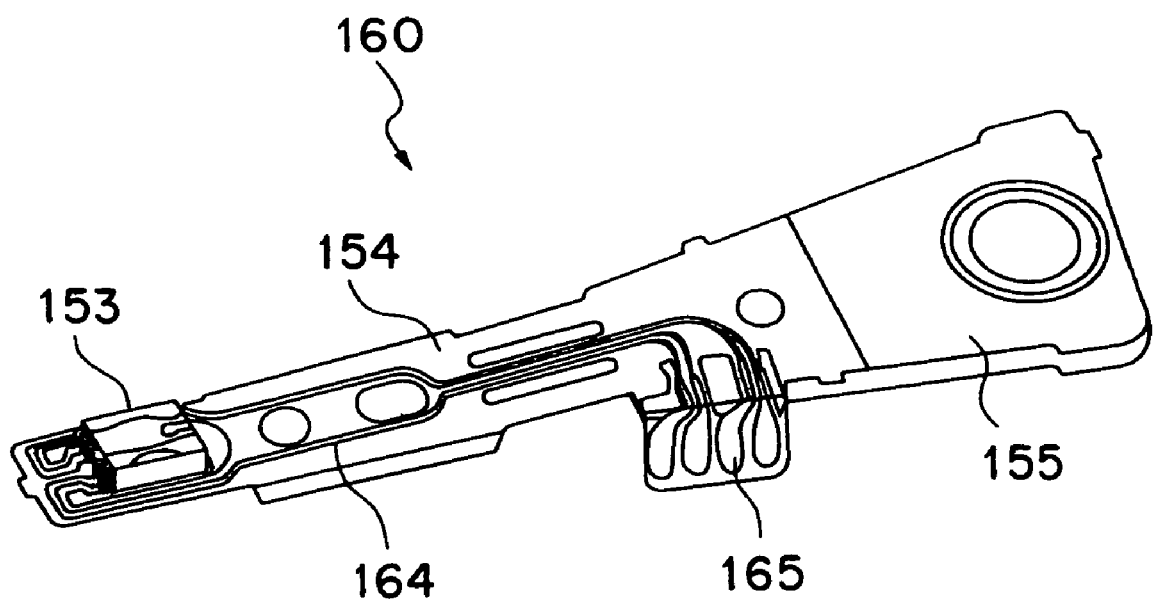
FIG. 32 is an enlarged perspective view showing a fore part of magnetic head assembly ahead of an actuator arm 155.

FIG. 32 is an enlarged perspective view showing part of the magnetic head assembly ahead of the actuator arm 15, in an orientation seen from the side of the disk. The magnetic head assembly 160 has an actuator arm 151 provided with a bobbin for holding actuating coil, and the actuator arm 155 has its one end connected to the suspension 154.

The head slider 153, which has the aforementioned built-in recording/reproducing head in FIG. 30, is attached to a tip of the suspension 154. The suspension 154 has lead lines 164 for writing and reading signals, and the lead lines 164 and electrodes of the magnetic head incorporated in the head slider 153 are electrically connected to one another. In FIG. 30, a reference numeral 165 denotes an electrode pad of the magnetic head assembly 160.

Figure 33:
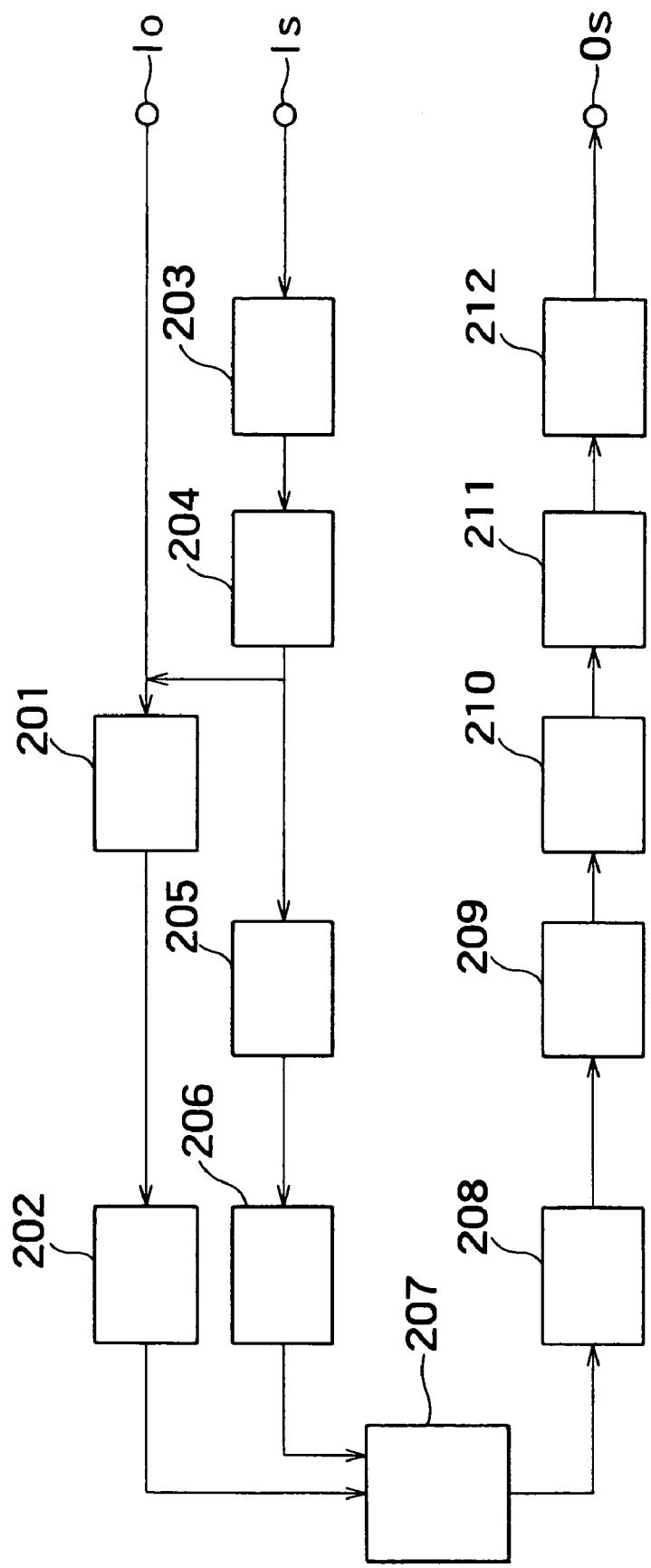
FIG. 33 is a block diagram showing the thermally-assisted magnetic recording apparatus according to the present invention.

FIG. 33 is a block diagram showing the entire arrangement of the thermally-assisted magnetic recording apparatus according to the present invention. Referring to FIG. 33, the apparatus includes an light emitting device actuating input Io, a signal input Is, a signal output Os, a light emitting device actuating circuitry 201, a light emitting device 202 built in the head, an ECC (error correction code) application circuitry 203, a modulation circuitry 204, a record correction circuitry 205, a recording device 206 built in the head, a medium 207, a reproducing device 208 built in the head, an equivalent circuitry 209, a decoding circuitry 210, a demodulation circuitry 211, and an ECC circuitry 212.

The thermally-assisted apparatus according to the present invention is characterized in that the apparatus is configured into a block which is comprised of the prior art magnetic disk device accompanied with additional components such as the light emitting device actuating input Io, the light emitting device actuating circuitry 201, and the light emitting device 202, and in that the unique recording/reproducing head as illustrated in FIG. 30 is provided.

The light emitting device actuating input may be supplied DC voltage to the laser device, and the light emitting device may be actuated by DC without adding and using the light emitting device actuating circuitry. The light emitting device may be actuated synchronous with output from the modulation circuit in such a manner as pulse control, and the light emitting device actuated depending upon pulse generation must have a more complicated circuit structure although it is preferable because of the resulting longer lifetime of the laser. The ECC application circuitry 203 and the ECC circuitry 212 may be omitted. Ways and manners of the modulation/demodulation and the record correction can be optionally selected.

Information entry to the medium is carried out by irradiating the medium with light emitted from the light emitting device 202, and applying a record signal modulated recording magnetic filed from the recording device 206 to a position of the medium where the magnetic coercive force Hc0 is reduced because of the irradiation. A manner of converting the information into a sequence of magnetization transitions in the surface of the medium is identical with the manner as in the prior art magnetic recording apparatus. At this stage of the recording procedure according to the present invention, as mentioned in conjunction with FIG. 30, the laser light used to heat the medium and the tip of the primary magnetic pole of the recording head can be located considerably close to each other, and hence, even if the medium is moved at high velocity, the heating and magnetic writing can be performed at the optimum timing. In short, super high density magnetic recording can be implemented at drastic high speed.

The reproducing device 208 detects a signal magnetic field which is a leakage magnetic field from the medium developed from the sequence of the magnetization transitions. The reproducing device is typically a GMR reproducing device, and alternatively it may be an ordinary AMR (anisotropic magnetoresistance) reproducing device, and it may be replaced with a TMR (tunneling magnetoresistance) reproducing device for a future-oriented use.

The recording medium used in the thermally-assisted magnetic recording apparatus according to the present invention is not limited to hard disk drives, and alternatively, all types of mediums, such as flexible disk and magnetic card, which is available for magnetic recording can be used. Optical disk and magnetic disk may be combined with each other.

The thermally-assisted magnetic recording apparatus according to the present invention may have only a single feature of magnetic recording or may have dual features of recording and reproducing. As to the relations between the magnetic head and the medium, the apparatus may belong to either "hovering" type or "contact" type. The magnetic recording apparatus may be of a "removable" type in which the recording medium can be removed from the magnetic recording apparatus.

Embodiment 7

A seventh embodiment of the present invention will be described according to which after an end face light emitting laser device is prefabricated as a heating device on a substrate of he heating device, the heating device substrate is connected to the magnetic head substrate.

The primary components of the thermally-assisted magnetic apparatus of this embodiment are the same as those shown in FIG. 30, they will be explained with reference to FIG. 30. A manufacturing method of the device is also almost the same as that in the sixth embodiment as mentioned above. Thus, hereinafter, varied part from the sixth embodiment, that is, bonding materials and bonding method alone will be explained.

First, a heating device 2 is deposited on a heating device substrate 1B and isolated from the remaining region into a stripe-like pattern in the same manner as in the six preferred embodiment. However, the isolation process to create the stripe-like pattern may be performed after the succeeding bonding process for the substrates.

After isolated into the stripe-like pattern, a recess 525 and a septum 526 are formed. The recess and septum fabrication process may be performed after the substrate bonding process which will be explained below.

On a reverse side of the substrate 501B where the heating device 502 has been fabricated, a metal junction layer of a material, such as In, Sn, Pb, Te, Ga or alloy of them, having a relatively low fusing point. An isotropic junction layer is provided on a junction surface of the magnetic recording device substrate 501A, and thereafter, both of the junction surfaces are bonded together to fix the substrates 501A and 501B by means of fusing. Such a metal junction layer may be formed on the junction surface of only either one of the substrates.

After that, the magnetic recording device 503 is formed above the laser device 502. Details of this process are similar to those given in conjunction with the six preferred embodiment.

Since the laser device 502 can be prefabricated above the substrate 501B where the laser device is to be formed, this embodiment is advantageous in that the prior art laser device and the prior art manufacturing process of the same, and the prior art manufacturing apparatus can be commonly used to the application herein. Additionally, the substrate 501A used for the magnetic head does not have to have semiconductor deposition apparatus for the laser device, and contamination of the apparatus can be easily avoided.

Embodiment 8

A hybrid process according to an eighth preferred embodiment of the present invention will be described in which after the thin film deposition process for the heating device and the thin film deposition process for the magnetic recording device are performed independent to each other, these separately fabricated devices are connected in a self-alignment fashion.

Although the thin film deposition processes for both the heating device (semiconductor laser) and the magnetic recording device are almost the same as those mentioned above in relation with the sixth preferred embodiment, a sequence of steps of fabricating the magnetic recording device includes the steps of forming the reproducing device and the recording device one layer over another in series from the substrate, and the recording primary magnetic pole is provided in the uppermost surface of the magnetic recording device. The finished arrangement is the same as that in FIG. 30, it will be described with reference to the drawing. However, in this embodiment, the sequence of the components in FIG. 30 from the leading section toward the trailing section are reversed.

This embodiment is noteworthy especially because of its self-alignment bonding process, and hence, such a process will be detailed below. A self-alignment pattern is preferably provided in portions of significant device features, such as in an isolated region between devices except for an area close to the primary magnetic pole and areas corresponding to the primary components of the laser light emitting device.

Figure 34A:
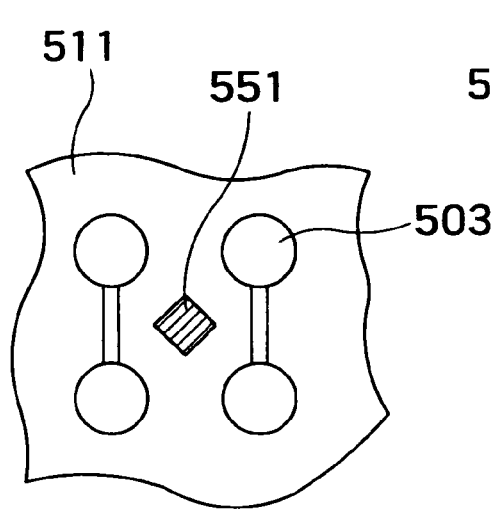
FIGS. 34A through 34D are diagrams showing an exemplary configuration of components of the head and an exemplary self-alignment pattern provided among the components, seen from the above as each component being fabricated.
Figure 34B:
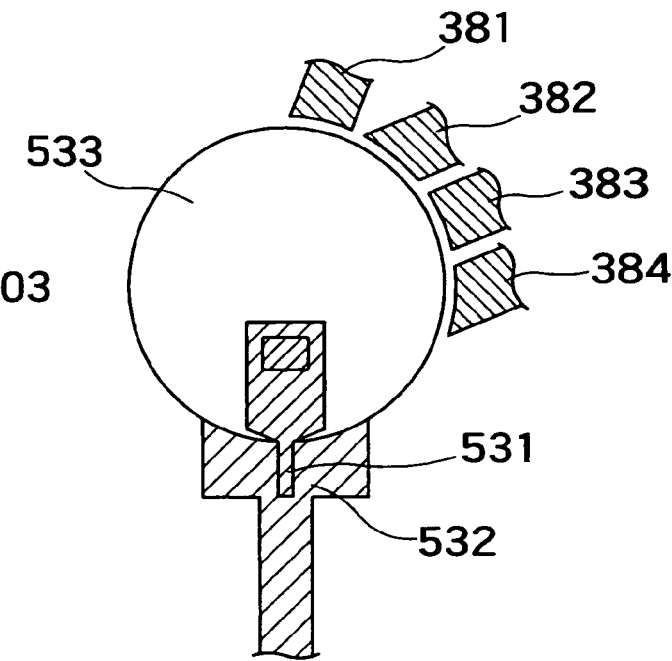
Figure 34C:
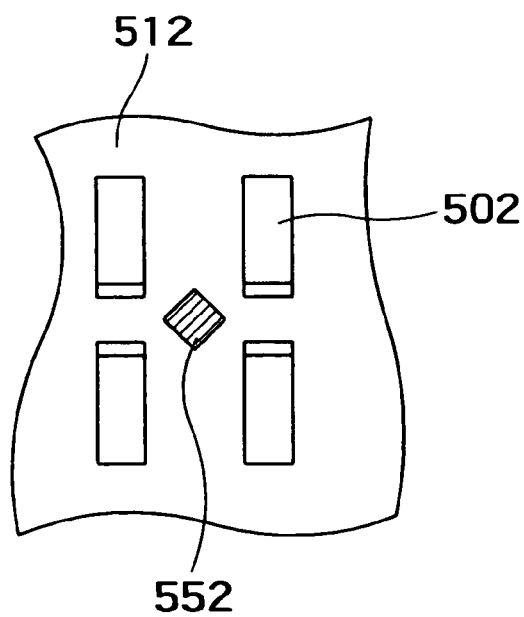
Figure 34D:
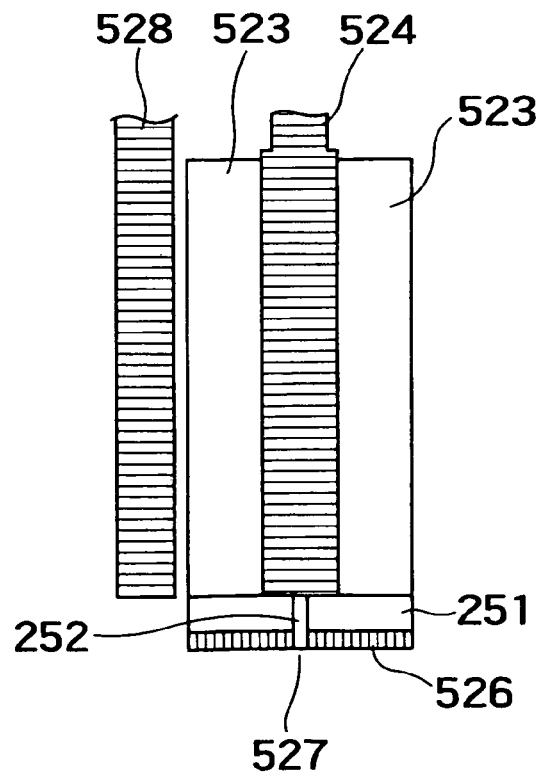

FIGS. 34A through 34D depict configurations of each component and an exemplary self-alignment pattern provided between the devices, of which tops are seen all from above. FIG. 34A is a diagram showing an exemplary arrangement of the magnetic recording device while FIG. 34B is an enlarged view of the magnetic recording device, and FIG. 34C is an exemplary arrangement of the laser device while FIG. 34D is an enlarged view of the laser device. With reference to FIG. 34A, the magnetic recording device includes a magnetic recording device substrate 511, a magnetic recording device 503, and a first self-alignment junction 551. In FIG. 34B, the device also includes a recording primary magnetic pole 531, a return path 532, a recording coil 533, and electrodes 381, 382, 383, 384, respectively. In FIG. 34C, reference numerals 512, 502, and 552 designate a laser device substrate, a laser device, and a second self-alignment junction, respectively. With reference to FIG. 34D, the laser device also includes a second cladding layer 523, a second electrode 524, a main portion 251 of a recess, a concave portion 252 positioned at the center of the recess and embedded with the primary magnetic pole, a septum 526, an optical aperture 527, and a first electrode 528. An active layer 522 is behind the cladding layer 523 in the drawings. Like reference numerals denote the similar components of the same features to those in FIG. 30.

In this embodiment, in accordance with the magnetic recoding device fabrication process as explained in conjunction with the sixth preferred embodiment, the magnetic recording device 503 is formed over the magnetic recording device substrate 511. The magnetic recording device is configured, as illustrated in FIG. 34B, into a stacked multilayer structure where the primary magnetic pole, the return path with the recording coil intervening therebetween, and the embedded GMR reproducing device are juxtaposed in top-down order, and an embedded portion 534 shaped as in FIG. 30 is formed between the tip of the primary magnetic pole and the tip of the return path. As with the electrodes 381 to 384, two of them are for conducting electricity to the recording coil and the remaining two are electrodes for the GMR reproducing device, which are connected to a contact pad.

The laser device 2, as shown in FIG. 34D, is disposed over the laser device substrate 512 in registration with the magnetic recording device. The registration with the head device means a manner in which two of the devices are connected to each other in a self-alignment fashion, and then, the concave portion 252 in the laser device is embedded with the tip 531 of the recording primary magnetic pole of the head device.

After the magnetic recording device and the laser device are fabricated in good registration with each other, heights of the devices are adjusted so that the concave portion 252 in the laser device is embedded with the tip 531 of the recording primary magnetic pole of the head device. The heights are adjusted by burying resist or burying dielectric. In such buried portions provided as required, the first self-alignment junction 551 and the second self-alignment junction 552 are formed by means of PEP process where the same mask is used. Although there is no restriction in deployment and shape of the self-alignment junctions, it is preferable to provide the isolated zone between the devices as illustrated in FIGS. 34A and 34C, allowing for device features and process convenience.

Eventually, two of the device substrates 511 and 512 have their respective device effective faces opposed to each other, and two of the devices are cautiously connected or pressed in contact with each other as required by using references of relatively large junction patterns provided, for example, at wafer ends, and thus, the device having a sectional configuration as shown in FIG. 30 is finished.

Embodiment 9

A ninth preferred embodiment of the present invention will be described in which a light collecting feature is added to an optically transparent material provided before the laser device 502.

In this aspect of the present invention, as described before in conjunction with the sixth preferred embodiment, an end face light emitting laser device 502 is fabricated, and thereafter, a recess therein is buried with the transparent material 525 of a material such as $SiO_2$. In this case, if light collecting feature is granted to the transparent material 525, efficiency of using laser light emitted from the laser device 502 can be enhanced.

One way of adding such light collecting feature is creating a distribution of refractive index of the transparent material.

Figure 35A:
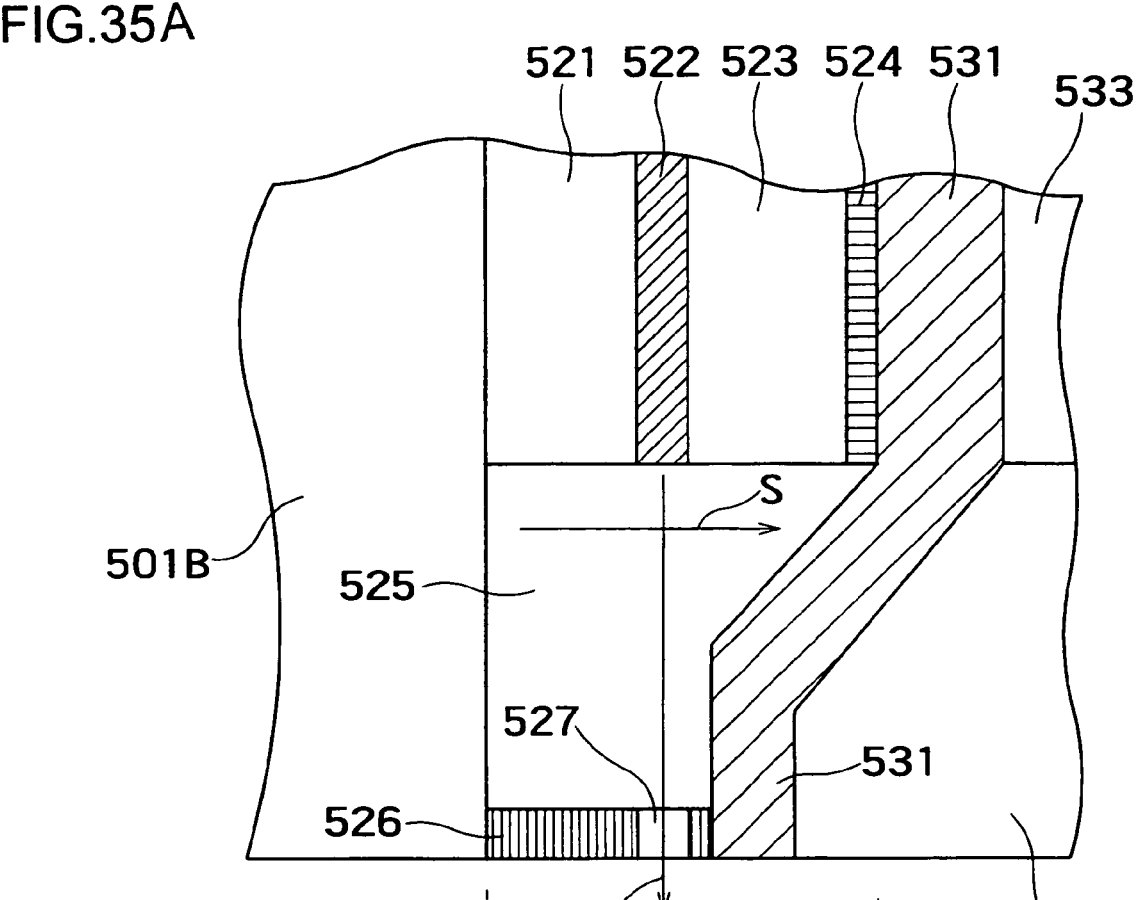
Figure 35B:
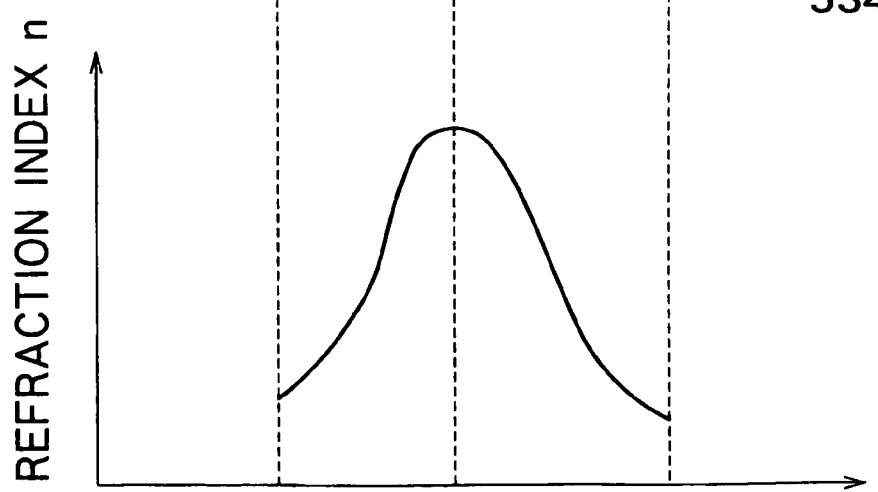
FIG. 35B is a graph showing a distribution of the refractive index in the transparent material 525 along a direction of an arrow S.

FIG. 35A is a partial enlarged view showing primary components such as a region surrounding the transparent material 525 in the thermally-assisted magnetic recording apparatus shown in FIG. 30. FIG. 35B is a graph illustrating a distribution of refractive index along a direction of an arrow S in the transparent material 525.

Specifically, when the distribution of refractive index is developed where a peak is an optical axis of the laser light B, the laser light is collected in the aperture 527, and efficiency in use of the laser light can be considerably enhanced.

One way of applying such a distribution of refractive index to the transparent material 525 is depositing a plurality of layers of the transparent material 525 into a multi-layer structure so that the refractive index gradually varies from one layer to another. Deposition of the transparent material 525 along the direction of the arrow S in FIG. 35A begins with the transparent material layer of the lowest refractive index, the transparent material layer of the highest refractive index is superposed at the same level as the active layer 522, and after that, the transparent material layers of gradually decreasing refractive index are deposited one over another by appropriately adjusting the property of the material. The transparent materials that show relatively low refractive index include Mg and CaF, the materials showing medium refractive index include $SiO_2$, and the material showing relatively high refractive index include SiN, TiO, and ZnS.

The distribution of the refractive index as illustrated in FIG. 35B can be obtained by appropriately selecting such materials and depositing them in combinations.

In depositing the transparent material 525 by means of CVD, a composition of the material may be sequentially varied, or a type and amount of additives may be sequentially altered, so as to attain the distribution of the refractive index as illustrated in FIG. 35B. For example, after the laser device 502 is formed, the transparent material 525 is deposited again over the growth substrate 501B by means of MOCVD. Instead of such material, semiconductor transparent to the laser light B may be substituted; for instance, when a wavelength of the laser light B is 650 nm, a material such as InGaN having an optically broader band gap than that can be used to provide the transparent material 525. In this case, a distribution of refractive index can be developed by depositing such a material while sequentially changing its composition and an amount of dopant added thereto. For example, in general, the refractive index is raised when a larger amount of dopant is added, and hence, when a deposition is started with the substrate 501B, the amount of the dopant may be regulated so that the largest amount of the dopant is added to the material deposited at the same level as the active layer 522.

The above-mentioned method is effectively implement development of the distribution of the refractive index along the direction of the arrow S in FIG. 35A, but the refractive index perpendicular to the direction cannot be altered. Thus, as explained above, in depositing the transparent material 525, the distribution of the refractive index can be granted to the transparent material 525 in a direction perpendicular to the arrow S by injecting ions and depositing masks so that the refractive index has its peak around the center of the optical axis of the laser light B.

The sixth to ninth preferred embodiments of the present invention have been described. However, the present invention should not be limited to the exact manners disclosed herein.

For instance, although an example where an end face light emitting laser device is used for the heating source has been explained in the aforementioned embodiments, the sixth to ninth preferred embodiments are not limited to the end face light emitting device, and a face light emitting device and an electron beam emitter may similar be used for the heating source.

When the face light emitting laser device is used as the heating source, it is preferable in view of convenience of manufacturing process to apply such laser device to the planer structure magnetic head. One example can be given as follows: After the substrate where the light emitting laser device is to be deposited is connected to the magnetic recording device substrate, the laser device is also deposited by means of crystalline growth and then isolated from the remaining portion into a stripe-like pattern. A surface where crystals are grown up is to be used as a light emitting face of the face light emitting laser, and hence, requirements for RIE process accuracy in isolation into the stripe-like pattern are not so strict. After the film is isolated into the stripe-like pattern, a space between the devices is buried with an appropriate material, and a recess defined from the light emitting face to the medium facing surface to which the medium faces is formed of the tapered stripe of $SiO_2$. In order to enhance the efficiency of using light, a thin film lens may be provided around the light emitting face. A septum and an optical aperture are created in the ABS in the recess, as required. The recording primary magnetic pole is placed in one of the tapered side walls of the recess (vertical recording) or in both of the side walls (longitudinal recording), and a length of the side walls is determined to be a length of the pole. Device formation may be carried out in a monolithic manner after the connection of the substrates as mentioned above, and alternatively two other ways stated in the aforementioned embodiments can be practically used.

When the electron beam emitter is used as the heating source, a tip of an emitter corn of a material such as C, Si, Ta, and the like recedes from the primary magnetic pole, as required, so as to provide a configuration in which the primary magnetic pole of the recording head protrudes so as to come close to the electron beam.

In this aspect of the present invention, a manner according which the magnetic device substrate and the electron beam emitter substrate are connected to each other is simply sufficiently advantageous. For instance, when an emitter corn array is used while utilizing etching selectivity depending upon a face orientation of Si, an artic like magnetic head substrate itself is insufficient to create the emitter array, but connection of a Si mono-crystalline wafer onto the artic facilitates to fabricate a specified emitter corn.

When the electron beam emitter recedes, a tip of the emitter and the medium facing surface together gives a space in which a gate electrode can be placed to control an amount of emitted electron beam, and hence, an amount of emitted electron beam can be controlled by gate voltage as well as voltage applied to an emitter, which results in operation stability being enhanced relative to the variation in temperature in the operation environment and relative to the alteration in linear speed.

In this embodiment, also, the recess gives a space where an electron lens made of a metal electrode pattern can be placed, and hence, both controllability over an electron beam size and efficiency of using electron beam can be enhanced.

Furthermore, the first to ninth preferred embodiments according to the present invention include variations and modifications as stated below.

For instance, a relation between a magnetization fixed point where magnetic coercive force in the recoding medium is as large as that in the recording magnetic field and a pint of the recording magnetic pole, and a relation between positions of an aperture of the light emitting device and of the recording magnetic pole are disclosed in detail in the specification and accompanying drawings of Japanese Patent Application No. H11-375083 filed by the inventors of the present invention, and the disclosed contents can be applied to and combined with the present invention.

The recording medium may include any type of medium available for magnetic recording such as "in-plane recording" and "vertical recording", and a variety of recording mediums such as "keepered media" having magnetic recording layer and soft magnetic layer also fall the range.

The recording medium is not limited to hard disks, and any other magnetically recordable medium, such as flexible disk and magnetic card, can be substituted.

Similarly, the magnetic recording apparatus may be of a type that simply performs magnetic recording or may be of a type that performs both recording and reproducing. The magnetic head and the medium may have any relation about their relative positions, such as "hovering" and "contact". The magnetic recording apparatus may be a "removable" type in which the recording medium can be removed from the magnetic recording apparatus.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

The entire disclosure of Japanese Patent Applications No. 2000-22884 filed on Jan. 31, 2000 and No. 2000-94097 filed on Mar. 30, 2000 including specifications, claims drawings and summaries are incorporated herein by references in their entirety.

What is claimed is:

1. A thermally-assisted magnetic recording head capable of recording information magnetically on a recording medium, comprising:
   a laser device configured to emit a light to heat the recording medium to reduce a magnetic coercive force thereof;
   a light absorbing film provided between the laser device and the recording medium, the light absorbing film having an aperture through which the light is applied to the recording medium;
   a magnetic pole configured to record the information magnetically on the recording medium by applying a recording magnetic field to the recording medium having the reduced coercive force; and
   an optical light collecting unit configured to asymmetrically converge the light emitted from a light emitting face of the laser device and to direct the converged light into the aperture,
   the aperture being adapted so that a polarizing direction of the light emitted from the laser device is approximately perpendicular to a direction along a longitudinal extension of recording tracks formed on the recording medium,
   a width W1 of the aperture taken along the polarizing direction being smaller than a width W2 of the aperture taken approximately perpendicular to the polarizing direction,
   the width W1 being shorter than ½ of a wavelength at the center of a spectrum of the light emitted from the laser device, and
   the optical light collecting unit shifting a peak of a distribution of a light intensity of the converged light from a first position to a second position due to the asymmetrical convergence, the second position being closer to the magnetic pole than the first position.

2. The thermally-assisted magnetic recording head according to claim 1, further comprising a dielectric film provided between the laser device and the light absorbing film.

3. The thermally-assisted magnetic recording head according to claim 2, wherein an optical film thickness of the dielectric film is in a range from $0.05\lambda$ to $0.35\lambda$ relative to the wavelength $\lambda$ of the light emitted from the laser device.

4. The thermally-assisted magnetic recording head according to claim 1, wherein the width W1 is within a range in which an absorption loss through the aperture of light having an electric field vector perpendicular to the direction of the aperture width W1 is 10 times as much as an absorption loss through the aperture of light having a magnetic field vector perpendicular to the direction of the aperture width W1, or even higher.

5. The thermally-assisted magnetic recording head according to claim 1, wherein the laser device is a semiconductor laser device of which laser oscillation mode is a TM mode.

6. The thermally-assisted magnetic recording head according to claim 1, further comprising an optical light collector which converges the light emitted from the laser device to direct it into the aperture.

7. The thermally-assisted magnetic recording head according to claim 1, wherein the aperture is filled with dielectric or semiconductor material.

8. The thermally-assisted magnetic recording head according to claim 1, wherein the aperture has a rectangular shape.

9. The thermally-assisted magnetic recording head according to claim 1, wherein the light absorbing film has a flattened surface.

10. The thermally-assisted magnetic recording head according to claim 1, wherein the optical light collecting unit is a diffraction grating lens having an eccentric deployment.

11. The thermally-assisted magnetic recording head according to claim 1, wherein the optical light collecting unit has an asymmetrical distribution of a refractive index.

12. A thermally-assisted magnetic recording apparatus capable of recording information magnetically on a recording medium, comprising:
   a thermally-assisted magnetic recording head; and
   an actuating mechanism configured to move the recording medium and the magnetic recording head relative to each other,
   wherein the thermally-assisted magnetic recording head includes:

a laser device configured to emit a light to heat the recording medium to reduce a magnetic coercive force thereof;

a light absorbing film provided between the laser device and the recording medium, the light absorbing film having an aperture through which the light is applied to the recording medium;

a magnetic pole configured to record the information magnetically on the recording medium by applying a recording magnetic field to the recording medium having the reduced coercive force; and an optical light collecting unit configured to asymmetrically converge the light emitted from a light emitting face of the laser device and to direct the converged light into the aperture, the aperture being adapted so that a polarizing direction of the light emitted from the laser device is approximately perpendicular to a direction along a longitudinal extension of recording tracks formed on the recording medium, a width of the aperture taken along the polarizing direction being smaller than a width of the aperture taken approximately perpendicular to the polarizing direction, and the width W1 being shorter than ½ of a wavelength at the center of a spectrum of the light emitted from the laser device, and the optical light collecting unit shifting a peak of a distribution of a light intensity of the converged light from a first position to a second position due to the asymmetrical convergence, the second position being closer to the magnetic pole than the first position.

13. The thermally-assisted magnetic recording apparatus according to claim 12, further comprising a recording medium, the recording medium including a record layer in which magnetic information is recorded, and an antireflection layer made of dielectric or semiconductor material deposited over the record layer.

14. The thermally-assisted magnetic recording apparatus according to claim 12, wherein the light absorbing film has a flattened surface.

15. The thermally-assisted magnetic recording apparatus according to claim 12, wherein the optical light collecting unit is a diffraction grating lens having an eccentric deployment.

16. The thermally-assisted magnetic recording apparatus according to claim 12, wherein the optical light collecting unit has an asymmetrical distribution of a refractive index.

* * * * *

UNITED STATES PATENT AND TRADEMARK OFFICE
CERTIFICATE OF CORRECTION

| | |
|---|---|
| PATENT NO. | : 7,042,810 B2 |
| APPLICATION NO. | : 09/772894 |
| DATED | : May 9, 2006 |
| INVENTOR(S) | : Akiyama et al. |

It is certified that error appears in the above-identified patent and that said Letters Patent is hereby corrected as shown below:

On the title page Please insert

Item -- (45) Date of Patent:   *May 9, 2006

( * ) Notice:  Subject to any disclaimer, the term of this patent is extended of adjusted under 35 U.S.C. 154(b) by 0 days.

This Patent is subject to a terminal disclaimer. --

Signed and Sealed this

Twenty-sixth Day of December, 2006

JON W. DUDAS
*Director of the United States Patent and Trademark Office*